(12) United States Patent
Hampel et al.

(10) Patent No.: US 12,004,068 B2
(45) Date of Patent: Jun. 4, 2024

(54) MULTIPATH IAB COMMUNICATION INCLUDING MULTI-HOP

(71) Applicant: QUALCOMM Incorporated, San Diego, CA (US)

(72) Inventors: Karl Georg Hampel, Jersey City, NJ (US); Sherif Elazzouni, San Diego, CA (US); Ozcan Ozturk, San Diego, CA (US); Rajat Prakash, San Diego, CA (US); Fatih Ulupinar, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/455,873

(22) Filed: Nov. 19, 2021

(65) Prior Publication Data
US 2023/0171669 A1 Jun. 1, 2023

(51) Int. Cl.
*H04W 40/22* (2009.01)
*H04B 7/155* (2006.01)
*H04W 28/02* (2009.01)

(52) U.S. Cl.
CPC ........ *H04W 40/22* (2013.01); *H04B 7/15542* (2013.01); *H04W 28/0278* (2013.01)

(58) Field of Classification Search
CPC .............. H04W 40/22; H04W 28/0278; H04B 7/15542
See application file for complete search history.

(56) References Cited

U.S. PATENT DOCUMENTS

| | | | |
|---|---|---|---|
| 2008/0171527 A1* | 7/2008 | Masoian | H04B 7/15542 455/307 |
| 2016/0343241 A1* | 11/2016 | Rossi | G08B 29/126 |
| 2021/0289365 A1* | 9/2021 | Nakano | H04B 17/401 |
| 2022/0225383 A1* | 7/2022 | Fujishiro | H04W 72/21 |
| 2022/0286232 A1* | 9/2022 | Abedini | H04L 1/1809 |
| 2023/0049788 A1* | 2/2023 | Xu | H04L 45/74 |
| 2023/0130693 A1* | 4/2023 | Akl | H04L 45/745 370/328 |

\* cited by examiner

*Primary Examiner* — Hashim S Bhatti
(74) *Attorney, Agent, or Firm* — Procopio, Cory, Hargreaves & Savitch

(57) ABSTRACT

A base station may configure a first node and at least one second node with an integrated access and backhaul (IAB) network with the multipath multi-hop transmission configuration. The first node and the at least one second node may communicate with the first node through a direct path and a multi-hop transmission including the base station. The first node and the at least one second node may detect transmission failure on the direct path and retransmit the data packet to the multi-hop transmission, on a set of physical resource blocks (PRBs) configured by the base station. The first node may transmit remote buffer state report (rBSR) to the base station, and the base station may configure the set of PRBs for retransmissions based on the rBSR.

18 Claims, 30 Drawing Sheets

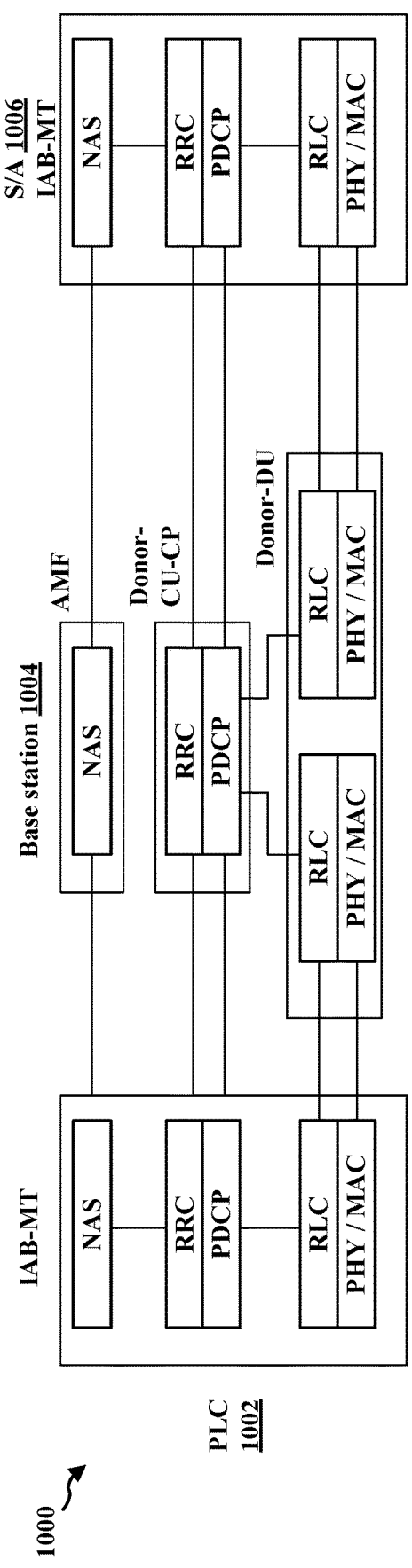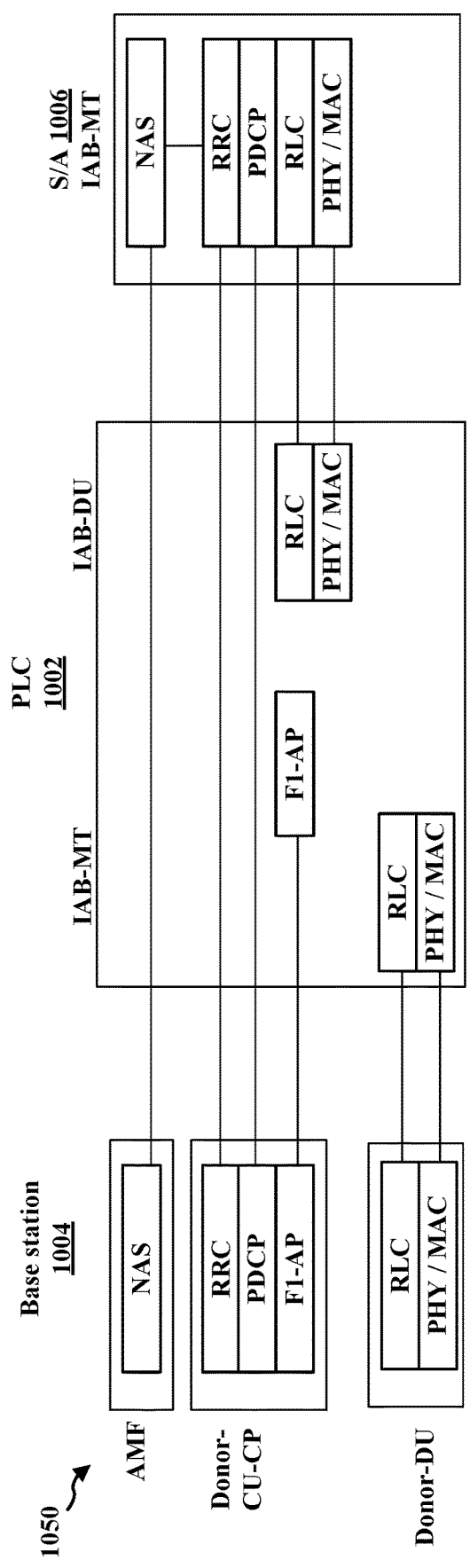
FIG. 10A
FIG. 10B

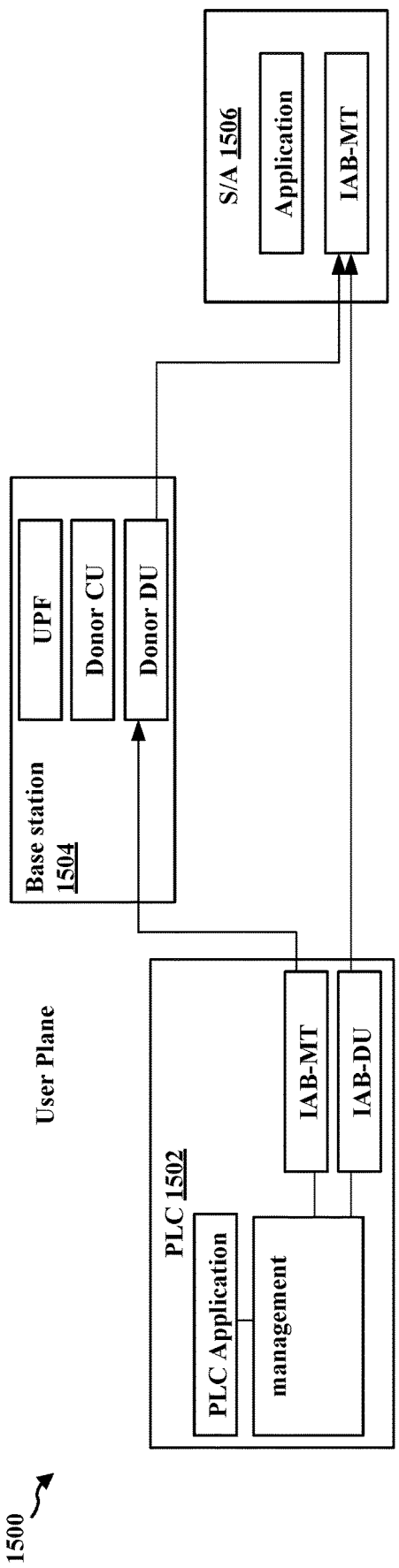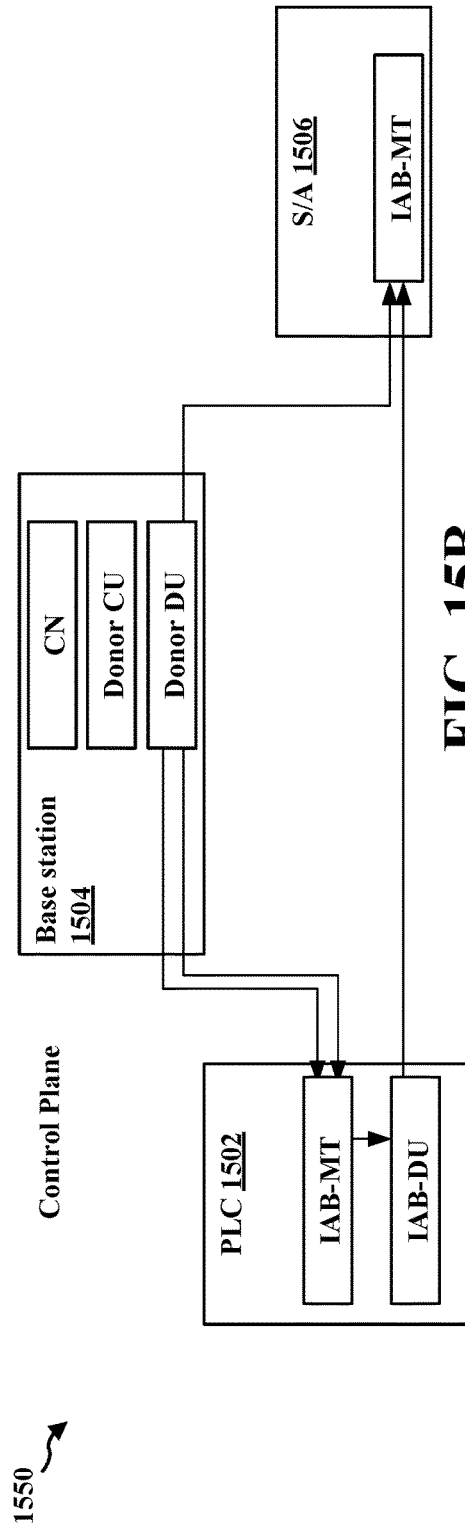
FIG. 15A
FIG. 15B

MULTIPATH IAB COMMUNICATION INCLUDING MULTI-HOP

TECHNICAL FIELD

The present disclosure relates generally to communication systems, and more particularly, to a method of wireless communication including a multipath multi-hop transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station, a first node, and at least one second node. The base station may configure the first node and the at least one second node with an integrated access and backhaul (IAB) network with the multipath multi-hop transmission configuration. The first node may include a Programmable Logic Controller (PLC) including an IAB node including a PLC IAB mobile terminal (MT) (IAB-MT) and a PLC IAB distributed unit (DU) (IAB-DU), the base station may include an IAB donor, and each of the at least one second node may include a second IAB-MT. The first node and the at least one second node may communicate with each other through a direct path and a multi-hop transmission including the base station.

Also, the first node and the at least one second node may detect transmission failure on the direct path and retransmit the data packet to the multi-hop transmission, on a set of physical resource blocks (PRBs) configured by the base station. In one aspect, the first node may detect transmission failure on the direct path and retransmit the data packet to the multi-hop transmission, on a set of PRBs configured by the base station. In another aspect, the at least one second node may detect transmission failure on the direct path and receive a retransmission grant from the first node, the grant configuring the at least one second node to schedule the retransmission in a subset of PRBs in the set of PRBs configured by the base station.

In another aspect, the at least one second node may transmit BSR to the first node, the first node may transmit remote buffer state report (rBSR) to the base station, and the base station may configure the set of PRBs based on the rBSR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 10A and 10B illustrate a first control plane protocol stack of the first path and a second control plane protocol stack of the second path.

FIGS. 15A and 15B illustrate a user plane configuration and a control plane configuration of the multipath multi-hop transmission.

DETAILED DESCRIPTION

Figure 1:
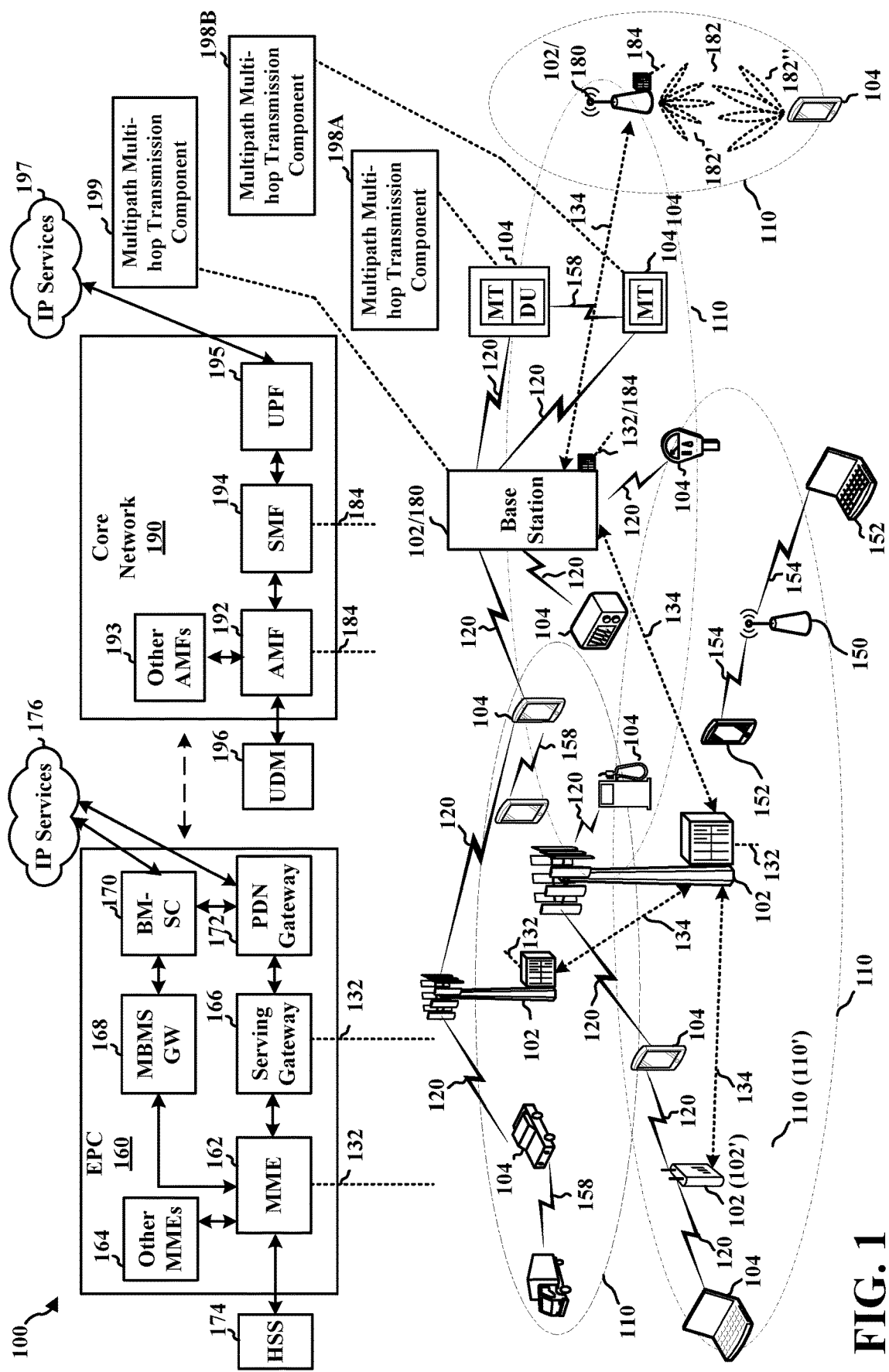
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a multipath multi-hop transmission component 198A configured to communicate data with at least one second node through at least one direct path associated with a single-hop transmission to the at least one second node, and communicate the data with the at least one second node through a relayed path associated with a multi-hop transmission including a base station. In certain aspects, the UE 104 may include a multipath multi-hop transmission component 198B configured to communicate data with a second node through a direct path associated with a single-hop transmission to the second node, and communicate the data with the second node through a relayed path associated with a multi-hop transmission including a base station. In certain aspects, the base station 102/180 may include a multipath multi-hop transmission component 199 configured to receive a first data packet from a data transmission source, the data transmission source being one of a first node or at least one second node, verify that the first data packet includes data for a data transmission target, the data transmission target being another of the first node or the at least one second node, and relay the data for the data transmission target in the first data packet. Although the following description may be focused on 5G NR, the concepts described herein may be applicable to other similar areas, such as LTE, LTE-A, CDMA, GSM, and other wireless technologies.

Figure 2:
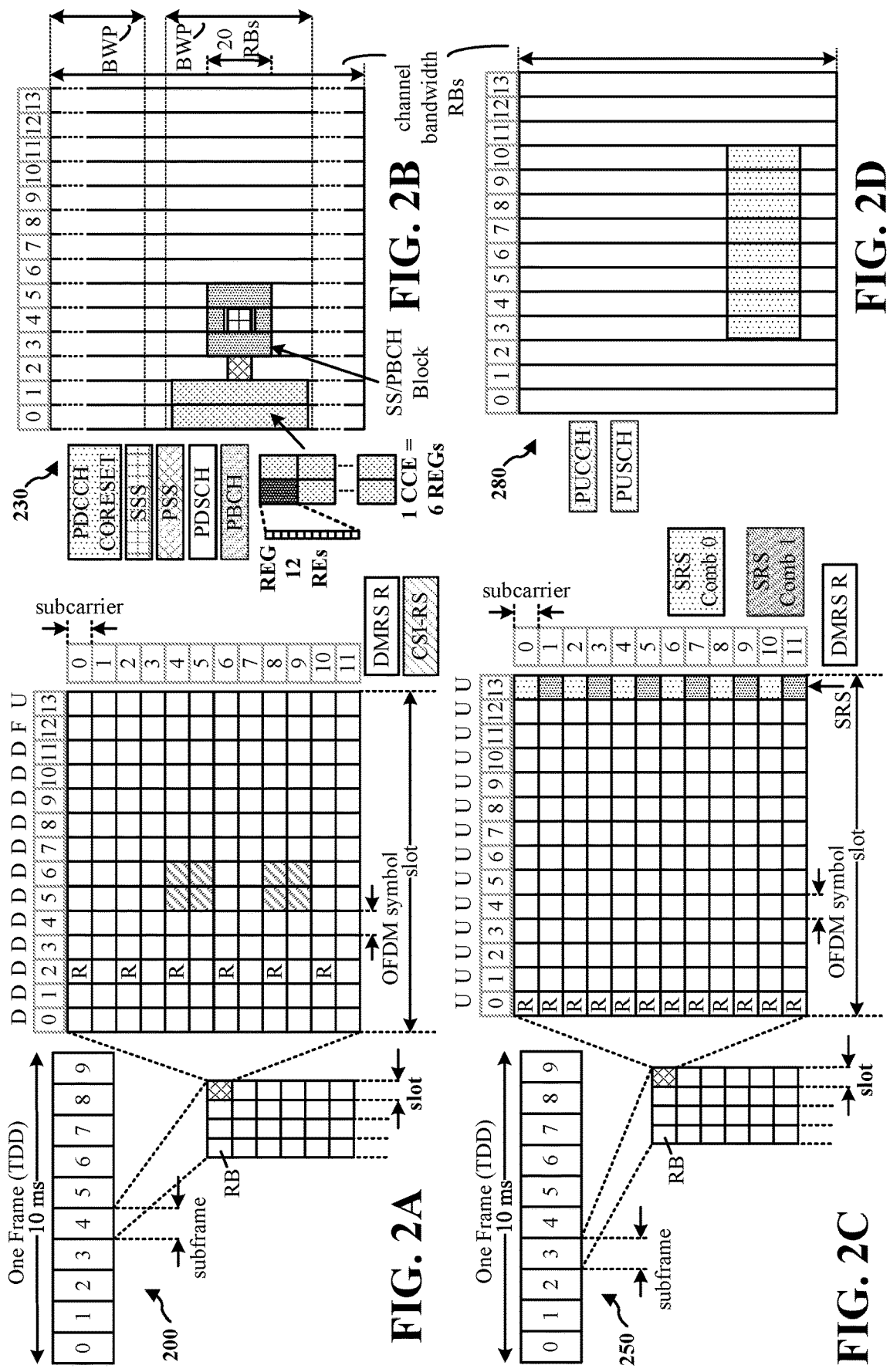
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology 1.1=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
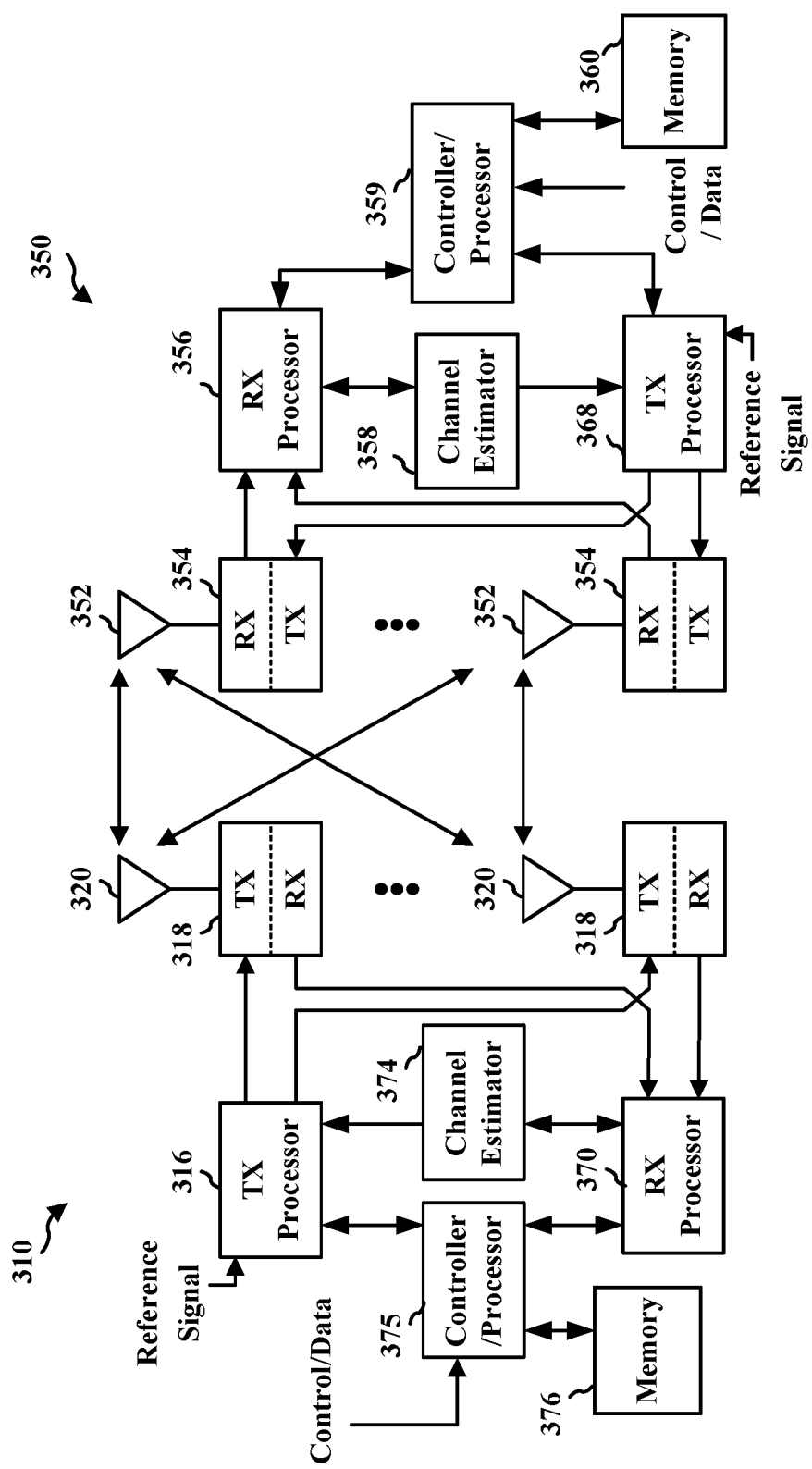
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198A and 198B of FIG. 1. At least one of the TX processor 316, the RX processor 370, and the controller/processor 375 may be configured to perform aspects in connection with 199 of FIG. 1.

Figure 4:
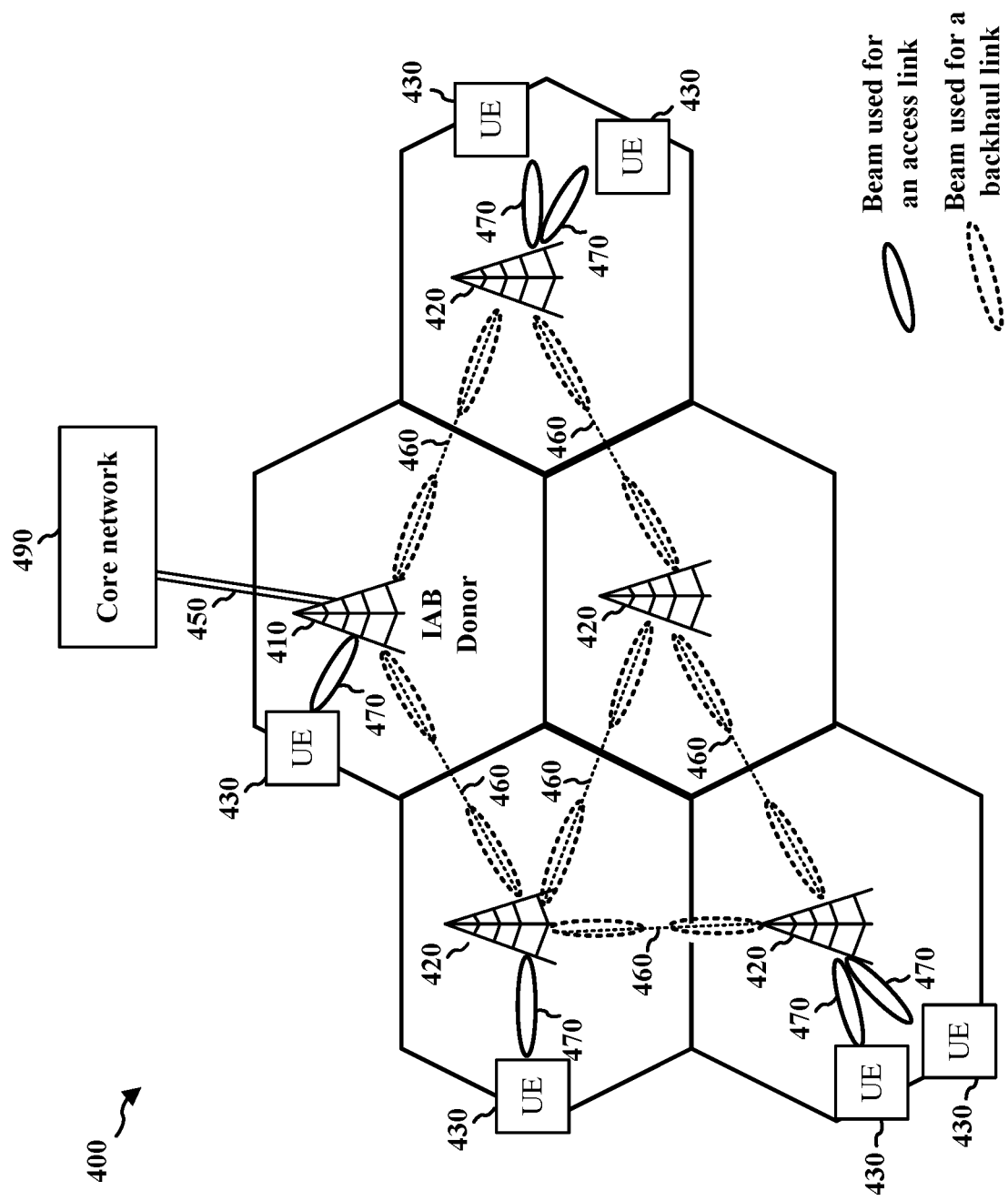
FIG. 4 is a diagram illustrating an IAB network.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to the core network, and IAB-nodes, which operate wirelessly and relay traffic to/from IAB-donors through one or more AN hops. The IAB ANs share resources between the access and backhaul. That is, the resources used for access communication between the ANs and ANs/UEs are also used for backhaul communication between the ANs.

The IAB network 400 may include an anchor node (that may be referred to herein as an "IAB-donor") 410 and access nodes (that may be referred to herein as "IAB-nodes") 420. The IAB-donor 410 may be a base station, such as a gNB or eNB, and may perform functions to control the IAB network 400. The IAB-nodes 420 may include L2 relay nodes, etc. Together, the IAB-donor 410 and the IAB-nodes 420 share resources to provide an access network and a backhaul network to core network 490. For example, resources may be shared between access links and backhaul links in the IAB network.

UEs 430 interface with the IAB-nodes 420 or the IAB-donor 410 through access links 470. The IAB-nodes 420 communicate with each other and with the IAB-donor 410 through backhaul links 460. The IAB-donor 410 is connected to the core network 490 via a wireline backhaul link 450. UEs 430 communicate with the core network by relaying messages through their respective access link 470 to the IAB network 400, which then may relay the message through backhaul links 460 to the IAB-donor 410 to communicate to the core network through the wireline backhaul link 450. Similarly, the core network may communicate with a UE 430 by sending a message to the IAB-donor 410 through the wireline backhaul link 450. The IAB-donor 410 sends the message through the IAB network 400 via backhaul links 460 to the IAB-node 420 connected to the UE 430, and the IAB-node 420 sends the message to the UE 430 via the access link 470.

Each IAB-node, e.g., including IAB-donor 410 and each IAB-node 420, may use a PCI value. The PCI value may serve as an identifier for that IAB-donor 410 or IAB-node 420. The PCI value may be used to determine a scrambling sequence that is applied to physical signals and/or channels that are transmitted by a particular IAB-node. For example, a PSS and/or the SSS transmitted by the respective IAB-donor 410 or IAB-node 420 may be scrambled using a scrambling sequence that is based on the PCI used by the respective IAB-node.

Figure 5:
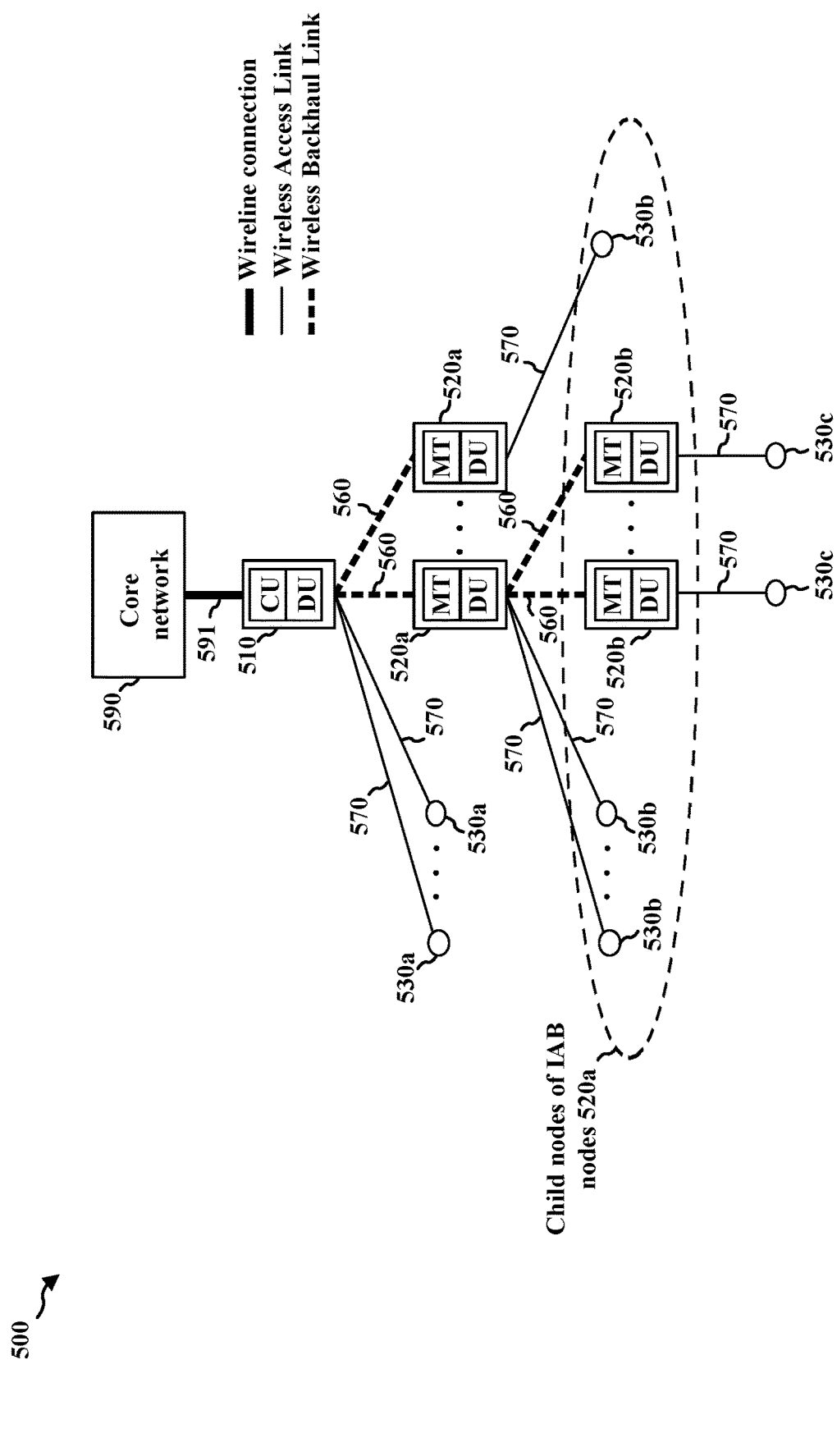
FIG. 5 illustrates a second diagram illustrating an IAB network and components thereof.

FIG. 5 illustrates a second diagram illustrating an IAB network 500 and components thereof. The IAB network 500 includes an IAB-donor 510 and IAB-nodes 520. The IAB-nodes, as well as the IAB-donor, may provide wireless access links to UEs 530.

The IAB-donor 510 may be considered a root node of the tree structure of the IAB network 500. The IAB-donor 510 may be connected to the core network 590 via a wired connection 591. The wired connection may include, e.g., a wireline fiber. The IAB-donor 510 may provide a connection to one or more IAB-nodes 520a. The IAB-nodes 520a may each be referred to as a child node of the IAB-donor 510. The IAB-donor 510 may also provide a connection to one or more UEs 530a, which may be referred to as a child UE of IAB-donor 510. The IAB-donor 510 may be connected to its child IAB-nodes 520a via backhaul links 560, and may be connected to the child UEs 530a via access links 570. The IAB-nodes 520a that are children nodes of IAB-donor 510 may also have IAB-nodes 520b and/or UEs 530b as children. For example, IAB-nodes 520b may further connect to child nodes and/or child UEs. FIG. 5 illustrates IAB-nodes 520b providing an access link to UEs 530c, respectively.

The IAB-donor 510 may include a CU and a DU. The central unit CU may provide control for the IAB-nodes 520a, 520b in the IAB network 500. For example, the CU may control the IAB network 500 through configuration. The CU may perform RRC/PDCP layer functions. The IAB-donor 510 further includes a DU that performs scheduling. For example, the DU may schedule resources for communication by the child IAB-nodes 520a and/or UEs 530a of the IAB-donor 510. The DU holds radio link control (RLC), media access control (MAC), a physical (PHY) layer functions.

The IAB-nodes 520a, 520b may include a mobile termination (MT) and a DU. The IAB-node is an L2 relay node. The MT of IAB-nodes 520a may operate as a scheduled node, scheduled similar to UEs 530a by the DU of the parent node, e.g., IAB-donor 510. The MT of IAB-node 520b may operate as a scheduled node of IAB-nodes 520a. The DU may schedule the child IAB-nodes 520b and UEs 530b of the IAB-nodes 520*a*. As an IAB-node may provide a connection to an IAB-node that in turn provides a connection for another IAB-node. The pattern of a parent IAB-node including a DU that schedules a child IAB-node/child UE may continue to more connections that illustrated in FIG. 5.

Figure 6:
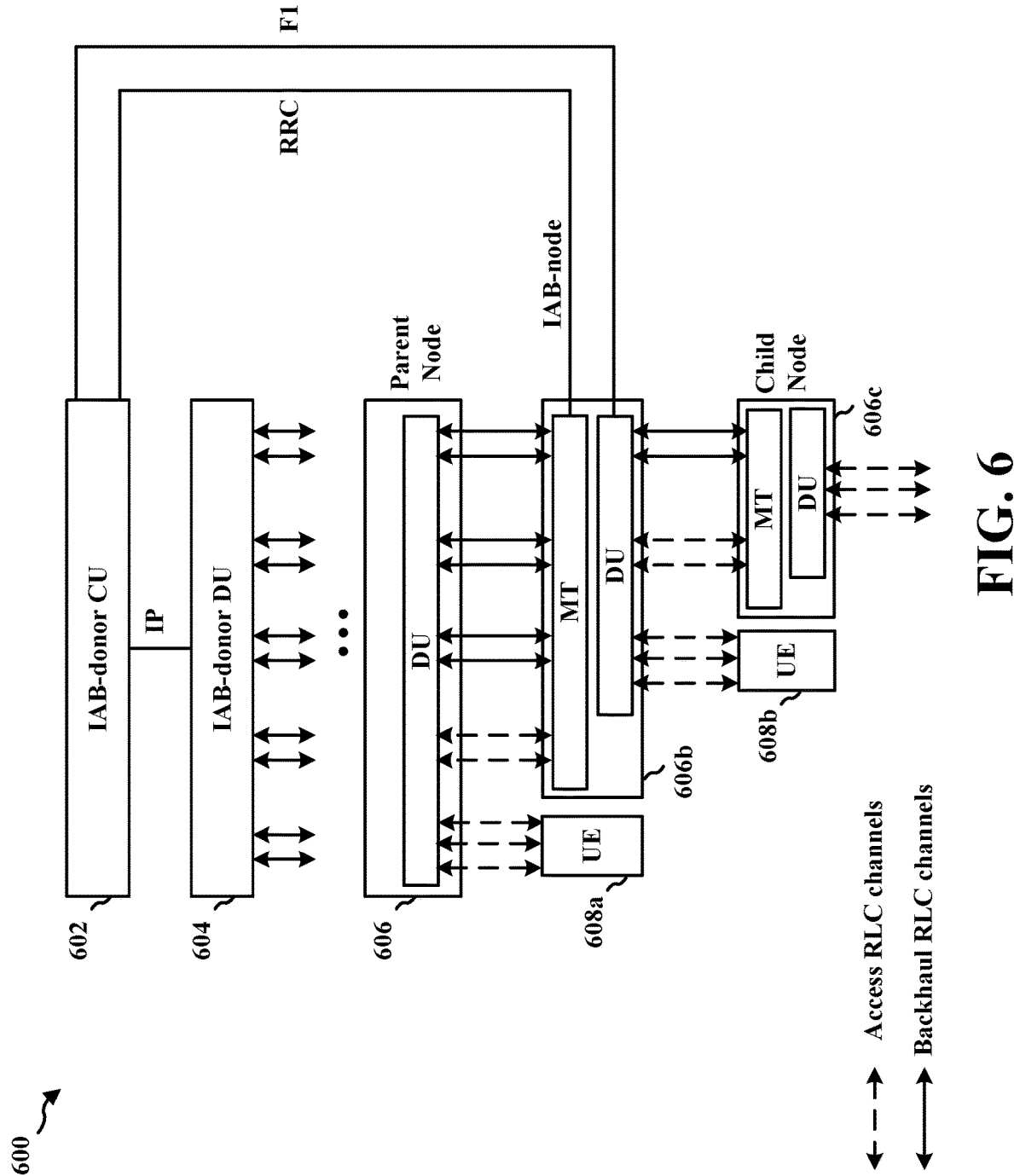
FIG. 6 is a diagram 600 illustrating RLC channels in an IAB network.

FIG. 6 is a diagram 600 illustrating RLC channels in an IAB network. As discussed supra, the IAB network provides both access network functionality and backhaul network functionality. The IAB network includes an IAB-donor with a CU 602 and DU 604. In order to provide access network functionality, IAB-nodes 606*a*, 606*b*, and 606*c* may communicate with other UEs 608*a* and 608*b* and/or MTs of other IAB ANs through access RLC channels. Thus, the IAB-nodes 606*a*, 606*b*, and 606*c* operate as access IAB-nodes for their child nodes or UEs. In order to provide backhaul network functionality, IAB-nodes 606*a*, 606*b*, and 606*c* may route traffic to other IAB-nodes (e.g., 606*a*, 606*b*, and 606*c*) through backhaul RLC channels (BH RLC CHs). Thus, the IAB-nodes 606*a*, 606*b*, and 606*c* operate as an intermediate IAB-node when backhauling traffic for other IAB-nodes. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic.

In industrial IoT (IIoT), a main use case may be connecting Programmable Logic Controller (PLC) and Sensors/Actuators (S/A) units. In some examples, the PLC and the S/A units may include a user equipment (UE) and the PLC-S/A connection may be configured as a UE-UE PC5 sidelink. In some aspects, the PLC and the S/A units may be IAB nodes. That is, the PLC may be a full IAB node including an IAB-DU and an IAB-MT, and the S/A unit may be an IAB unit including a single IAB-MT.

In some aspects, a multipath multi-hop transmission may be configured for the communication between the PLC IAB node and S/A IAB node. First, the PLC and the S/A IAB nodes may communicate via a direct UE-UTRAN (Uu) path. In some examples, when the direct communication may be subject to blocking or degradation of radio conditions, impacting the communication reliability between the PLC and the S/A IAB nodes, the multipath multi-hop transmission configuration may provide a backup or redundant path for data transmission or re-transmission. That is, the direct Uu path may experience too much blocking and/or radio link degradation which may not be acceptable by industrial applications, the PLC and the S/A IAB nodes may communicate via an alternate multi-hop path. In some aspects, the network may include a "donor" base station mounted to a ceiling (or otherwise has advantageous radio channels to all nodes in the network less susceptible to blocking or degradation) that may overview multiple PLCs. The donor base station (interchangeably referred to as the gNB) may be utilized to relay communication between the PLC and the S/A IAB nodes offering a backup multi-hop path between the PLC and the S/A IAB nodes, the multi-hop path being more reliable than the direct path. However, the multi-hop path including the donor base station may have increased latency from having multiple hops, e.g., 2 hops. Also, the multi-hop path including the donor base station may be capacity-limiting since a small number of nodes may communicate with the donor at the same time.

In some aspects, multipath multi-hop transmission may be configured to provide reliability and efficiency. In one example, the multipath multi-hop transmission may be configured to send the initial transmissions on the main path, e.g., direct single-hop path, and use the alternate multi-hop path upon transmission failure on the main path. In another example, low-latency high reliability traffic that is important may benefit from duplication and transmission on the direct and the two-hop path. In another example, the multipath multi-hop transmission may be configured to dynamically choose the path based on results of channel sensing. For example, the direct path may be chosen as often as possible.

Figures 7A, 7B:
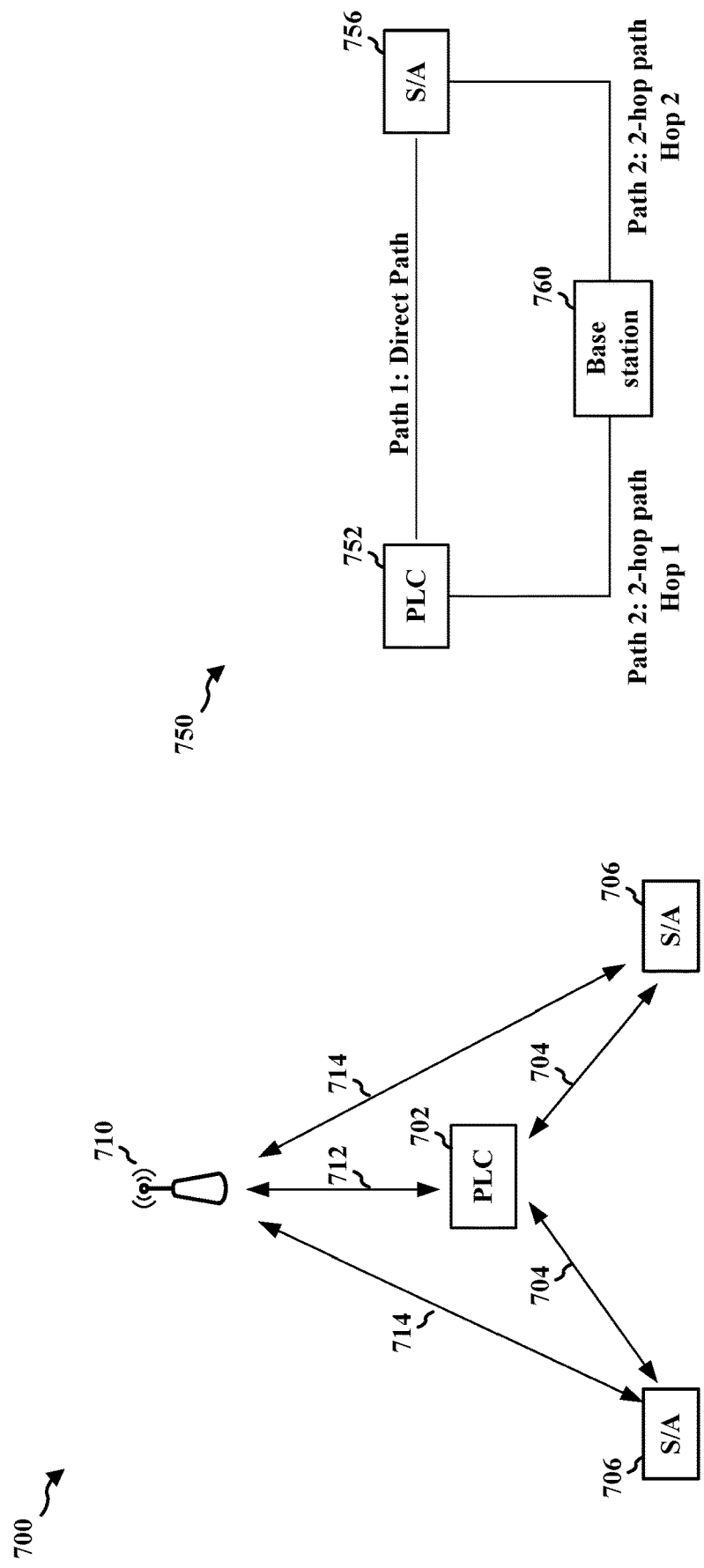
FIG. 7A is a diagram illustrating an example of an IIoT communication network.
FIG. 7B illustrates a multipath multi-hop transmission between the PLC and the S/A.

FIG. 7A is a diagram illustrating an example of an IIoT communication network 700. Industrial IoT (IIoT) is a branch of cellular technology in which UEs and BSs may be used to carry control data, measurement data, and/or the like between various industrial systems. For example, IIoT communication network may be used to control IIoT devices such as S/As, to exchange measurement information between other IIoT devices such as programmable logic controllers (PLCs) of a factory floor (for example, in a factory automation application), and/or the like. According to various aspects, IIoT devices discussed herein (e.g., sensors, actuators, PLCs, and/or the like) may be, include, or be included in, UEs such as UE 104 discussed above in connection with FIG. 1. In some aspects, an IIoT device may function as a small cell (e.g., a pico cell, femto cell, and/or the like), in which case the IIoT device may be, include, or be included in, a BS such as BS 102/180 discussed above in connection with FIG. 1.

The IIoT communication network 700 may include a PLC IAB node 702 (which is, itself, a type of IIoT device) that exchanges wireless communication 704 with S/A IAB nodes 706. The S/A IAB nodes 706 may include devices, machinery, sensors, other PLCs, and/or the like. In some aspects, the S/A IAB nodes 706 may be actuators or controllers associated with industrial equipment. The IIoT communication network 700 may include a base station 710 that exchanges communication 712 with the PLC IAB node 702 and/or communication 714 with one or more of the S/A IAB nodes 706. The base station 710 may be an IAB donor.

Configuring the PLC IAB node 702 to have a wireless connectivity to the S/A IAB nodes 706 may significantly reduce cost to reconfigure the connection (e.g., at a factory), and every wireless PLC IAB node 702 may communicate with the base station 710 through Uu interface and with the S/A IAB nodes 706 through the PC5 interface. The PLC IAB node 702 may be located close to S/A IAB nodes 706, and the base station 710 may be mounted on the ceiling of a factory, for maximum coverage.

The PLC IAB node 702 may provide commands in wireless signals to control the S/A IAB nodes 706 and/or control the industrial equipment connected to the S/A IAB nodes 706 by providing communication 704 to the S/A IAB nodes 706. The PLC IAB node 702 may send command and control instructions and receive information such as measurements from the IIoT device, e.g., a sensor. The PLC IAB node 702 may automate control of varied manufacturing processes, machines and control systems, e.g., of industrial electromechanical processes and devices (such as control of machinery on factory assembly lines, robotic devices, amusement rides, light fixtures), and/or chemical processes (such as polymer, pharmaceutical, food, and some beverage production facilities, power plants, oil refineries or other refineries, natural gas processing and biochemical plants, water and wastewater treatment, pollution control equipment, and/or the like), and/or the like. An IIoT communication network 700 may include any number of PLC IAB node 702, S/A IAB nodes 706, and/or the like used to perform an industrial objective. The IIoT communication network 700 illustrated in FIG. 7A is merely an example, and the embodiments of the current disclosure is not necessarily limited thereto.

FIG. 7B illustrates a multipath multi-hop transmission 750 between the PLC and the S/A. The multipath multi-hop transmission 750 may include a PLC IAB node 752, a S/A IAB node 756, and a base station 760. The multipath multi-hop transmission 750 may be configured with a dynamic and adaptive multi-path mode to achieve a high capacity with a low latency, by using a high reliability PLC-S/A traffic. That is, the direct path may not guarantee a continuous high reliability, e.g., 10-6 packet error rate (PER). Accordingly, the multipath multi-hop transmission 750 may be configured to perform a dynamic/adaptive switching between the direct hop and the two-hop path. In another aspect, an aggregation of transmissions across multiple paths may be configured for the multipath multi-hop transmission 750. For example, the multipath multi-hop transmission 750 may be configured to perform a redundancy handling, a removal of duplicate packets, or a failure reporting. In another aspect, the multipath multi-hop transmission 750 may provide a fast failure recovery. In one example, the multipath multi-hop transmission 750 may be configured to react to a blockage or a shadowing on the direct path. In another example, the multipath multi-hop transmission 750 may be configured with a fast switching with the constraint, e.g., switching time is less than survival time.

The multipath multi-hop transmission may include the PLC including a PLC application functionality and a complete IAB node functionality including an IAB-DU and an IAB-MT, and the S/A units including a S/A application functionality and a single IAB-MT. The multipath multi-hop transmission may have various IAB configurations regarding the network-assisted-path forwarding, e.g., at the donor base station, configuration and the packets that may be carried on the IAB network. In one aspect, the donor base station may be configured to perform an IP forwarding on an L3 layer at IAB-DU, e.g., user plane function (UPF) IP forwarding, and the IAB network may be configured to carry IP packets. In another aspect, the donor base station may be configured to perform a BAP forwarding on an L2 layer, and the IAB network may be configured to carry the IP packets. In another aspect, the donor base station may be configured to perform a BAP forwarding on an L2 layer, and the IAB network may be configured to carry BAP peer-to-peer (P2P) frames.

Figure 8A:
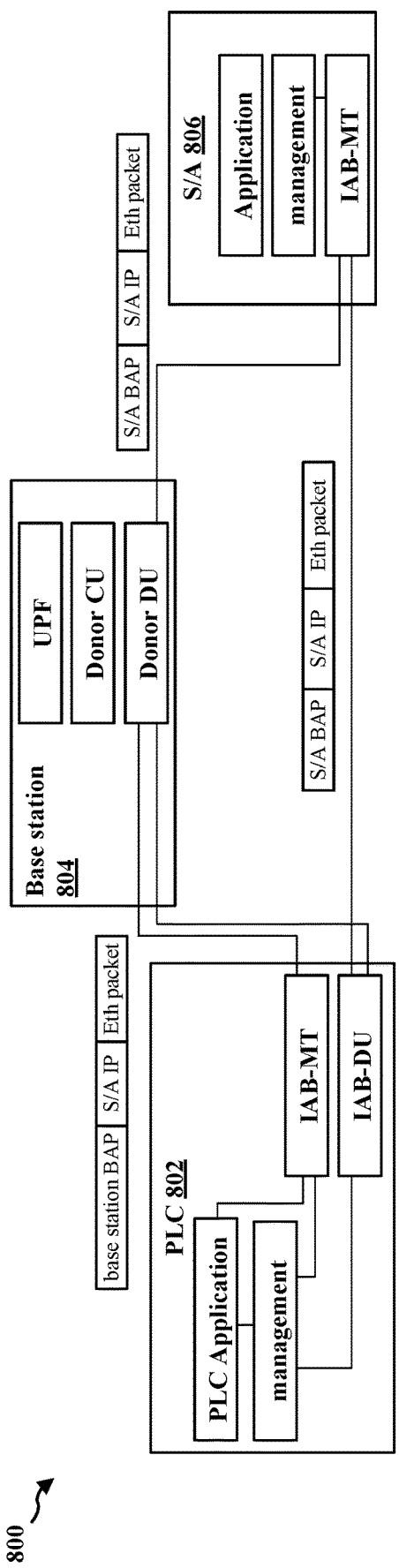
FIGS. 8A and 8B illustrate a user plane configuration and a control plane configuration of the multipath multi-hop transmission.
Figure 8B:
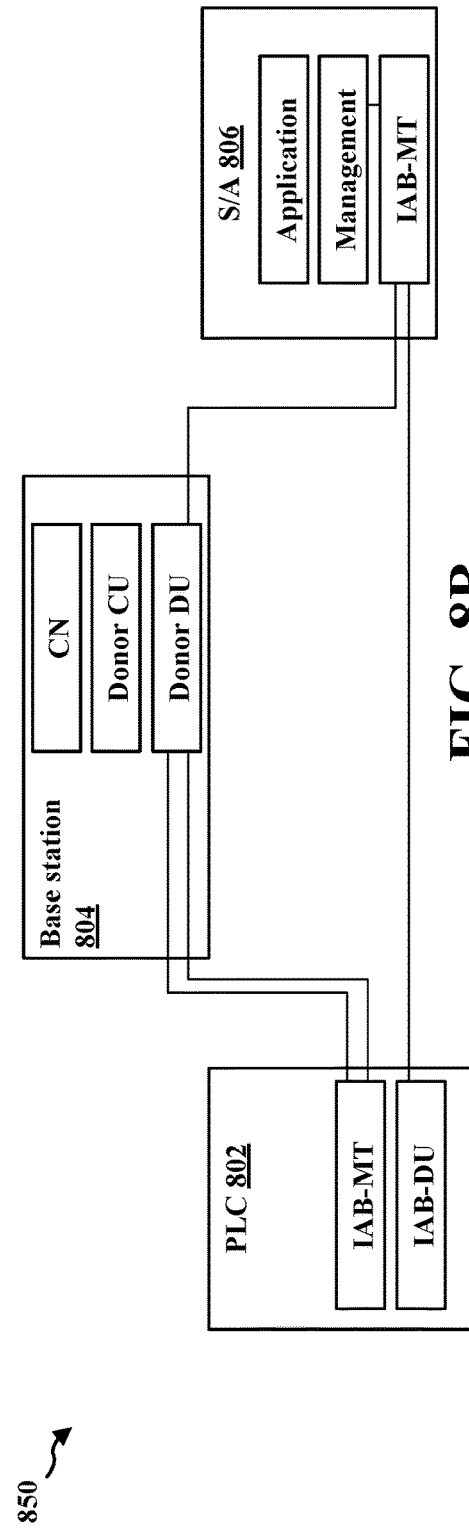

FIGS. 8A and 8B illustrate a user plane configuration 800 and a control plane configuration 850, respectively, of the multipath multi-hop transmission. The base station 804 including the donor-DU of the multipath multi-hop transmission may be configured to perform the UPF IP forwarding, that is the IP forwarding on the L3 layer at IAB-DU, and the IAB network may be configured to carry the IP packets. The multipath multi-hop transmission may have a high reliability by introducing path redundancy, i.e., the capability to route packets over redundant paths, for failure resilience. The redundant paths may include a first path, which may provide a direct communication between the IAB-DU of the PLC 802 and the IAB-MT of the S/A IAB node 806, and a second path including a two-hop communication path. The second path may include a communication between the IAB-MT at the PLC 802 and the IAB-MT at the S/A IAB node 806, aided by the donor-DU, e.g., a ceiling base station node. That is, the second path may include the base station 804 including a donor DU, and the second path may be associated with the multi-hop communication via the base station 804. The PLC 802 and the S/A IAB node 806 may include a management layer which may perform path control and management tasks such as routing, duplication, duplicate removal, packet reordering, etc. The PLC 802 may be connected to a full IAB node, e.g., including the IAB-DU and a IAB-MT, and the S/A IAB node 806 may be connected to the IAB-MT. The donor in this setup may include the ceiling mounted base station that may contain the CU-CP as shown in the control plane configuration 850. The PLC 802 and the S/A IAB node 806 may be connected to their respective IAB nodes via local user plane breakout possibly utilizing a management layer.

Figure 9A:
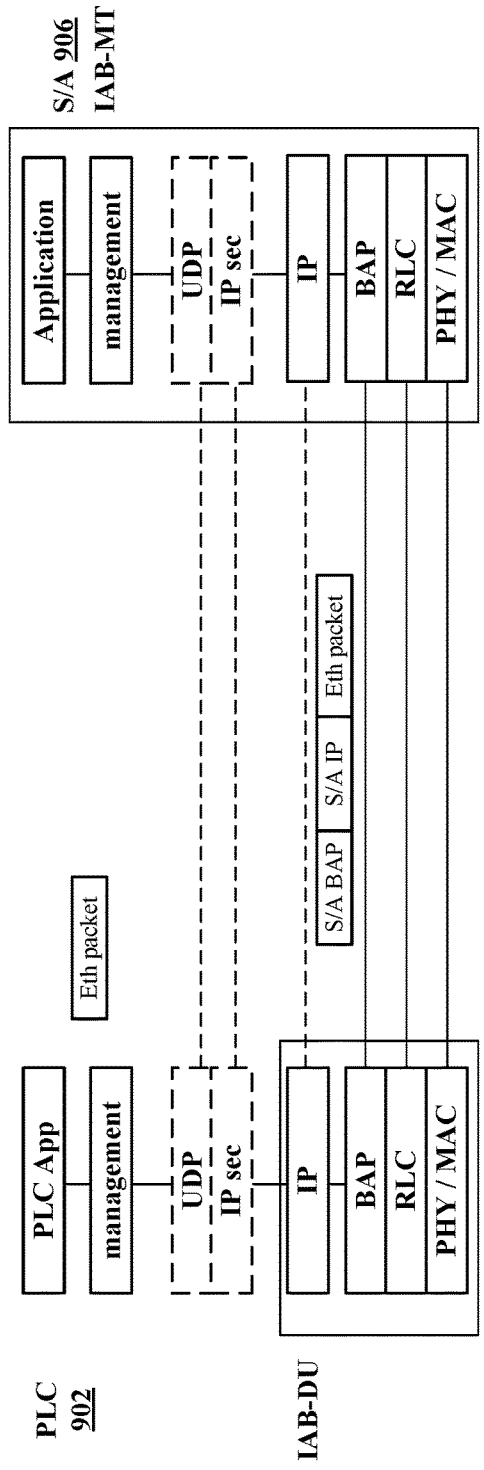
FIGS. 9A and 9B illustrate a first user plane protocol stack of the first path and a second user plane protocol stack of the second path.
Figure 9B:
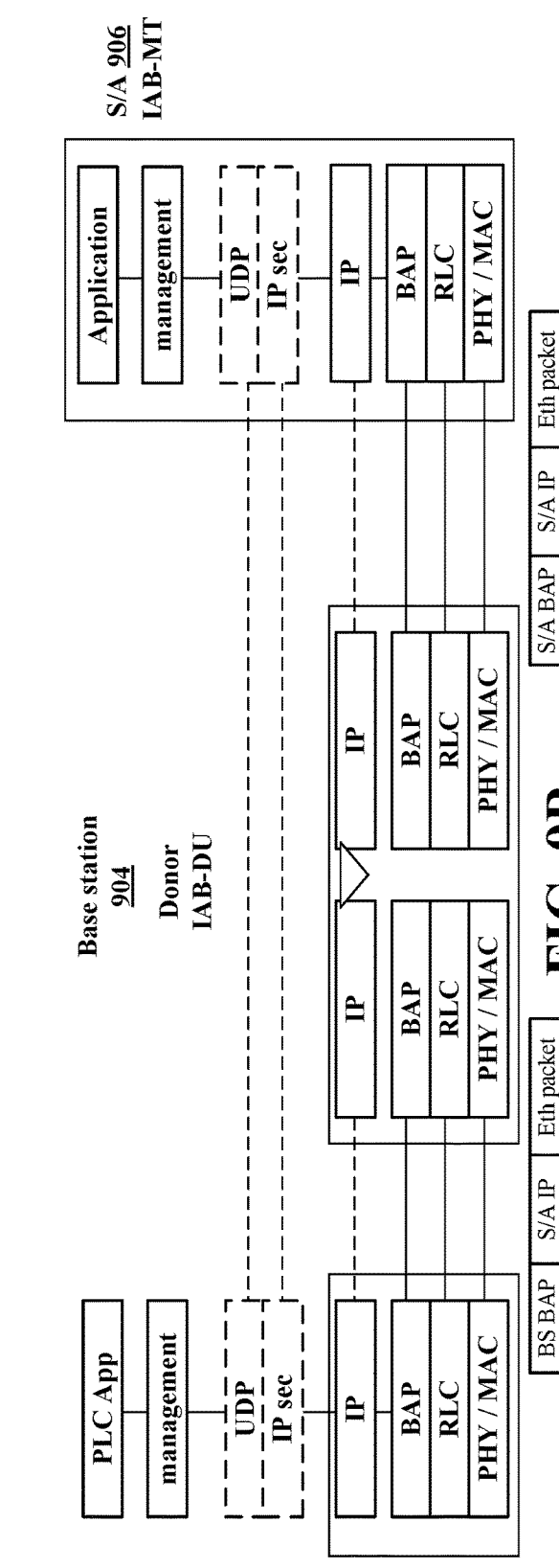

FIGS. 9A and 9B illustrate a first user plane protocol stack 900 of the first path and a second user plane protocol stack 950 of the second path. An Ethernet packet may be generated by the management layer of the PLC 902 and the S/A 906, and the Ethernet packet may be duplicated and communicated between the PLC 902 and the S/A 906. In the first path, the Ethernet packet may be generated by the application layer and it is sent over a dedicated RLC channel as an IP packet.

A user datagram protocol (UDP) header and an IP security (IPsec) header may be added to the Ethernet packet and the Ethernet packet may be routed like an operation, administration, and maintenance (OAM) traffic. Adding the IPsec header may add further security to the communication between the PLC 902 and the S/A 906 at the cost of complexity, latency, or header overhead. Furthermore, the IAB nodes of the S/A 906 may not have the capability to carry and route IP OAM traffics.

In some aspects, the IIoT network may be a private network, some tasks of upper layers may be optionally provided for a more efficient operation. That is, the UDP header and the IPsec header may not be added to the Ethernet packet to reduce the complexity, the network latency, and the header overhead. Accordingly, the IAB nodes of the S/A 906 that may not have the capability to carry and route IP OAM traffics may also be included to communicate with the PLC 902 directly and via the base station 904.

In the second path, the base station 904 may perform the IP forwarding at the donor node. That is, the IAB-DU node of the base station 904 may be configured to include an IP forwarding functionality to enable the local forwarding between the PLC 902 and the S/A 906. The second path may include two separate Uu interfaces. The first Uu interface may be configured between the PLC 902 and the donor DU of the base station 904, and the second Uu interface may be configured between the donor DU of the base station 904 and the S/A 906, and the two separate Uu interfaces may carry the traffic over two hops between the PLC 902 and the S/A 906. Here, the second path may not provide the PDCP status transfer, and IPsec may be provided. Furthermore, PDCP status transfer for switching or hand over may not be provided, so the application layer or the management layer may be configured to provide sequence numbering, duplicate detection, etc. The donor DU may use the IP header from the data packets for forwarding, and change the BAP header accordingly. That is, the donor DU may use the IP address of the data packets and change the BAP address to the BAP address of the destination for relaying the data packet to the destination.

FIGS. 10A and 10B illustrate a first control plane protocol stack 1000 of the first path and a second control plane protocol stack 1050 of the second path. The control plane of the IAB network may include two main components. The first component may be the RRC connection established by the donor of the base station 1004. That is, the base station 1004 may establish the RRC connections to the IAB-MT of the PLC 1002 and the IAB-MT of the S/A 1006. The RRC connection may carry both RRC configurations to the RRC layer of the IAB-MT of the PLC 1002 and the S/A 1006. The second component may be an F1-AP connection that starts from the base station 1004, e.g., the donor DU, and terminates at the IAB-DU of the PLC 1002. The F1-AP connection may enable the donor DU of the base station 1004 to configure the IAB-DU portion of the PLC 1002 via the F1-AP interface and configure the Uu interface, e.g., between the PLC 1002 and the S/A 1006, of the direct path on the RRC level.

Figure 11:
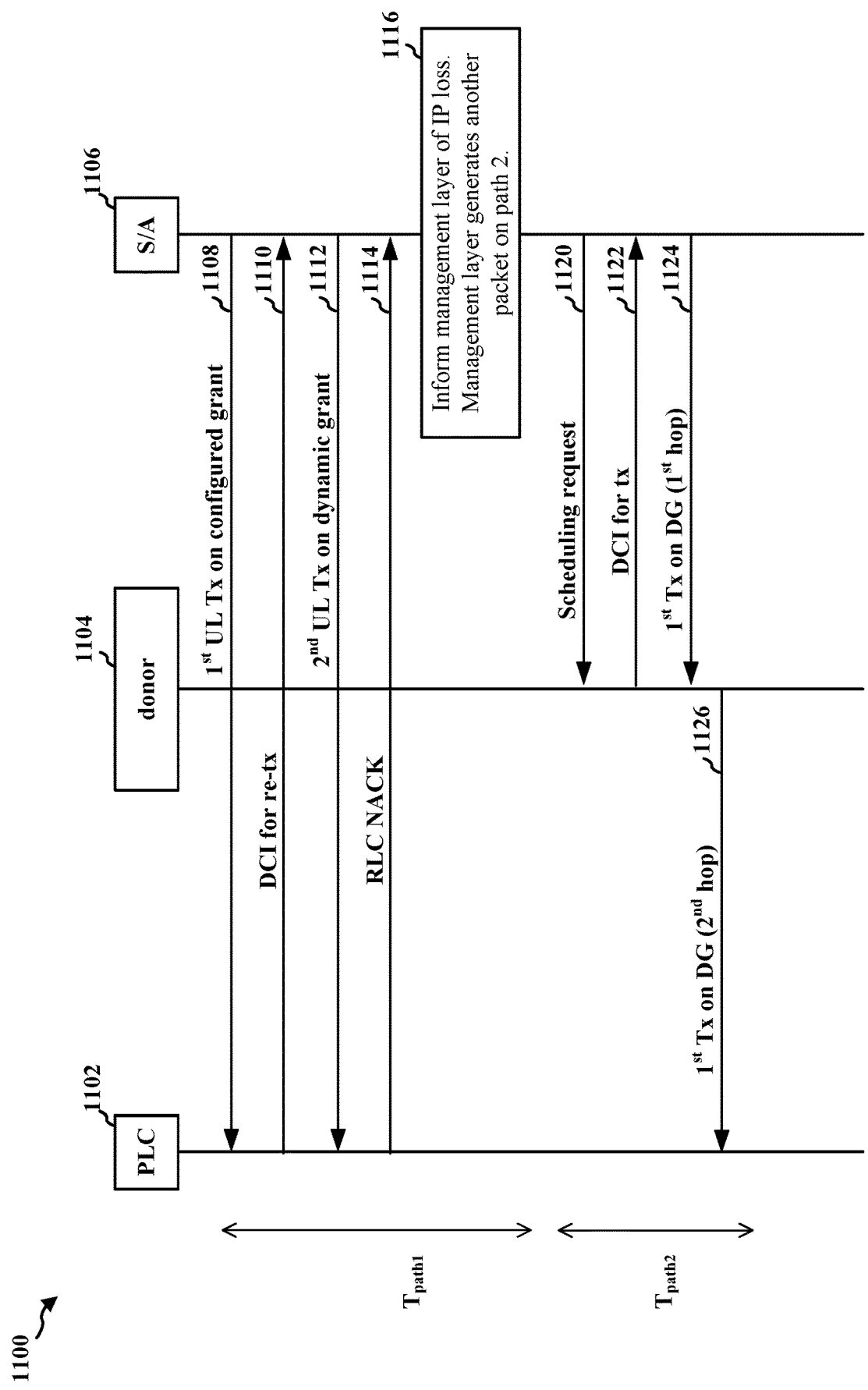
FIG. 11 illustrates an example of path switching.

FIG. 11 illustrates an example of path switching 1100. The path switching 1100 may include a PLC 1102, a donor 1104, and an S/A 1106. The S/A 1106 may attempt a retransmission of the UL data packet to the PLC 1102 using the donor 1104. At 1108, the S/A 1106 may transmit a first UL transmission on the configured grant (CG). If the first UL transmission of the UL data packet on the CG was not successfully received at the PLC 1102, the PLC 1102 may transmit DCI to the S/A 1106 indicating a retransmission of the UL data packet at 1110. At 1112, the S/A 1106 may transmit a second UL transmission of the UL data packet on a dynamic grant (DG) based on the DCI received at 1110. If the second UL transmission of the UL data packet on the DG was not successfully received at the PLC 1102, the PLC 1102 may transmit an RLC NACK to the S/A 1106 indicating a transmission failure at 1114.

The path may be switched after the transmission failure. At 1116, the S/A 1106 may inform the management layer of the IP loss, and the management layer of the S/A 1106 may generate a second UL data packet including the UL data to be transmitted on the second path via the donor 1104. At 1120, the S/A 1106 may send, to the donor 1104, a scheduling request (SR) to transmit the second UL data packet to the PLC 1102 via the donor 1104, and at 1122, the donor 1104 may transmit the DCI to the S/A 1106 to transmit the second UL data packet to the donor 1104. At 1124, the S/A 1106 may transmit the second data packet to the donor 1104 on the DG based on the DCI received at 1122. At 1126, the donor 1104 may relay, to the PLC 1102, the second data packet received from the S/A 1106 at 1124. Here, the overall latency of path switching may be represented by $T_{path1} + T_{path2}$.

The network assisted path, e.g., the second path, may be configured as a back-up once a transmission failure is detected on the direct path, e.g., the first path. In some aspects, the IAB setup may be a level 1 operation with a high path-switching latency. That is, the path switching may incur a number of signaling exchanges, e.g., 1120, 1122, etc., that may take too much time to accommodate communication with a relatively high reliability, e.g., the URLLC traffic. Therefore, the path switching on the IAB may not be expected to perform as a method of providing fast retransmissions within a few milliseconds of time. Particularly, one contributing component of path-switch latency is that the donor 1104 node may not be aware of the first transmission failure for a few S/As 1006. The bottleneck caused by such a latency may be based on the fact that the donor 1104 base station is not aware of the first transmission failure. Also, for the donor 1104 base station to understand the transmission failure status on the network, the donor 1104 base station may need to obtain an SR or BSR from all the nodes in the network to properly provision or assign the physical resources. For example, the donor 1104 base station may be expected to connect to a number of PLC 1102 units, e.g., three to five, and each PLC 1102 unit may be connected to multiple S/As 1006, e.g., 50-70 S/As. Therefore, the donor 1104 base station may not properly reserve the resources for possible transmission failures of a massive number of S/As 1006, e.g., 350 S/As, and overprovisioning may not be a practical solution. The donor 1104 DU may wait for the S/A 1006 SR/BSR to understand the buffered traffic, which may cause high latency.

In some aspects, the system may provide a low retransmission latency if an S/A 1006 can somehow start transmitting on the alternate path, e.g., the second path assisted by the base station, after the first transmission failure right away. In some aspects, the system may provide a low retransmission latency by providing a reservation-based configuration or an aggregate buffer status report (BSR) exchange. The two solutions provided above may bring down the latency, e.g., the response time, from up to 100 ms to a few ms, or 1 ms in extreme cases, which may be more appropriate for the URLLC traffic.

Figure 12A:
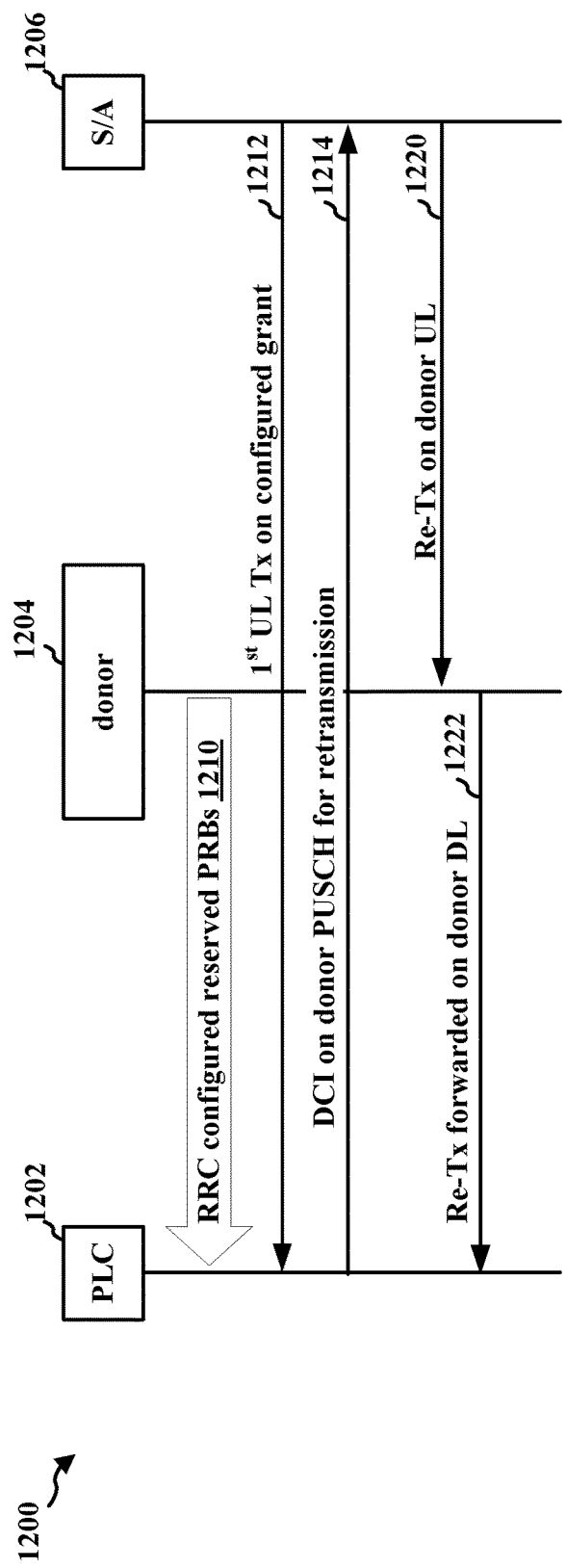
FIG. 12A illustrates a reservation-based retransmission.
Figure 12B:
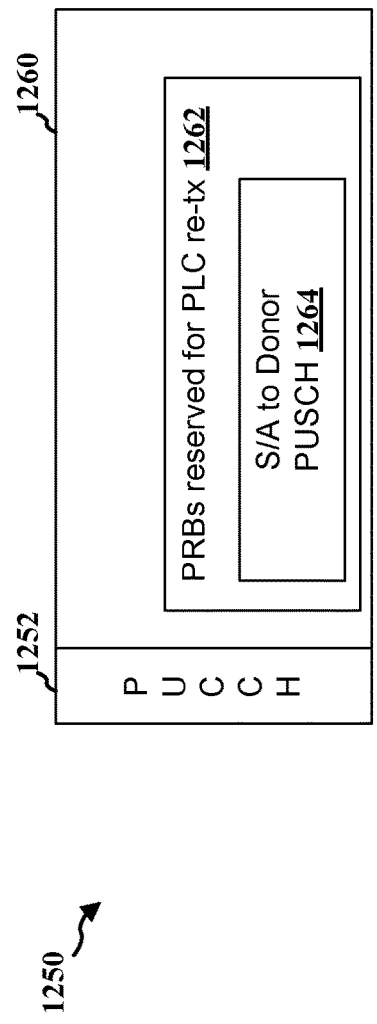
FIG. 12B illustrates an example of UL channels of the reservation-based retransmission.

FIG. 12A illustrates a reservation-based retransmission 1200. FIG. 12B illustrates an example of UL channels 1250 of the reservation-based retransmission. The UL channels 1250 may include a PUCCH 1252 and a PUSCH 1260. The reservation-based retransmission 1200 may include a PLC 1202, a donor 1204, and an S/A 1206. The donor may reserve re-transmitted resources, e.g., physical resources, for every PLC. Here, the number of PLCs in the network, e.g., five, may be far less than a number S/As in the network, e.g., 300-500 S/As. At 1210, the donor 1204 may transmit an RRC configuration reserving a set of PRBs for the retransmission for the PLC 1202. The RRC configuration at 1210 may reserve the PRBs 1262 of the PUSCH 1260 for retransmissions associated with the PLC 1202. At 1212, the S/A 1206 may transmit a first UL transmission of a data packet on a CG, and, in response to the first UL transmission being unsuccessfully received at the PLC 1202, at 1214, the PLC 1202 may transmit, to the S/A 1206, the DCI indicating the PRBs 1262 reserved for the retransmission for the PLC 1202. At 1220, the S/A 1206 may transmit the retransmission of the data packet in a subset of PRBs 1264 in the PRBs 1262 reserved for the retransmission for the PLC 1202, and the donor 1204 1204 may automatically understand that the data packet received in the subset of PRBs 1264 in the PRBs 1262 reserved for the retransmission for the PLC 1202 is associated with the PLC 1202. At 1222, the donor 1204 may relay or forward the retransmission of the data packet to the PLC 1202.

Figure 13:
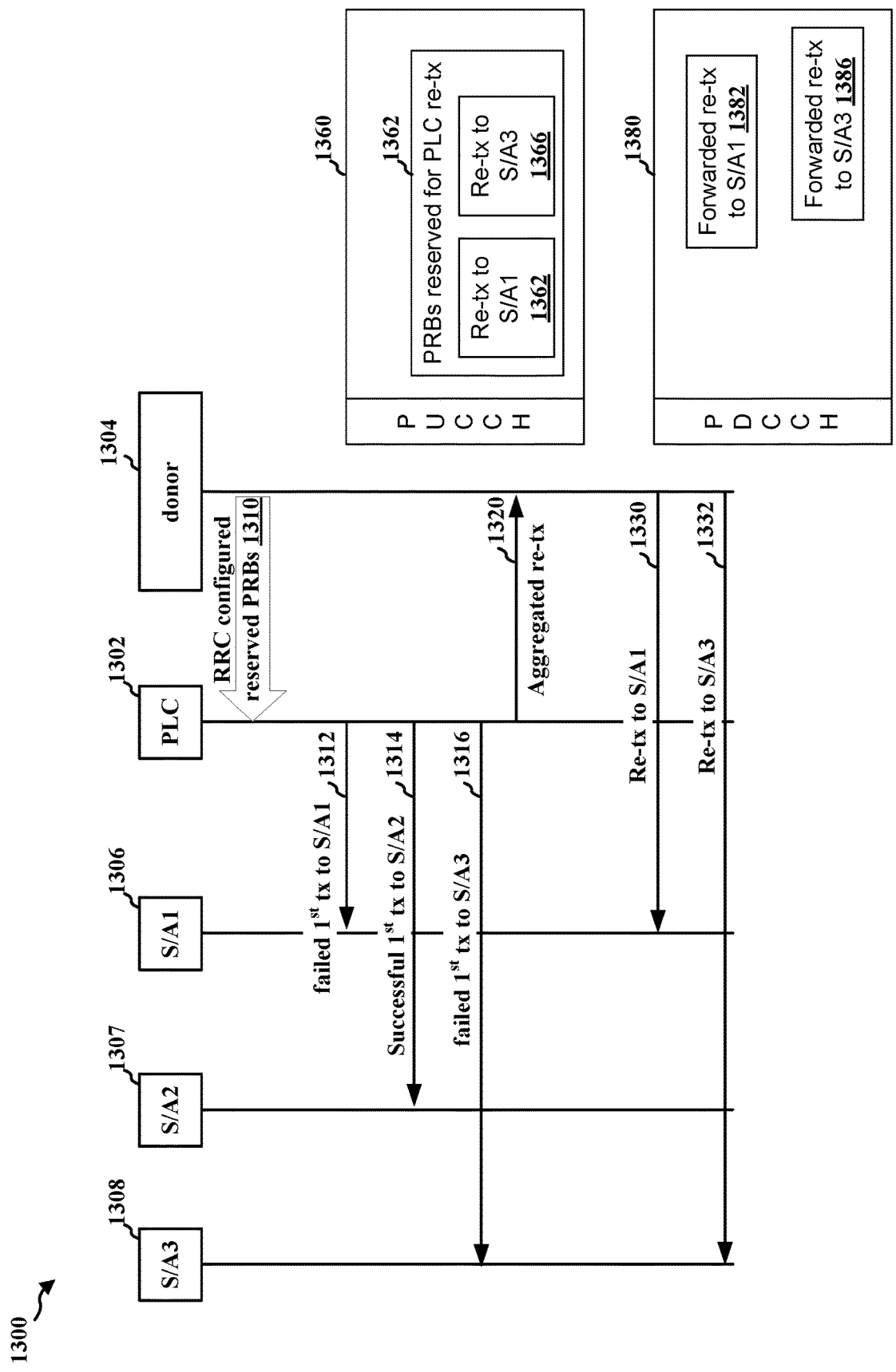
FIG. 13 illustrates a reservation-based retransmission including a cross IAB node scheduling.

FIG. 13 illustrates a reservation-based retransmission 1300 including a cross IAB node scheduling. The retransmission 1300 may include a PLC 1302, a donor 1304, a first S/A 1306, a second S/A 1307, and a third S/A 1308. In a DL traffic from the PLC's perspective, e.g., DL transmission from the PLC to the S/A, the PLC may use the reserved resources, e.g., reserved by the donor base station, (here, the DL traffic from the PLC's perspective may be considered an uplink transmitting from the perspective of the donor) to aggregate all PDUs that failed initial transmissions and send them to donor base station to relay them. In UL traffic, e.g., from the S/A to the PLC (which may be a UL from the perspective of the S/A), the donor base station may reserve the UL (from the donor base station's perspective) resources for every PLC, furthermore, on these reserved resources, the PLC may be allowed to schedule retransmissions from the S/A. We may refer such configuration as the cross-IAB node scheduling, which may be considered as an extension for cross carrier scheduling in CA.

At 1310, the donor 1304 may transmit an RRC configuration reserving a set of PRBs 1362 for the retransmission for the PLC 1302. The PLC may transmit data packets to the first S/A, the second S/A, and the third S/A. Here, the first transmission to the first S/A at 1312 and the first transmission to the third S/A at 1316 may be unsuccessful, while the first transmission to the second S/A at 1314 may be successful. Accordingly, the PLC may try retransmission of the first transmission to the first S/A and the first transmission to the third S/A. At 1320, the PLC may aggregate the retransmission of the data packets to the first S/A and the second S/A. Here, the set of PRBs 1362 for the first retransmission to the first S/A and the second retransmission 1366 to the third S/A may be transmitted to the donor in the set of PRBs 1362 for the retransmission for the PLC 1302 in the PUSCH 1360. The donor may receive the set of PRBs 1362 for the first retransmission to the first S/A and the second retransmission 1366 to the third S/A in the set of PRBs 1362 for the retransmission for the PLC 1302 in the PUSCH 1360, and forward the first retransmission to the first S/A at 1330 and the second retransmission to the third S/A at 1332. Here, the forwarded first retransmission 1382 to the first S/A and the forwarded second retransmission 1386 to the third S/A may be transmitted in the PDSCH 1380.

In some aspects, the IAB network may include an aggregate BSR exchange to support low latency retransmission. That is, instead of the donor base station to perform the static resource reservation, each PLC may be configured to send a MAC-CE between Tx and re-transmitted slots, the MAC-CE including a remote BSR (rBSR) indicating the estimated BSR of traffic patterns from the S/As and transmission failures, and the donor base station may reserve the physical resources for retransmission for each PLC based on the MAC-CE received from each of the PLC. The rBSR may overcome the issue of the donor base station not understanding the BSR status of all S/As. Since it is not practical nor scalable to wait for all of the SR or the BSR from a large number S/As, and an aggregated rBSR may be exchanged by a few PLCs. The donor may receive the rBSR indicating the estimated BSRs of the S/As that the donor base station may estimate failed number of initial transmission from the corresponding S/As.

Figures 14A, 14B:
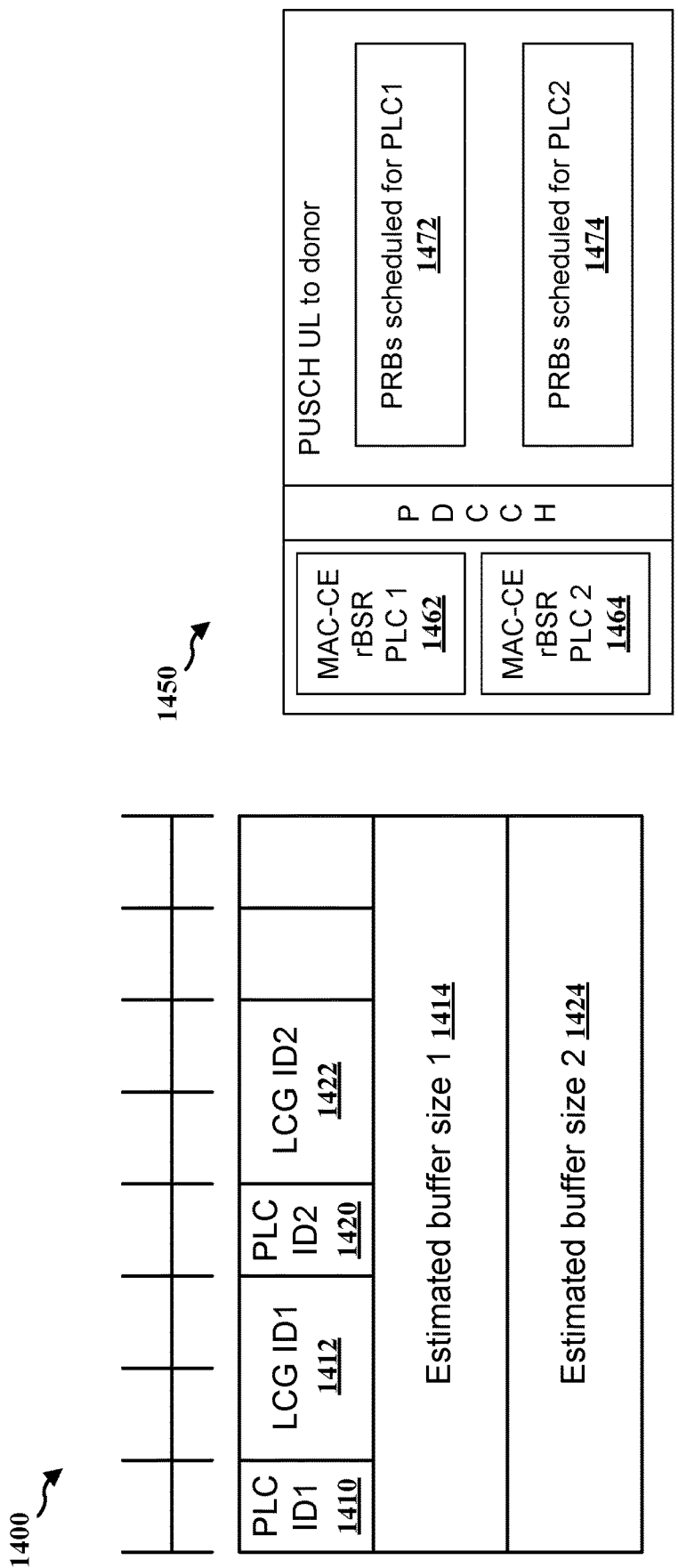
FIG. 14A illustrates an example MAC-CE for reporting a remote buffer state report (rBSR) to report the aggregate BSR to the donor base station.
FIG. 14B illustrates example MAC-CEs including the rBSR.

FIG. 14A illustrates an example MAC-CE 1400 for reporting the rBSR to report the aggregate BSR to the donor base station. For example, the MAC-CE 1400 may include a first PLC ID 1410 and a first logical channel group (LCG) 1412, and a second PLC ID 1420 and a second LCG 1422. The MAC-CE 1400 may include a first estimated buffer size 1414 and a second estimated buffer size 1424.

FIG. 14B illustrates example MAC-CEs 1450 including the rBSR. The first PLC may transmit a first MAC-CE indicating the first rBSR 1462 of the first PLC and the second PLC may transmit a second MAC-CE indicating the second rBSR 1464 of the second PLC. Both of the UL, e.g., data transmission from the S/A to the PLC, and the DL, e.g., data transmission from the PLC to the S/A, may rely on the BSR exchange round between the first transmission and the retransmission between the PLC and the donor. This may inform the donor base station of the proper physical resources to allocate for each PLC in DL and S/A in UL for retransmissions. That is, the donor base station may schedule the first set of PRBs 1472 for the first PLC and the second set of PRBs 1474 for the second PLC based on the first rBSR 1462 and the second rBSR 1464.

In one aspect, in the DL, e.g., the data transmission from the PLC to the S/A, the PLC may transmit send its BSR to the donor base station indicating how much traffic may be retransmitted. That is, the PLC may periodically exchange the estimated BSR status of the failed transmissions from the S/As using the rBSR. The donor base station may provision or schedule the UL and DL resources for each hop accordingly. For example, the donor base station may schedule the first PRBs 1472 for the first PLC based on the first MAC-CE 1462 received from the first PLC and the second PRBs 1474 for the second PLC based on the second MAC-CE 1464 received from the second PLC.

In another aspect, in the UL, e.g., the data transmission from the S/A to the PLC, instead of waiting for each S/A to send a BSR, the receiver node (PLC in this case) may be configured to estimate the buffer status of each S/A transmitter, and transmit, to the donor base station, the rBSR message indicating the estimated buffer status of each S/A transmitter. The donor may be configured to provision or schedule the physical resources for the retransmissions for the S/As on the network via the second path including the donor base station without exhausting resources to explicitly obtain every S/A BSR.

FIGS. 15A and 15B illustrate a user plane configuration 1500 and a control plane configuration 1550 of the multipath multi-hop transmission. Here, to support the second path including a multi-hop transmission, the direction of the data transmission may be transmitted from the PLC 1502 to the donor base station 1504, and further forwarded to the S/A 1506 or from the S/A 1506 to the donor base station 1504 and further forwarded to the PLC 1502. Accordingly, the direction of the data transmission may not match with the IAB hierarchy. To support the hierarchy mismatch, the local DU/MT breakout may be scheduled as an IAB integration step to configure the architecture via the RRC. In one aspect, for the user plane configuration 1500, the MT local breakout may be provided to allow the PLC 1502 application to transmit the data traffic or packet on the second path, e.g., from the PLC 1502 to the base station 1504 to the S/A 1506, and vice versa to allow the S/A 1506 to communicate with the PLC 1502. In another aspect, the DU local breakout may be provided to allow the PLC 1502 application to transmit the local traffic to the S/A 1506 on the direct path via the DU. The local breakout may break the CP or traditional hierarchy of the IAB network.

In another aspect, the control plane configuration 1550 may carry a traditional F1-AC or RRC connection between a Donor DU+CU and IAB DU+IAB MT at the PLC 1502 and the IAB-MT at the S/A 1506. The CP may have a proper hierarchy that flows from the donor to the IAB nodes with no change from existing baseline.

Figure 16:
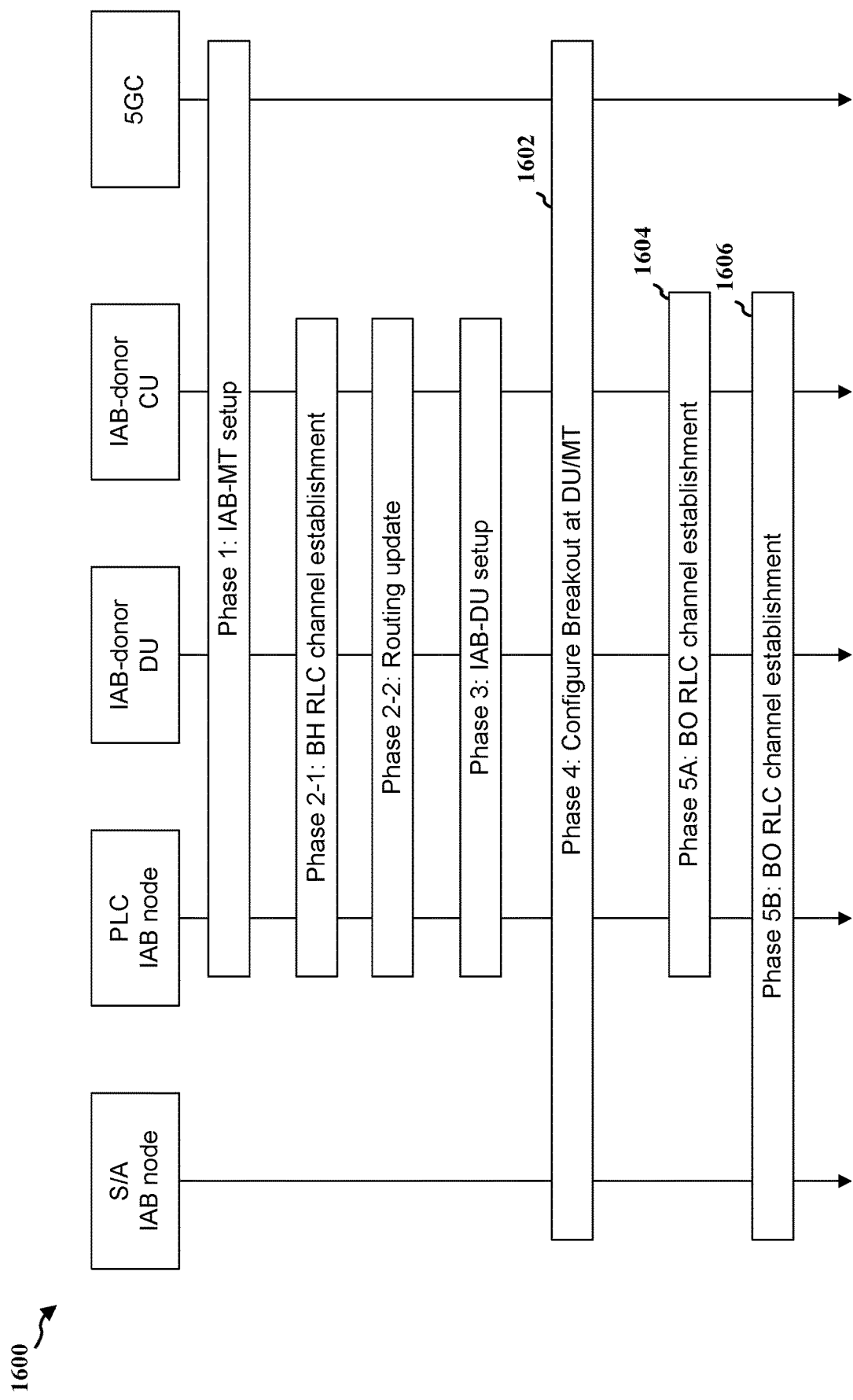
FIG. 16 illustrates a PLC-S/A node integration for a method of wireless communication.

FIG. 16 illustrates a PLC-S/A node integration 1600 for a method of wireless communication. At 1602, the breakout at the IAB-DU MT may be configured between the S/A IAB node, the PLC IAB node, the donor-DU and CU, and the 5G core network. At 1604, the breakout RLC channel establishment may be configured between the PLC IAB node and the donor-DU and CU. At 1606, the breakout RLC channel establishment may be configured between the S/A IAB node, the PLC IAB node, the donor-DU and CU to support the hierarchy mismatch in the multipath multi-hop transmission.

Figure 17:
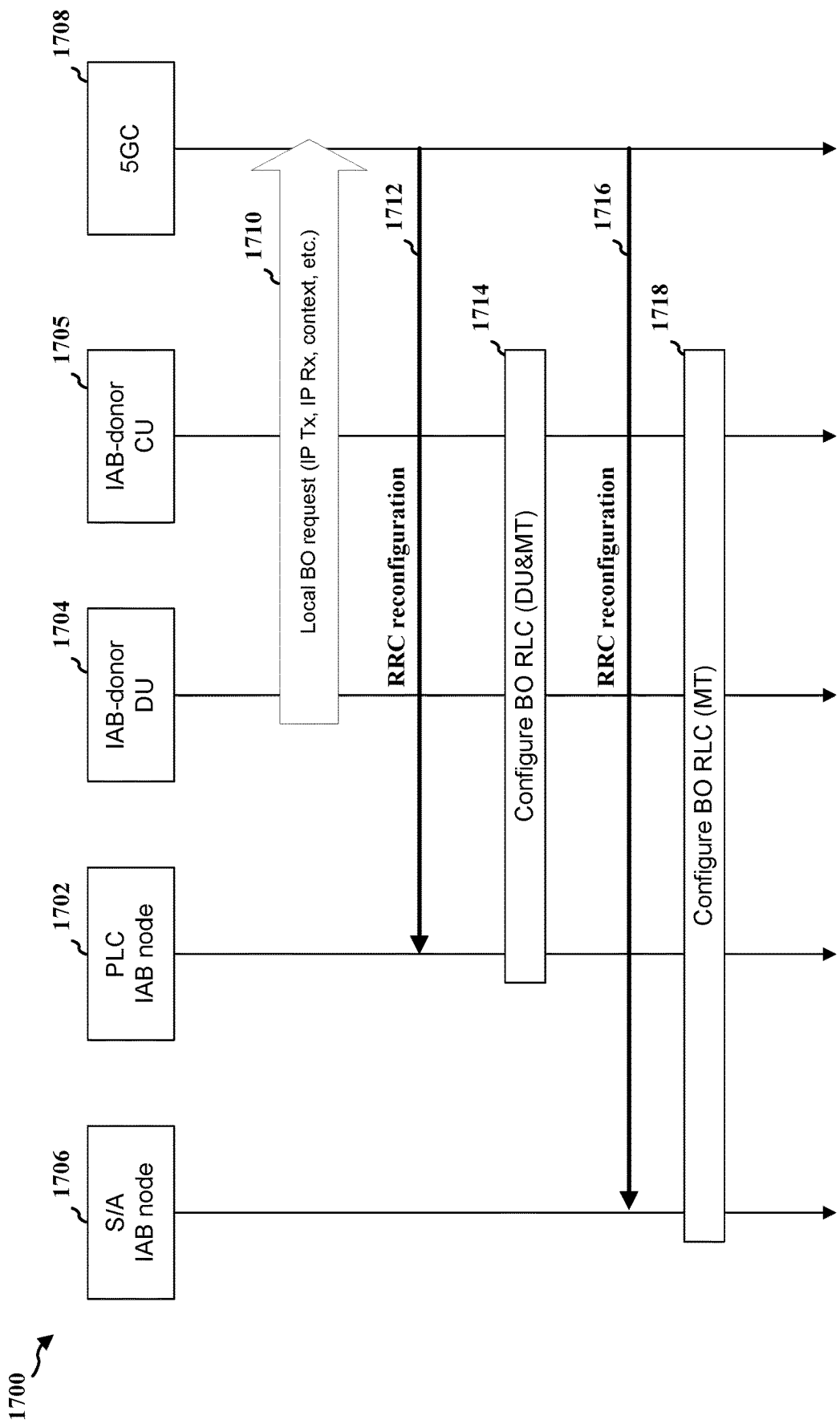
FIG. 17 illustrates a configuration of a breakout RLC channel.

FIG. 17 illustrates a configuration 1700 of a breakout RLC channel. The configuration 1700 may include a PLC 1702, an IAB-donor DU 1704 and CU 1705, an S/A 1706, and a 5G core network 1708. At 1710, the IAB-donor DU 1704 may transmit a local breakout request to the 5G core network 1708. At 1712, the 5G core network 1708 may transmit an RRC reconfiguration to the PLC 1702, and at 1714, the PLC 1702 may configure the breakout RLC connection for the DU and the MT of the PLC 1702 with the IAB-donor CU 1705. At 1716, the 5G core network 1708 may transmit an RRC reconfiguration to the S/A 1706, and at 1718, the S/A 1706 may configure the breakout RLC connection for the MT of the S/A 1706 with the IAB-donor CU 1705.

Figure 18A:
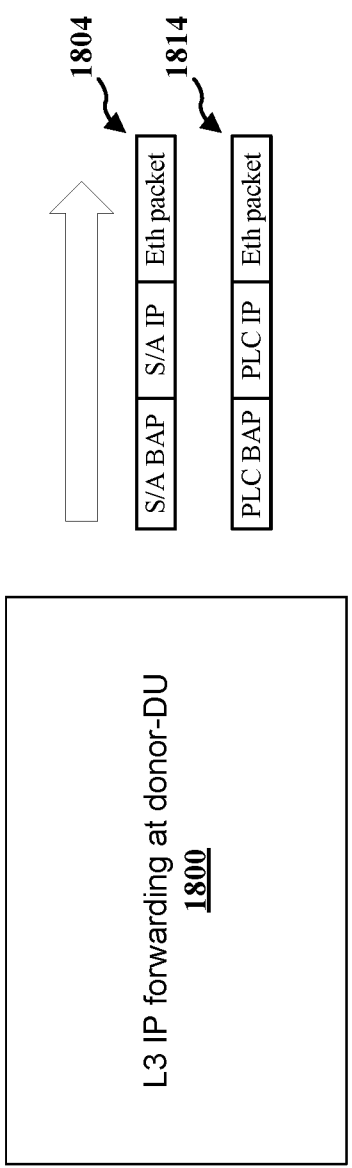
FIGS. 18A and 18B illustrate examples of forwarding the data transmissions at the donor DU.
Figure 18B:
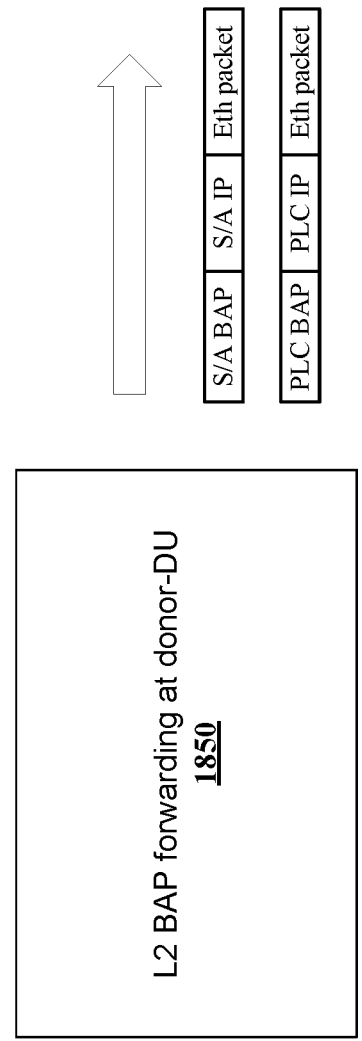

FIGS. 18A and 18B illustrate examples of forwarding the data transmissions at the donor DU. FIG. 18A illustrates the donor-DU 1800 configured with the L3 IP forwarding, and FIG. 18B illustrates the donor-DU 1850 configured with the L2 BAP forwarding. The donor-DU 1800 configured with the L3 IP forwarding may inspect the IP header of the incoming packet 1802 or 1812, determine that it is to be locally forwarded, and replace the BAP header of the incoming packet 1802 or 1812 with a new BAP to generate an outgoing packet 1804 or 1814. In one aspect, for the DL transmission, e.g., the data transmission from the PLC to the S/A, the donor-DU 1850 may receive the incoming packet 1802 and replace the base station BAP with the S/A BAP address in the destination field to generate the outgoing packet 1804. In another aspect, for the UL transmission, e.g., the data transmission from the S/A to the PLC, the donor-DU 1850 may receive the incoming packet 1812 and replace the base station BAP with the PLC BAP address in the destination field to generate the outgoing packet 1814.

FIG. 18B illustrates the donor-DU 1850 configured with L2 BAP forwarding. The original packet 1852 or 1862 transmitted by the PLC or the S/A may have the destination BAP address set, e.g., the S/A or the PLC in the BAP header. The donor-DU 1850 may not need to change the BAP header, and the donor-DU 1850 may act as a normal IAB node and forward the original packet 1852 or 1862 according to the BAP destination address/BAP path fields present in the BAP header.

Figure 19:
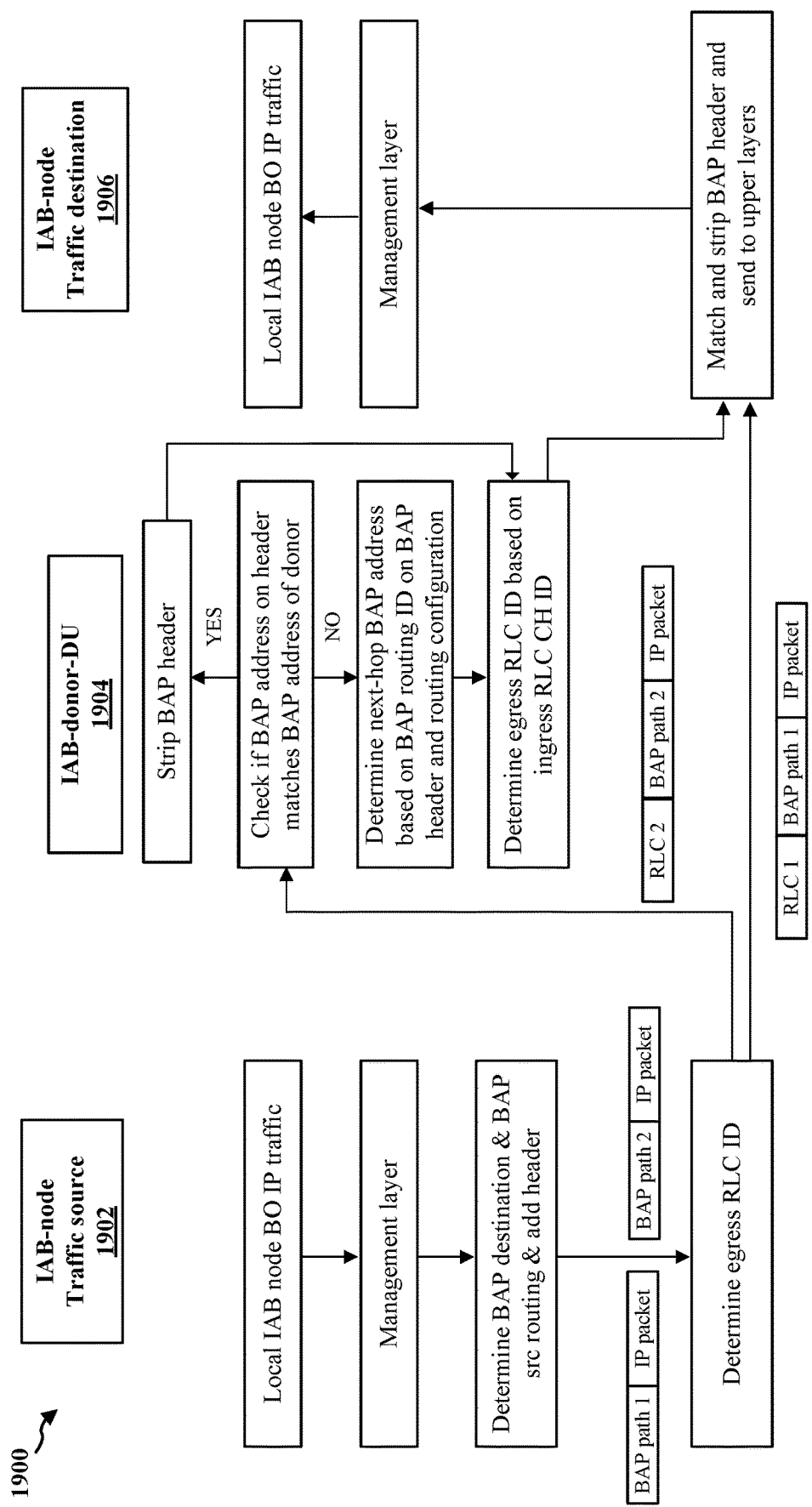
FIG. 19 illustrates a diagram including the IAB-node traffic source and the IAB-donor-DU with the modified functionality.

In some aspects, the L2 BAP forwarding at the donor-DU instead of the IP forwarding may reduce the overhead and make use of IAB standard capabilities. To support the L2 BAP forwarding, the donor behavior may be revised to include modified functionality. FIG. 19 illustrates a diagram 1900 including the IAB-node traffic source 1902 and the IAB-donor-DU 1904 with the modified functionality. The IAB-node traffic source 1902 may have a local IAB node breakout IP traffic to be transmitted to the IAB-node traffic destination 1906. The management layer of the IAB-node traffic source 1902 may determine the path and add internal tag to inform the lower layer of the path chosen by the management layer. Based on the path chosen by the management layer, the IAB node may determine the BAP destination, perform BAP source routing, and add BAP header. In one example, if the management layer selected the first path, the BAP header of the first path is added to the IP packet. In another example, if the management layer selected the second path, the BAP header of the second path is added to the IP packet. The IAB node traffic source may determine the egress RLC ID and add the corresponding RLC header to the IP packet to generate a data packet.

In one aspect, the management layer of the IAB-node traffic source 1902 may select the second path, and the data packet may be transmitted to the IAB-donor-DU 1904. The IAB-donor-DU 1904 may first check if the BAP address on the header of the received data packet matches the BAP address of the IAB-donor-DU 1904. If the BAP address on the header of the received data packet matches the BAP address of the IAB-donor-DU 1904, the IAB-donor-DU 1904 may strip the BAP header. If the BAP address on the header of the received data packet does not match the BAP address of the IAB-donor-DU 1904, the IAB-donor-DU 1904 may determine the next-hop BAP address based on the BAP routing ID on BAP header and routing configuration. The IAB-donor-DU 1904 may determine the egress RLC ID based on the ingress RLC channel ID. Here, since the IAB-node traffic source 1902 initially configured the data packet for the IAB-node traffic destination 1906, the IAB-donor-DU 1904 may forward the data packet to the IAB-node traffic destination 1906.

In another aspect, the management layer of the IAB-node traffic source 1902 may select the first path, and the data packet may be transmitted to the IAB-node traffic destination 1906.

The IAB-node traffic destination 1906 may receive the data packet from the IAB-node traffic source 1902 and/or the IAB-donor-DU 1904, and the lower layer of the IAB-node traffic destination 1906 may match and strip the BAP header and send the IP packet to the upper layers. The management layer of the IAB-node traffic destination 1906 may be configured to combine the IP packets, remove any duplicates, reorder packets, etc., to retrieve the local MT node breakout IP traffic.

By adding the BAP forwarding functionality to the IAB DU, any PLC including the IAB DU with the modified functionality for forwarding the traffic between PLC and S/A. That is, the IAB network may utilize any PLC including the DU with the BAP forwarding functionality for the second path of the multipath multi-hop transmission. Furthermore, the route choice may be performed as source routing from the PLC source management layer.

In some aspects, the IAB network may be configured to carry BAP P2P frames to provide the multipath multi-hop transmission. That is, the IAB network may be configured as the P2P network where IAB nodes may communicate to each other as a mesh using the L2 BAP addressing and forwarding capability. Accordingly, the IAB stacks may be modified to include an adaptation layer to interface between the application, e.g., ethernet-IPV4-IPV6, layer and the IAB P2P network.

The BAP P2P network may provide interoperability, increased security via established protocols, support for other IAB over IP, and wide support in industrial networks. On the other hand, the BAP P2P network may be associated with larger headers compared to the expected payload size, e.g., 32 bytes. Also, the BAP P2P network may need to exchange Ethernet data frames to communicate with other industrial applications.

In some aspects, the IAB P2P network may be configured so that the IAB nodes may connect using the BAP addressing. The IAB P2P network may be introduced with a layer to adapt Ethernet/IP packets to flow in IAB and effectively treat the IAB as an industrial LAN.

Figure 20B:
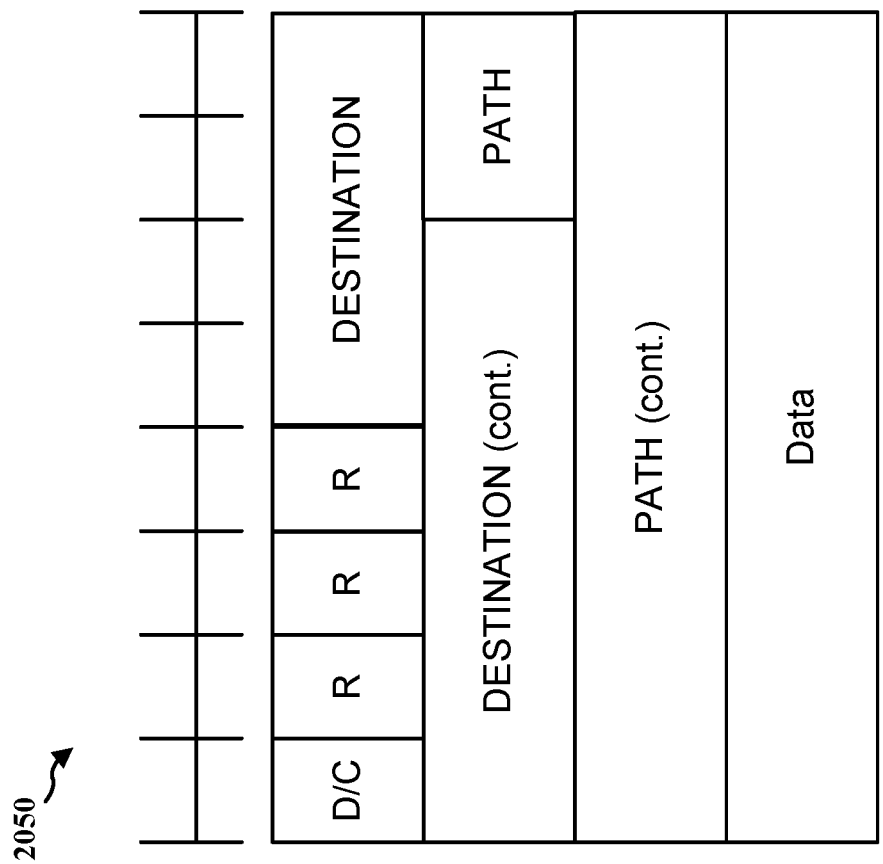
FIG. 20A illustrates an IAB adapted stack and FIG. 20B illustrates an IAB header.
Figure 20A:

FIG. 20A illustrates an IAB adapted stack 2000 and FIG. 20B illustrates an IAB header 2050. The IAB adapted stack 2000 may include the IAB adaptation layer that may interface between the application layer (Ethernet-IPv6-IPV4) and the IAB frames that can flow between P2P IAB nodes.

Figure 21:
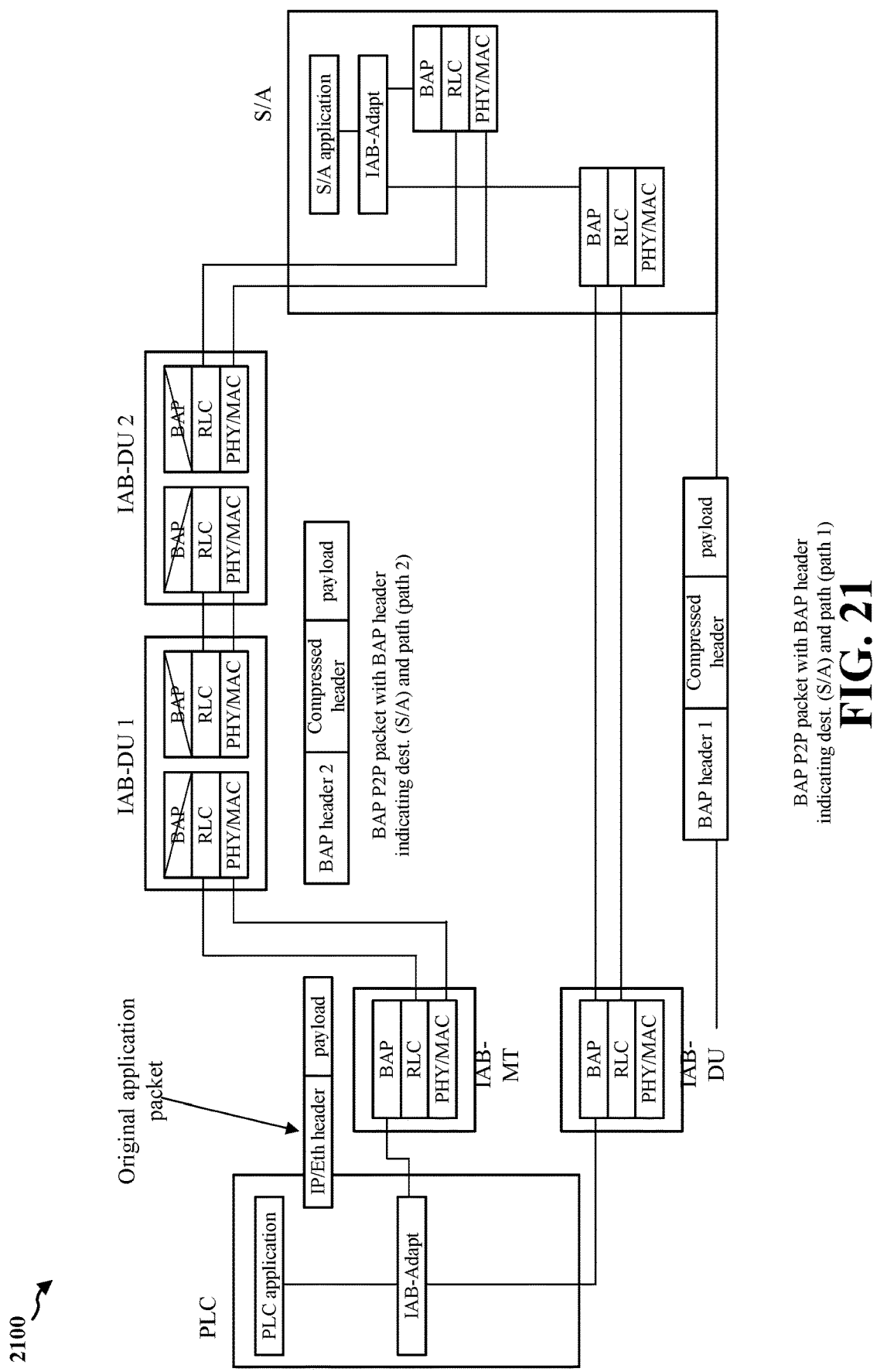
FIG. 21 illustrates an example IAB P2P network to provide the multipath multi-hop transmission.

FIG. 21 illustrates an example IAB P2P network 2100 to provide the multipath multi-hop transmission. The IAB P2P network 2100 may include the IAB adaptation layer. In some aspects, the IAB-Adaptation layer may be configured to compress IP/Ethernet headers, insert BAP header that specifies the destination and the path by performing the source routing configured by the donor, segment packets if necessary to a pre-configured MTU, add segmentation header, support limited link-layer security, duplicate and sequence packets, etc.

Figure 22:
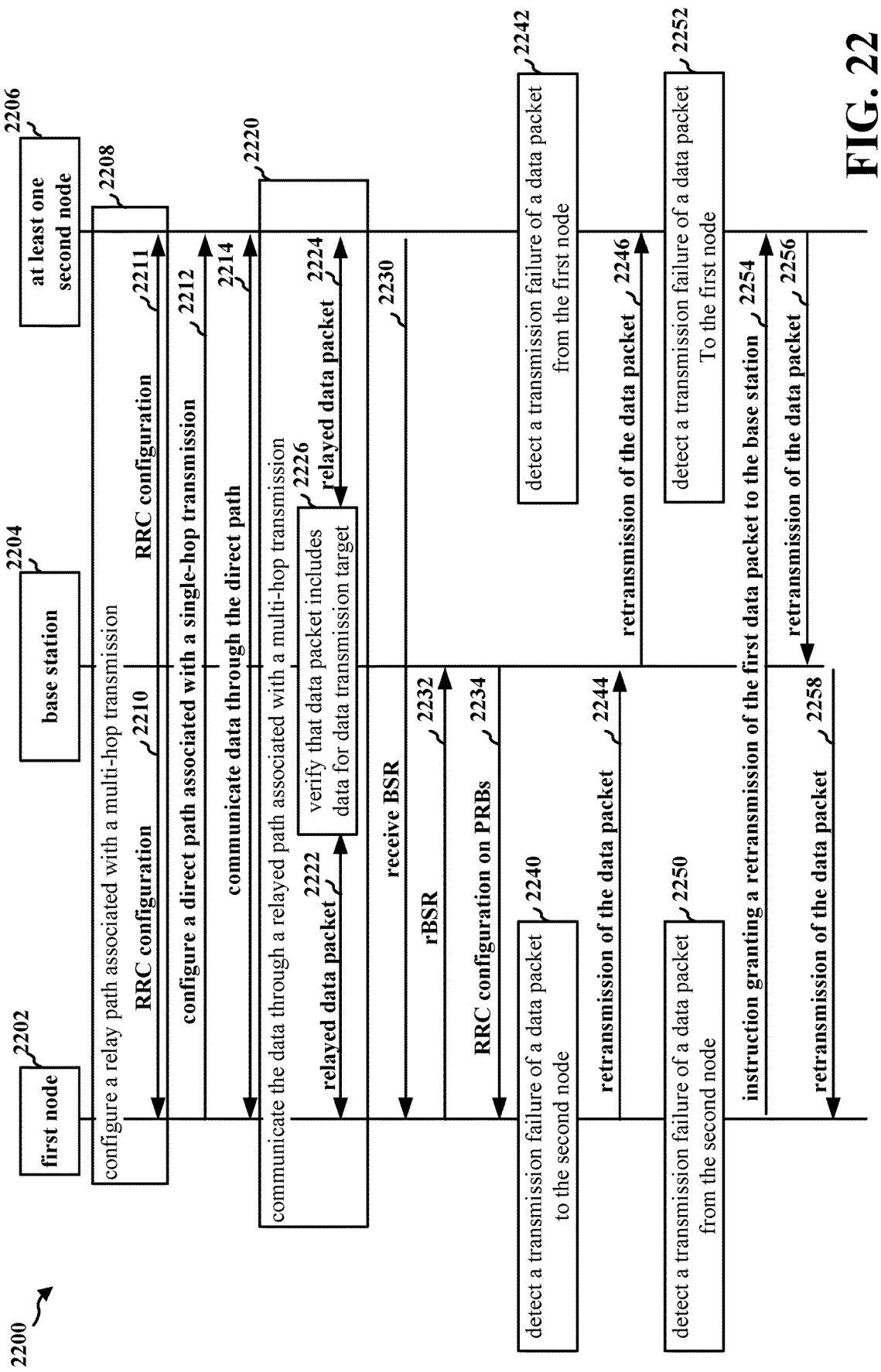
FIG. 22 is a call-flow diagram of a method of wireless communication.

FIG. 22 is a call-flow diagram 2200 of a method of wireless communication. The call-flow diagram 2200 may include a first node 2202, a base station 2204, and at least one second node 2206. The base station 2204 may configure the first node 2202 and the at least one second node 2206 with the IAB network with the multipath multi-hop transmission configuration. The first node 2202 may include a PLC including an IAB node including a PLC IAB-MT and a PLC IAB-DU, the base station 2204 may include an IAB donor, and each of the at least one second node 2206 may include a second IAB-MT. In one aspect, the base station 2204 may include a PLC connected to the at least one second node 2206, the PLC being connected to the first node 2202 and/or the at least a part of the at least one second node 2206. The base station 2204 may receive relayed data packet from a data transmission source, verify that the relayed data packet includes data for a data transmission target, and relay the relayed data packet to the data transmission target. Here, the data transmission source may be one of the first node 2202 or at least one second node 2206, and the data transmission target may be another of the first node 2202 or the at least one second node 2206.

At 2208, the first node 2202 may configure a relayed path with the at least one second node 2206, the relayed path being associated with a multi-hop transmission including a base station 2204. The second node 2206 may receive a configuration of a relayed path with the first node 2202, the relayed path being associated with a multi-hop transmission including a base station 2204. 2208 may include 2210. At 2210, the base station 2204 may transmit, to the first node 2202, a first RRC configuration associated with an RRC connection between the first node 2202 and the base station 2204 and an F1-AP configuration associated with a first F1-AP connection between the first node 2202 and the base station 2204. The first node 2202 may receive, from the base station 2204, a first RRC configuration associated with an RRC connection between the first node 2202 and the base station 2204 and an F1-AP configuration associated with an F1-AP connection between the first node 2202 and the base station 2204.

At 2211, the base station 2204 may transmit, to the at least one second node 2206, a second RRC configuration associated with a second RRC connection between the first node 2202 and the base station 2204. The at least one second node 2206 may receive, from the base station 2204, a second RRC configuration associated with an RRC connection between the at least one second node 2206.

At 2212, the first node 2202 may configure a direct path associated with a single-hop transmission. The second node 2202 may receive a configuration of a direct path with the first node 2202, the direct path being associated with a single-hop transmission to the first node 2202. That is, the first node 2202 may transmit a configuration of a second RRC connection between the first node 2202 and the at least one second node 2206 based on the second configuration associated with the F1-AP connection. The at least one second node 2206 may receive, from the first node 2202, a direct configuration associated with the RRC connection between the first node 2202 and the at least one second node 2206.

At 2214 and 2220, the first node 2202 and the at least one second node 2206 may communicate data with each other through at least one of the relayed path or the at least one direct path. At 2214, the first node 2202 and the at least one second node 2206 may communicate data with each other through at least one direct path associated with a single-hop transmission between the first node 2202 and the at least one second node 2206. In one aspect, the first node 2202 and the second node 2206 may include an IAB adaptation layer, and the first node 2202 may transmit, to the at least one second node 2206, a data packet including a BAP header indicating the direct path and the second node 2206 as a destination, a compressed header including an IP header and an Ethernet header of the at least one second node 2206, and the data for the at least one second node 2206.

At 2220, the first node 2202 and the at least one second node 2206 may communicate the data with each other through a relayed path associated with a multi-hop transmission including a base station 2204. The base station 2204 may receive a relayed data packet from a data transmission source, the data transmission source being one of a first node 2202 or at least one second node 2206, and relay the data for the data transmission target in the first data packet. Here, 2220 may include 2222, 2224, and 2226.

At 2222, the first node 2202 may transmit, to the base station 2204, a relayed data packet. In one aspect, the relayed data packet may include a BAP header of the base station 2204, an IP header of the at least one second node 2206, and the data for the at least one second node 2206. In another aspect, the relayed data packet may include a BAP header of the at least one second node 2206, an IP header of the at least one second node 2206, and the data for the at least one second node 2206. In another aspect, the first node 2202 and the base station 2204 may include an IAB adaptation layer, and the first data packet may include a BAP header indicating the relayed path and the second node 2206 as a destination, a compressed header including an IP header and an Ethernet header of the at least one second node 2206, and the data for the at least one second node 2206.

At 2224, the second node may transmit, to the base station 2204, a relayed data packet. In one aspect, the relayed data packet may include a BAP header of the base station 2204, an IP header of the first node 2202, and the data for the first node 2202. In another aspect, the relayed data packet may include a BAP header of the first node 2202, an IP header of the at least one second node 2206, and the data for the first node 2202. In another aspect, the base station 2204 and the second node 2206 may include an IAB adaptation layer, and the second data packet may include the compressed header including the IP header and the Ethernet header of the at least one second node 2206 and the data for the at least one second node 2206.

At 2226, the base station 2204 may verify that the first data packet includes data for a data transmission target, the data transmission target being another of the first node 2202 or the at least one second node 2206. In one aspect, the base station 2204 may identify that the BAP header of the first data packet is different from the BAP header of the base station 2204, and the base station 2204 may verify that the first data packet includes the data to the data transmission target based on identifying that the BAP header of the first data packet is different from the BAP header of the base station 2204. Based on verifying that the first data packet includes data of the data transmission target, the base station 2204 may generate a second data packet based on the first data packet, the second data packet including a BAP header of the data transmission target, the IP header of the data transmission target, and the data for the data transmission target. Here, the data for the data transmission target may be relayed to the data transmission target using the second data packet.

At 2230, the at least one second node 2206 may transmit at least one BSR to the first node 2202. The first node 2202 may receive at least one BSR from the at least one second node 2206. Based on the at least one BSR received from the at least one second node 2206, the first node 2202 may generate an rBSR indicating the estimated BSR of traffic patterns from the S/As and transmission failures.

At 2232, the first node 2202 may periodically transmit, to the base station 2204, the rBSR indicating the estimated failed transmissions of data packets on the at least one direct path to the at least one second node 2206. The base station 2204 may receive, from the first node 2202, the rBSR indicating the estimated failed transmissions of data packets on the at least one direct path to the at least one second node 2206. The rBSR may be estimated by the first node 2202 based on the at least one BSR received from the at least one second node 2206. The base station 2204 may identify a first set of PRBs of the UL channel based on the rBSR received from the first node 2202.

At 2234, the base station 2204 may transmit, to the first node 2202, a first reservation of a first set of physical resource blocks of an UL channel from the first node 2202, the first set of physical resource blocks being reserved for the UL channel from the first node 2202 to the base station 2204. The first reservation of the first set of physical resource blocks may be transmitted via one or more RRC messages. The first node 2202 may receive an RRC message indicating a reservation of the set of PRBs for the UL channel from the first node 2202 to the base station 2204. The reserved set of PRBs may include the UL channel configured for the first node 2202 to transmit the retransmission of the data packets to the base station 2204.

At 2240, the first node 2202 may detect a transmission failure of a first data packet to one of the at least one second node 2206 on a first direct path of the at least one direct path. In another aspect, the first node 2202 may detect a transmission failure of a second data packet to another of the at least one second node 2206 on a second direct path of the at least one direct path. At 2242, the at least one second node 2206 may detect a transmission failure of a data packet from the first node 2202 on the direct path.

At 2244, the first node 2202 may transmit, to the base station 2204, a retransmission of the first data packet on the relayed path. Here, the retransmission of the first data packet may be transmitted in a set of PRBs of an UL channel reserved, for the UL channel from the first node 2202 to the base station 2204, by the base station 2204 at 2234. In response to the first node 2202 detecting that the transmission failure of the second data packet to another of the at least one second node 2206 at 2240, the first node 2202 may transmit, to the base station 2204, a retransmission of the second data packet on the relayed path, where the retransmission of the second data packet is transmitted in the set of PRBs of the UL channel. The base station 2204 may receive, from the first node 2202, a retransmission of the first data packet. At 2246, the at least one second node 2206 may receive, from the base station 2204, a retransmission of the data packet on the relayed path.

At 2250, the first node 2202 may detect a transmission failure of a first data packet from one of the at least one second node 2206 on a first direct path of the at least one direct path. At 2252, the at least one second node 2206 may detect a transmission failure of a first data packet to the first node 2202 on the at least one direct path.

At 2254, the first node 2202 may transmit, to the one of the at least one second node 2206, an instruction granting a retransmission of the first data packet to the base station 2204 in a subset of PRBs of an UL channel of a set of PRBs of the UL channel. The at least one second node 2206 may receive, from the first node 2202, an instruction granting a retransmission of the first data packet to the base station 2204 in a subset of PRBs of an UL channel of a set of PRBs of the UL channel. Here, the set of PRBs of the UL channel may be reserved for retransmissions to the first node 2202 by the base station 2204 at 2234.

At 2256, the at least one second node 2206 may transmit, to the base station 2204, the retransmission of the data packet in the subset of physical resource blocks of the UL channel of the set of physical resource blocks for the UL channel. Here, the subset of physical resource blocks of the UL channel of the set of physical resource blocks for the UL channel being scheduled by the instruction received at 2254.

At 2258, the base station 2204 may relay, to the first node 2202, the retransmission of the first data packet from the at least one second node 2206. The first node 2202 may receive, from the base station 2204, the retransmission of the first data packet from the one of the at least one second node 2206.

Figure 23:
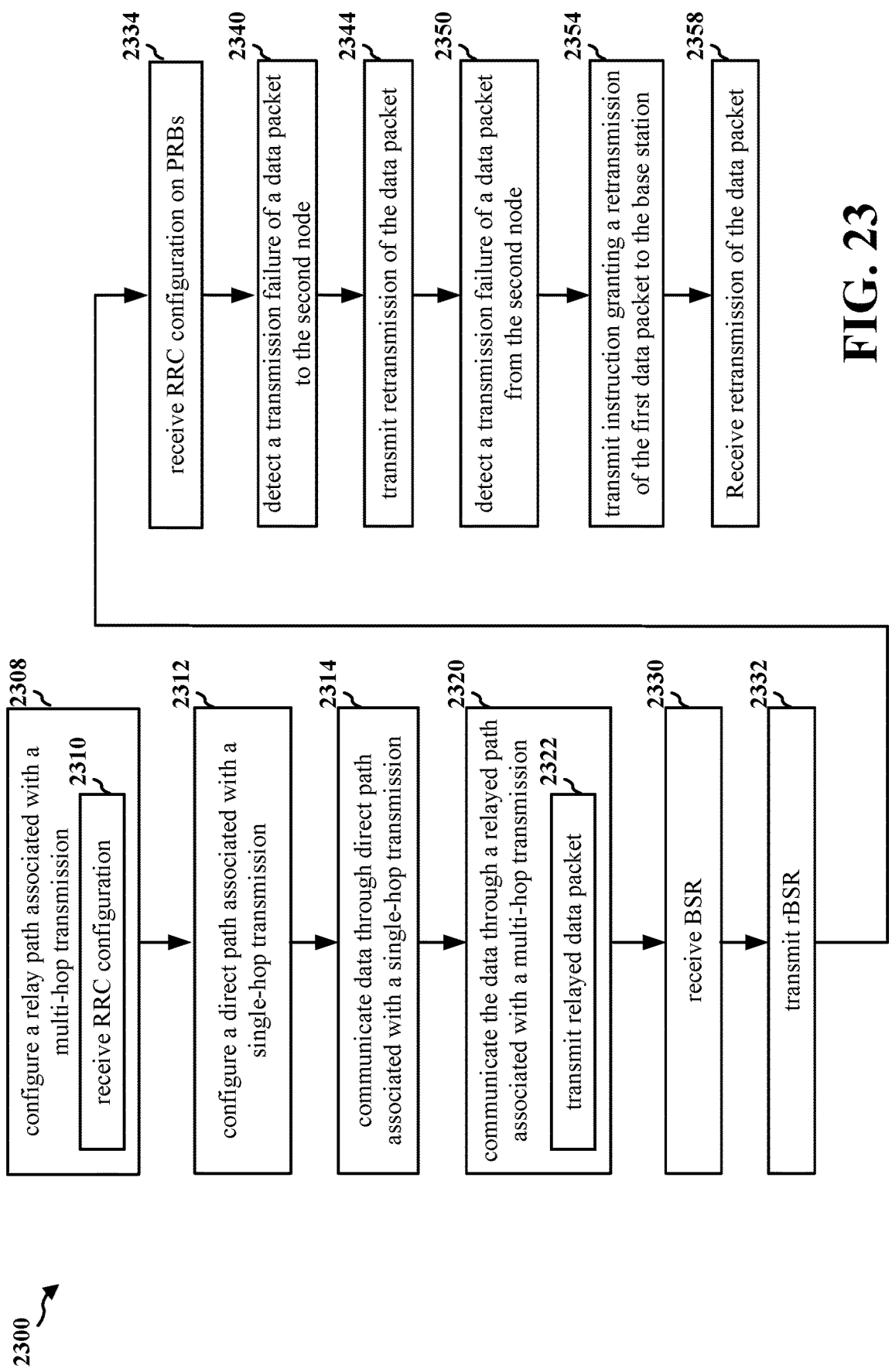
FIG. 23 is a flowchart of a method of wireless communication.

FIG. 23 is a flowchart 2300 of a method of wireless communication. The method may be performed by a first node (e.g., the UE 104; first node 2202; the apparatus 2902). A base station may configure the first node and at least one second node with the IAB network with the multipath multi-hop transmission configuration. The first node may include a PLC including an IAB node including a PLC IAB-MT and a PLC IAB-DU, the base station may include an IAB donor, and each of the at least one second node may include a second IAB-MT. The first node may communicate with the at least one second node through a direct path and a multi-hop transmission including a base station. Also, the first node may detect transmission failure on the direct path and retransmit the data packet to the multi-hop transmission, on a set of PRBs configured by the base station. the first node may transmit rBSR to the base station, and the base station may configure the set of PRBs based on the rBSR.

At 2308, the first node may configure a relayed path with the at least one second node, the relayed path being associated with a multi-hop transmission including a base station. 2308 may include 2310. At 2310, the first node may receive, from the base station, a first RRC configuration associated with an RRC connection between the first node and the base station, and an F1-AP configuration associated with an F1-AP connection between the first node and the base station. For example, at 2208, the first node 2202 may configure a relayed path with the at least one second node 2206, the relayed path being associated with a multi-hop transmission including a base station and at 2210, the first node 2202 may receive, from the base station 2204, a first RRC configuration associated with an RRC connection between the first node 2202 and the base station 2204 and an F1-AP configuration associated with an F1-AP connection between the first node 2202 and the base station 2204. Furthermore, 2308 and 2310 may be performed by an RRC & F1-AP component 2940.

At 2312, the first node may configure a direct path associated with a single-hop transmission. That is, the first node may transmit a configuration of a second RRC connection between the first node and the at least one second node based on the second configuration associated with the F1-AP connection. For example, at 2212, the first node 2202 may configure a direct path associated with a single-hop transmission. Furthermore, 2312 may be performed by the RRC & F1-AP component 2940.

At 2314 and 2320, the first node may communicate data with the at least one second node through at least one of the relayed path or the at least one direct path. At 2314, the first node may communicate data with the at least one second node through at least one direct path associated with a single-hop transmission to the at least one second node. In one aspect, the first node and the second node may include an IAB adaptation layer, and the first node may transmit, to the at least one second node, a data packet including a BAP header indicating the direct path and the second node as a destination, a compressed header including an IP header and an Ethernet header of the at least one second node 2206, and the data for the at least one second node. For example, at 2214, the first node 2202 may communicate data with the at least one second node 2206 through at least one direct path associated with a single-hop transmission to the at least one second node 2206. Furthermore, 2314 may be performed by a multipath communication component 2942.

At 2320, the first node may communicate the data with the at least one second node through a relayed path associated with a multi-hop transmission including a base station. For example, at 2220, the first node 2202 may communicate the data with at least one second node 2206 through a relayed path associated with a multi-hop transmission including a base station 2204. Here, 2320 may include 2322.

At 2322, the first node may transmit, to the base station, a relayed data packet. In one aspect, the relayed data packet may include a BAP header of the base station, an IP header of the at least one second node, and the data for the at least one second node. In another aspect, the relayed data packet may include a BAP header of the at least one second node, an IP header of the at least one second node, and the data for the at least one second node. In another aspect, the first node and the base station may include an IAB adaptation layer, and the first data packet may include a BAP header indicating the relayed path and the second node as a destination, a compressed header including an IP header and an Ethernet header of the at least one second node, and the data for the at least one second node. For example, at 2222, the first node 2202 may transmit, to the base station 2204, a relayed data packet. Furthermore, 2320 and 2322 may be performed by a multipath communication component 2942.

At 2330, the first node may receive at least one BSR from the at least one second node. Based on the at least one BSR received from the at least one second node, the first node may generate an rBSR indicating the estimated BSR of traffic patterns from the S/As and transmission failures. For example, at 2230, the first node 2202 may receive at least one BSR from the at least one second node 2206. Furthermore, 2330 may be performed by an rBSR component 2944.

At 2332, the first node may periodically transmit, to the base station, the rBSR indicating the estimated failed transmissions of data packets on the at least one direct path to the at least one second node. The rBSR may be estimated by the first node based on the at least one BSR received from the at least one second node. The base station may identify a first set of PRBs of the UL channel based on the rBSR received from the first node. For example, at 2232, the first node 2202 may periodically transmit, to the base station 2204, the rBSR indicating the estimated failed transmissions of data packets on the at least one direct path to the at least one second node 2206. Furthermore, 2332 may be performed by the rBSR component 2944.

At 2334, the first node may receive an RRC message indicating a reservation of the set of PRBs for the UL channel from the first node to the base station. The first set of physical resource blocks may be reserved for the UL channel from the first node to the base station. The first reservation of the first set of physical resource blocks may be transmitted via one or more RRC messages. For example, at 2234, the first node 2202 may receive an RRC message indicating a reservation of the set of PRBs for the UL channel from the first node 2202 to the base station 2204. Furthermore, 2334 may be performed by the RRC & F1-AP component 2940.

At 2340, the first node may detect a transmission failure of a first data packet to one of the at least one second node on a first direct path of the at least one direct path. In another aspect, the first node may detect a transmission failure of a second data packet to another of the at least one second node on a second direct path of the at least one direct path. For example, at 2240, the first node 2202 may detect a transmission failure of a first data packet to one of the at least one second node 2206 on a first direct path of the at least one direct path. Furthermore, 2340 may be performed by the multipath communication component 2942.

At 2344, the first node may transmit, to the base station, a retransmission of the first data packet on the relayed path. Here, the retransmission of the first data packet may be transmitted in a set of PRBs of an UL channel reserved, for the UL channel from the first node to the base station, by the base station at 2334. In response to the first node detecting that the transmission failure of the second data packet to another of the at least one second node, the first node may transmit, to the base station, a retransmission of the second data packet on the relayed path, where the retransmission of the second data packet is transmitted in the set of PRBs of the UL channel. For example, at 2244, the first node 2202 may transmit, to the base station 2204, a retransmission of the first data packet on the relayed path. Furthermore, 2344 may be performed by the multipath communication component 2942.

At 2350, the first node may detect a transmission failure of a first data packet from one of the at least one second node on a first direct path of the at least one direct path. For example, at 2250, the first node 2202 may detect a transmission failure of a first data packet from one of the at least one second node 2206 on a first direct path of the at least one direct path. Furthermore, 2350 may be performed by the multipath communication component 2942.

At 2354, the first node may transmit, to the one of the at least one second node, an instruction granting a retransmission of the first data packet to the base station in a subset of PRBs of an UL channel of a set of PRBs of the UL channel. Here, the set of PRBs of the UL channel may be reserved for retransmissions to the first node by the base station at 2334. For example, at 2254, the first node 2202 may transmit, to the one of the at least one second node 2206, an instruction granting a retransmission of the first data packet to the base station 2204 in a subset of PRBs of an UL channel of a set of PRBs of the UL channel. Furthermore, 2354 may be performed by the multipath communication component 2942.

At 2358, the first node may receive, from the base station, the retransmission of the first data packet from the one of the at least one second node. For example, at 2258, the first node 2202 may receive, from the base station 2204, the retransmission of the first data packet from the one of the at least one second node 2206. Furthermore, 2358 may be performed by the multipath communication component 2942.

Figure 24:
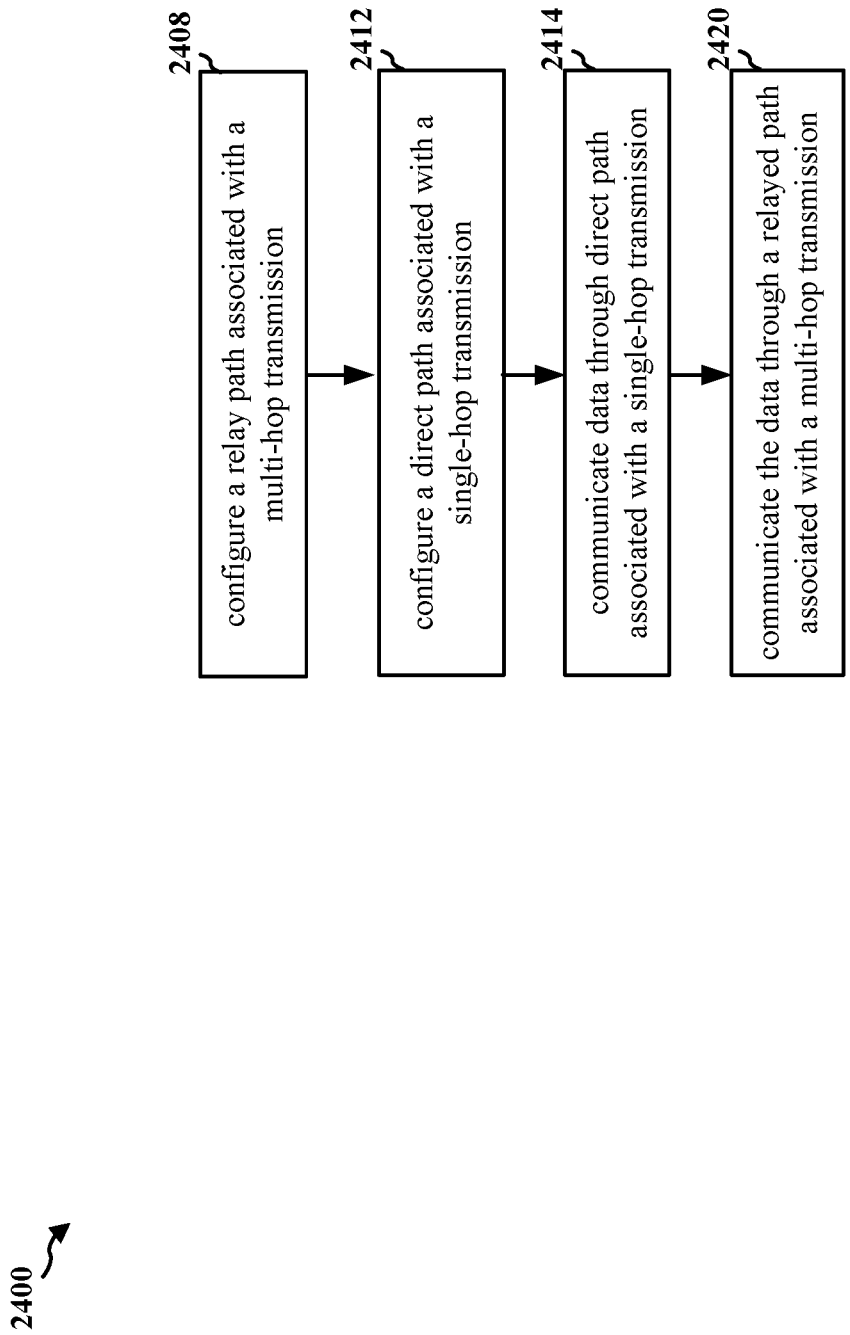
FIG. 24 is a flowchart of a method of wireless communication.

FIG. 24 is a flowchart 2400 of a method of wireless communication. The method may be performed by a first node (e.g., the UE 104; first node 2202; the apparatus 2902). A base station may configure the first node and at least one second node with the IAB network with the multipath multi-hop transmission configuration. The first node may include a PLC including an IAB node including a PLC IAB-MT and a PLC IAB-DU, the base station may include an IAB donor, and each of the at least one second node may include a second IAB-MT. The first node may communicate with the at least one second node through a direct path and a multi-hop transmission including a base station. Also, the first node may detect transmission failure on the direct path and retransmit the data packet to the multi-hop transmission, on a set of PRBs configured by the base station. the first node may transmit rBSR to the base station, and the base station may configure the set of PRBs based on the rBSR.

At 2408, the first node may configure a relayed path with the at least one second node, the relayed path being associated with a multi-hop transmission including a base station. For example, at 2208, the first node 2202 may configure a relayed path with the at least one second node 2206, the relayed path being associated with a multi-hop transmission including a base station. Furthermore, 2408 may be performed by an RRC & F1-AP component 2940.

At 2412, the first node may configure a direct path associated with a single-hop transmission. That is, the first node may transmit a configuration of a second RRC connection between the first node and the at least one second node based on the second configuration associated with the F1-AP connection. For example, at 2212, the first node 2202 may configure a direct path associated with a single-hop transmission. Furthermore, 2412 may be performed by the RRC & F1-AP component 2940.

At 2414 and 2420, the first node may communicate data with the at least one second node through at least one of the relayed path or the at least one direct path. At 2414, the first node may communicate data with the at least one second node through at least one direct path associated with a single-hop transmission to the at least one second node. In one aspect, the first node and the second node may include an IAB adaptation layer, and the first node may transmit, to the at least one second node, a data packet including a BAP header indicating the direct path and the second node as a destination, a compressed header including an IP header and an Ethernet header of the at least one second node 2206, and the data for the at least one second node. For example, at 2214, the first node 2202 may communicate data with the at least one second node 2206 through at least one direct path associated with a single-hop transmission to the at least one second node 2206. Furthermore, 2414 may be performed by a multipath communication component 2942.

At 2420, the first node may communicate the data with the at least one second node through a relayed path associated with a multi-hop transmission including a base station. For example, at 2220, the first node 2202 may communicate the data with at least one second node 2206 through a relayed path associated with a multi-hop transmission including a base station 2204. Furthermore, 2420 may be performed by a multipath communication component 2942.

Figure 25:
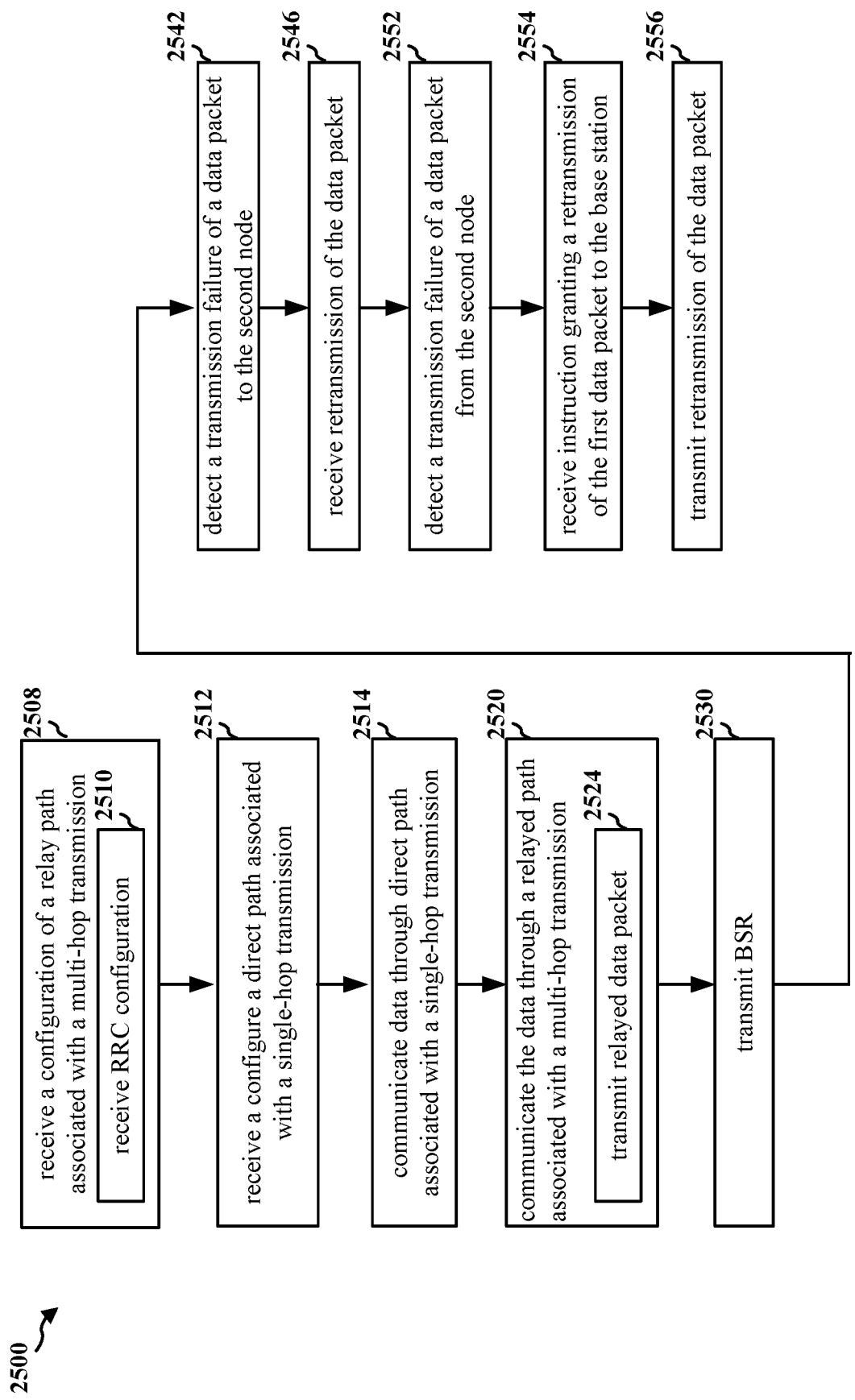
FIG. 25 is a flowchart of a method of wireless communication.

FIG. 25 is a flowchart 2500 of a method of wireless communication. The method may be performed by at least one second node (e.g., the UE 104; at least one second node 2206; the apparatus 2902). Here, the at least one second node may be at least one S/A unit. A base station may configure a first node and the at least one second node with the IAB network with the multipath multi-hop transmission configuration. The first node may include a PLC including an IAB node including a PLC IAB-MT and a PLC IAB-DU, the base station may include an IAB donor, and each of the at least one second node may include a second IAB-MT. The at least one second node may communicate with the first node through a direct path and a multi-hop transmission including a base station. Also, the at least one second node may detect transmission failure on the direct path and retransmit the data packet to the multi-hop transmission, on a set of PRBs configured by the base station. The at least one second node may transmit BSR to the first node, and the first node may transmit rBSR to the base station. The base station may configure the set of PRBs based on the rBSR, and the first node may configure the at least one second node to schedule the retransmission in a subset of PRBs in the set of PRBs configured by the base station.

At 2508, the second node may receive a configuration of a relayed path with the first node, the relayed path being associated with a multi-hop transmission including a base station. 2208 may include 2210. At 2511, the at least one second node may receive, from the base station, a second RRC configuration associated with an RRC connection between the at least one second node. For example, at 2508, the second node 2206 may receive a configuration of a relayed path with the first node 2202, the relayed path being associated with a multi-hop transmission including a base station 2204 and at 2211, the at least one second node 2206 may receive, from the base station 2204, a second RRC configuration associated with an RRC connection between the at least one second node 2206. Furthermore, 2508 and 2511 may be performed by a RRC & F1-AP component 2940.

At 2512, the at least one second node may receive a configuration of a direct path with the first node, the direct path being associated with a single-hop transmission to the first node. That is, the first node may receive, from the first node, a direct configuration associated with the RRC connection between the first node and the at least one second node. For example, at 2212, the at least one second node 2206 may receive a configuration of a direct path with the first node 2202, the direct path being associated with a single-hop transmission to the first node 2202. Furthermore, 2512 may be performed by the RRC & F1-AP component 2940.

At 2514 and 2520, the first node and the at least one second node may communicate data with each other through at least one of the relayed path or the at least one direct path. At 2514, the at least one second node may communicate data with the first node through at least one direct path associated with a single-hop transmission to the first node. In one aspect, the first node and the second node may include an IAB adaptation layer, and the first node may transmit, to the at least one second node, a data packet including a BAP header indicating the direct path and the second node as a destination, a compressed header including an IP header and an Ethernet header of the at least one second node, and the data for the at least one second node. For example, at 2214, the at least one second node 2206 may communicate data with the first node 2202 through at least one direct path associated with a single-hop transmission to the first node 2202. Furthermore, 2514 may be performed by the multipath communication component 2942.

At 2520, the at least one second node may communicate the data with the first node through a relayed path associated with a multi-hop transmission including a base station. For example, at 2220, the at least one second node 2206 may communicate the data with the first node 2202 through a relayed path associated with a multi-hop transmission including a base station 2204. Here, 2520 may include 2524.

At 2524, the at least one second node may transmit, to the base station, a relayed data packet. In one aspect, the relayed data packet may include a BAP header of the base station, an IP header of the first node, and the data for the first node. In another aspect, the relayed data packet may include a BAP header of the first node, an IP header of the at least one second node 2206, and the data for the first node. In another aspect, the base station 2204 and the second node 2206 may include an IAB adaptation layer, and the second data packet may include the compressed header including the IP header and the Ethernet header of the at least one second node 2206 and the data for the at least one second node 2206. For example, at 2224, the at least one second node 2206 may transmit, to the base station 2204, a relayed data packet. Furthermore, 2520 and 2524 may be performed by a multipath communication component 2942.

At 2530, the at least one second node may transmit at least one BSR to the first node. Based on the at least one BSR received from the at least one second node, the first node may generate an rBSR indicating the estimated BSR of traffic patterns from the S/As and transmission failures. For example, at 2230, the at least one second node 2206 may transmit at least one BSR to the first node 2202. Furthermore, 2530 may be performed by an rBSR component 2944.

At 2542, the at least one second node may detect a transmission failure of a data packet from the first node on the direct path. For example, at 2242, the at least one second node 2206 may detect a transmission failure of a data packet from the first node 2202 on the direct path. Furthermore, 2542 may be performed by the multipath communication component 2942.

At 2546, the at least one second node may receive, from the base station, a retransmission of the data packet on the relayed path. For example, at 2246, the at least one second node 2206 may receive, from the base station 2204, a retransmission of the data packet on the relayed path. Furthermore, 2546 may be performed by the multipath communication component 2942.

At 2552, the at least one second node may detect a transmission failure of a first data packet to the first node on the at least one direct path. For example, at 2252, the at least one second node 2206 may detect a transmission failure of a first data packet to the first node 2202 on the at least one direct path. Furthermore, 2552 may be performed by the multipath communication component 2942.

At 2554, the at least one second node may receive, from the first node, an instruction granting a retransmission of the first data packet to the base station in a subset of PRBs of an UL channel of a set of PRBs of the UL channel. Here, the set of PRBs of the UL channel may be reserved for retransmissions to the first node by the base station at 2534. For example, at 2254, the at least one second node 2206 may receive, from the first node 2202, an instruction granting a retransmission of the first data packet to the base station 2204 in a subset of PRBs of an UL channel of a set of PRBs of the UL channel. Furthermore, 2554 may be performed by the multipath communication component 2942.

At 2556, the at least one second node may transmit, to the base station, the retransmission of the data packet in the subset of physical resource blocks of the UL channel of the set of physical resource blocks for the UL channel. Here, the subset of physical resource blocks of the UL channel of the set of physical resource blocks for the UL channel being scheduled by the instruction received at 2554. For example, at 2256, the at least one second node 2206 may transmit, to the base station 2204, the retransmission of the data packet in the subset of physical resource blocks of the UL channel of the set of physical resource blocks for the UL channel. Furthermore, 2556 may be performed by the multipath communication component 2942.

Figure 26:
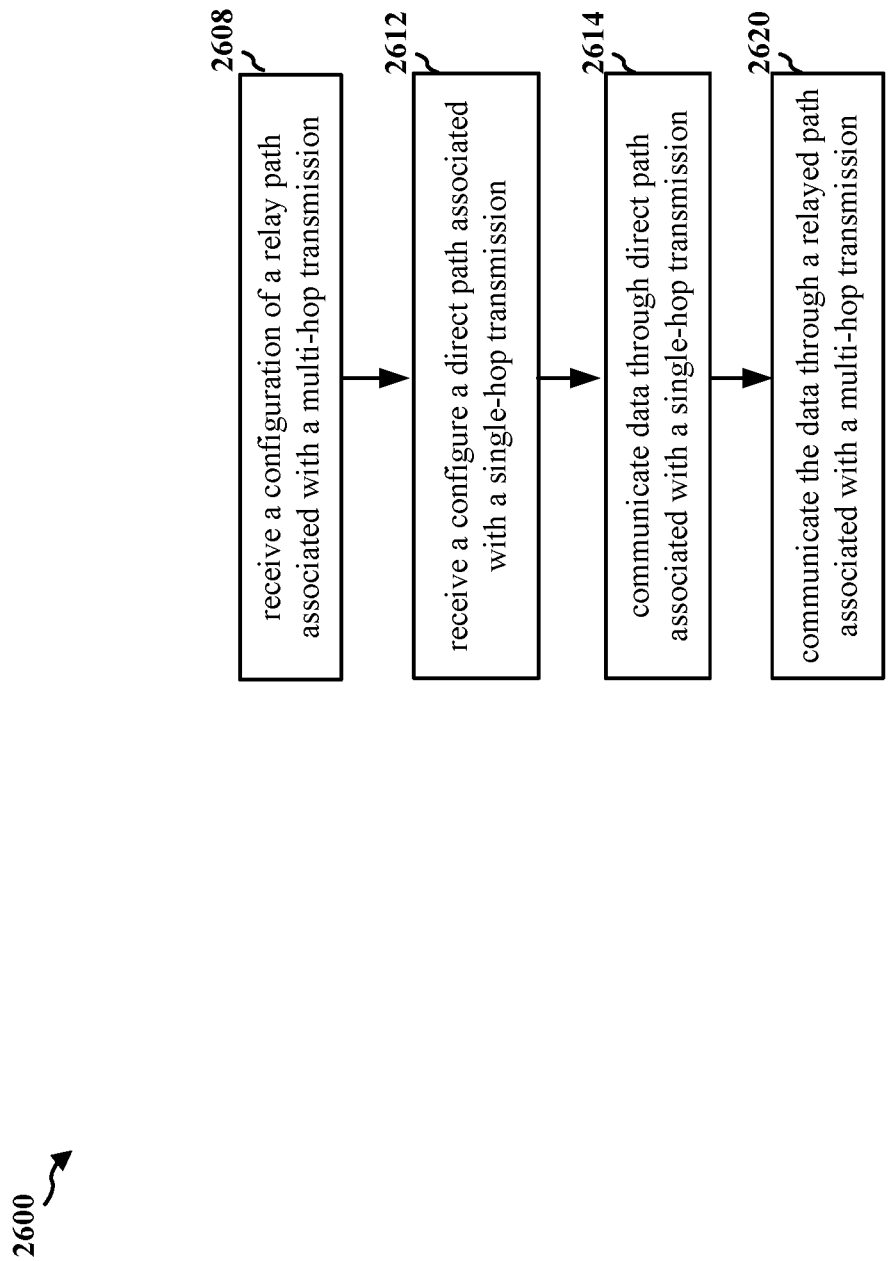
FIG. 26 is a flowchart of a method of wireless communication.

FIG. 26 is a flowchart 2600 of a method of wireless communication. The method may be performed by at least one second node (e.g., the UE 104; at least one second node 2206; the apparatus 2902). Here, the at least one second node may be at least one S/A unit. A base station may configure a first node and the at least one second node with the IAB network with the multipath multi-hop transmission configuration. The first node may include a PLC including an IAB node including a PLC IAB-MT and a PLC IAB-DU, the base station may include an IAB donor, and each of the at least one second node may include a second IAB-MT. The at least one second node may communicate with the first node through a direct path and a multi-hop transmission including a base station. Also, the at least one second node may detect transmission failure on the direct path and retransmit the data packet to the multi-hop transmission, on a set of PRBs configured by the base station. The at least one second node may transmit BSR to the first node, and the first node may transmit rBSR to the base station. The base station may configure the set of PRBs based on the rBSR, and the first node may configure the at least one second node to schedule the retransmission in a subset of PRBs in the set of PRBs configured by the base station.

At 2608, the second node may receive a configuration of a relayed path with the first node, the relayed path being associated with a multi-hop transmission including a base station. 2208 may include 2210. For example, at 2608, the second node 2206 may receive a configuration of a relayed path with the first node 2202, the relayed path being associated with a multi-hop transmission including a base station 2204. Furthermore, 2608 may be performed by a RRC & F1-AP component 2940.

At 2612, the at least one second node may receive a configuration of a direct path with the first node, the direct path being associated with a single-hop transmission to the first node. That is, the first node may receive, from the first node, a direct configuration associated with the RRC connection between the first node and the at least one second node. For example, at 2212, the at least one second node 2206 may receive a configuration of a direct path with the first node 2202, the direct path being associated with a single-hop transmission to the first node 2202. Furthermore, 2612 may be performed by the RRC & F1-AP component 2940.

At 2614 and 2620, the first node and the at least one second node may communicate data with each other through at least one of the relayed path or the at least one direct path. At 2614, the at least one second node may communicate data with the first node through at least one direct path associated with a single-hop transmission to the first node. In one aspect, the first node and the second node may include an IAB adaptation layer, and the first node may transmit, to the at least one second node, a data packet including a BAP header indicating the direct path and the second node as a destination, a compressed header including an IP header and an Ethernet header of the at least one second node, and the data for the at least one second node. For example, at 2214, the at least one second node 2206 may communicate data with the first node 2202 through at least one direct path associated with a single-hop transmission to the first node 2202. Furthermore, 2614 may be performed by the multipath communication component 2942.

At 2620, the at least one second node may communicate the data with the first node through a relayed path associated with a multi-hop transmission including a base station. For example, at 2220, the at least one second node 2206 may communicate the data with the first node 2202 through a relayed path associated with a multi-hop transmission including a base station 2204. Furthermore, 2620 may be performed by a multipath communication component 2942.

Figure 27:
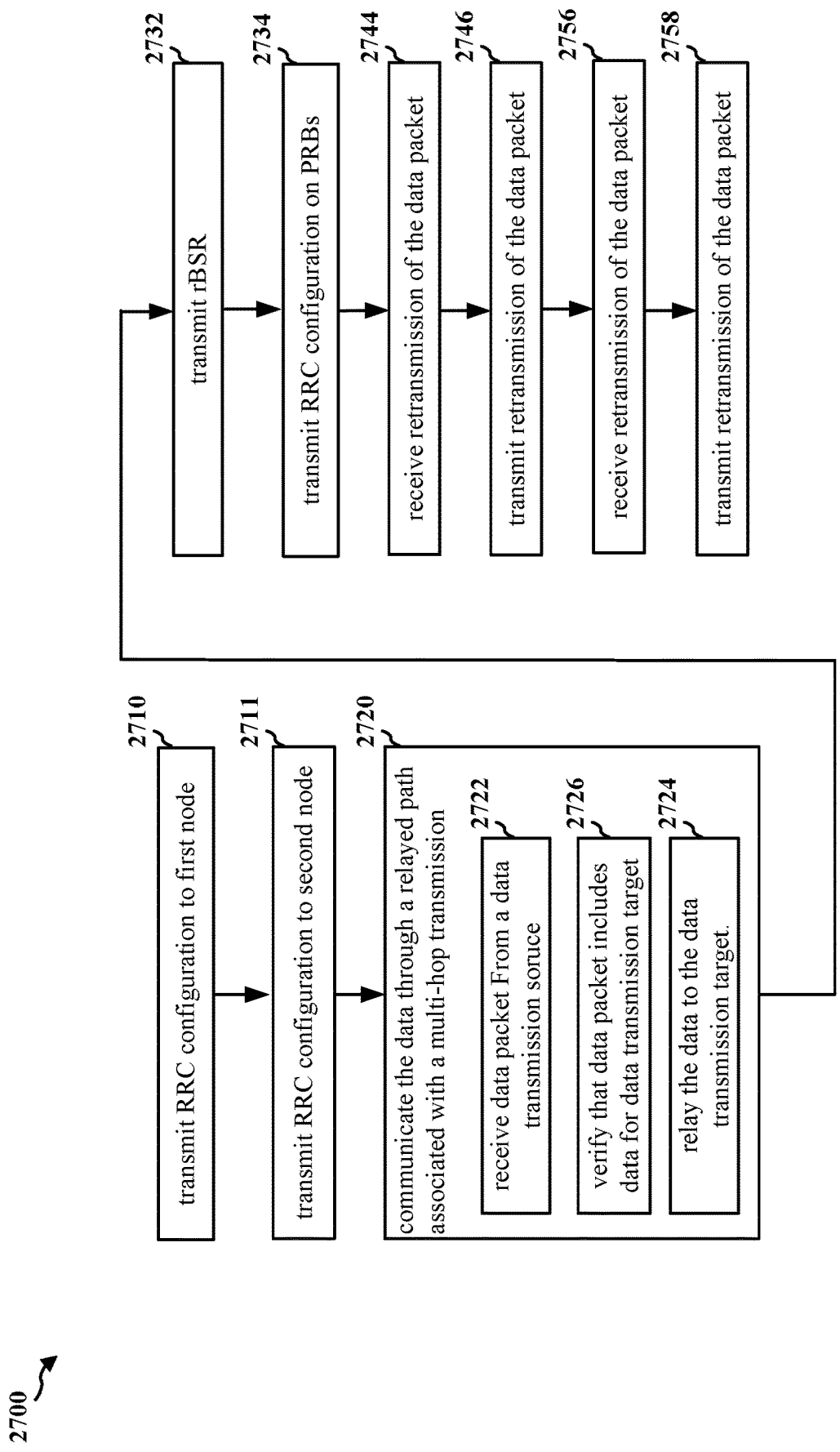
FIG. 27 is a flowchart of a method of wireless communication.

FIG. 27 is a flowchart 2700 of a method of wireless communication. The method may be performed by a base station (e.g., the base station 102/180/2204; the apparatus 3002). The base station may configure a first node and at least one second node 2206 with the IAB network with the multipath multi-hop transmission configuration. The first node may include a PLC including an IAB node including a PLC IAB-MT and a PLC IAB-DU, the base station 2204 may include an IAB donor, and each of the at least one second node may include a second IAB-MT. In one aspect, the base station may include a PLC connected to the at least one second node, the PLC being connected to the first node and/or the at least a part of the at least one second node. The base station may receive relayed data packet from a data transmission source, verify that the relayed data packet includes data for a data transmission target, and relay the relayed data packet to the data transmission target.

At 2710, the base station may transmit, to the first node, a first RRC configuration associated with an RRC connection between the first node and the base station and an F1-AP configuration associated with a first F1-AP connection between the first node and the base station. For example, at 2210, the base station 2204 may transmit, to the first node 2202, a first RRC configuration associated with an RRC connection between the first node 2202 and the base station 2204 and an F1-AP configuration associated with a first F1-AP connection between the first node 2202 and the base station 2204 Furthermore, 2710 may be performed by a RRC & F1-AP component 3040.

At 2711, the base station may transmit, to the at least one second node, a second RRC configuration associated with a second RRC connection between the first node and the base station. For example, at 2211, the base station 2204 may transmit, to the at least one second node 2206, a second RRC configuration associated with a second RRC connection between the first node 2202 and the base station 2204. Furthermore, 2711 may be performed by the RRC & F1-AP component 3040.

At 2720, the base station may receive a relayed data packet from a data transmission source, the data transmission source being one of the first node or the at least one second node, and relay the data for the data transmission target in the first data packet, the data transmission target being another of the first node or the at least one second node. For example, at 2220, the base station 2204 may receive a relayed data packet from a data transmission source, the data transmission source being one of the first node 2202 or the at least one second node 2206, and relay the data for the data transmission target in the first data packet, the data transmission target being another of the first node 2202 or the at least one second node 2206. Here, 2720 may include 2722, 2724, and 2726.

At 2722, the base station may receive a first data packet from a data transmission source, the data transmission source being one of the first node or the at least one second node. In one aspect, the relayed data packet may include a BAP header of the base station, an IP header of the at least one second node, and the data for the at least one second node. In another aspect, the relayed data packet may include a BAP header of the at least one second node, an IP header of the at least one second node, and the data for the at least one second node. In another aspect, the first node and the base station may include an IAB adaptation layer, and the first data packet may include a BAP header indicating the relayed path and the second node as a destination, a compressed header including an IP header and an Ethernet header of the at least one second node, and the data for the at least one second node. For example, at 2222, the base station 2204 may receive a first data packet from a data transmission source, the data transmission source being one of a first node 2202 or at least one second node 2206.

At 2726, the base station may verify that the first data packet includes data for a data transmission target, the data transmission target being another of the first node or the at least one second node. In one aspect, the base station may identify that the BAP header of the first data packet is different from the BAP header of the base station, and the base station may verify that the first data packet includes the data to the data transmission target based on identifying that the BAP header of the first data packet is different from the BAP header of the base station. Based on verifying that the first data packet includes data of the data transmission target, the base station may generate a second data packet based on the first data packet, the second data packet including a BAP header of the data transmission target, the IP header of the data transmission target, and the data for the data transmission target. Here, the data for the data transmission target may be relayed to the data transmission target using the second data packet. For example, at 2226, the base station 2204 may verify that the first data packet includes data for a data transmission target, the data transmission target being another of the first node 2202 or the at least one second node 2206.

At 2724, the base station may relay, to the data transmission target, the data for the data transmission target in the first data packet and the data transmission target being another of the first node or the at least one second node. In one aspect, the base station and the second node may include an IAB adaptation layer, and the second data packet may include the compressed header including the IP header and the Ethernet header of the at least one second node and the data for the at least one second node. For example, at 2224, the base station 2204 may relay, to the data transmission target, the data for the data transmission target in the first data packet and the data transmission target being another of the first node 2202 or the at least one second node 2206. Furthermore, 2720, 2722, 2724, and 2726 may be performed by a multipath communication component 3042.

At 2732, the base station may receive, from the first node, the rBSR indicating the estimated failed transmissions of data packets on the at least one direct path to the at least one second node. The rBSR may be estimated by the first node based on the at least one BSR received from the at least one second node. The base station may identify a first set of PRBs of the UL channel based on the rBSR received from the first node. For example, at 2232, the base station 2204 may receive, from the first node 2202, the rBSR indicating the estimated failed transmissions of data packets on the at least one direct path to the at least one second node 2206. Furthermore, 2732 may be performed by an rBSR component 3044.

At 2734, the base station may transmit, to the first node, a first reservation of a first set of physical resource blocks of an UL channel from the first node. The first set of physical resource blocks may be reserved for the UL channel from the first node to the base station. The first reservation of the first set of physical resource blocks may be transmitted via one or more RRC messages. For example, at 2234, the base station 2204 may transmit, to the first node 2202, a first reservation of a first set of physical resource blocks of an UL channel from the first node 2202. Furthermore, 2734 may be performed by the RRC & F1-AP component 3040.

At 2744, the base station may receive, from the first node, a retransmission of the first data packet. Here, the retransmission of the first data packet may be transmitted in a set of PRBs of an UL channel, and the set of PRBs may be reserved for the UL channel from the first node to the base station by the base station at 2234. In response to the first node 2202 detecting that the transmission failure of the second data packet to another of the at least one second node 2206 at 2240, the first node 2202 may transmit, to the base station 2204, a retransmission of the second data packet on the relayed path, where the retransmission of the second data packet is transmitted in the set of PRBs of the UL channel. For example, at 2244, the base station 2204 may receive, from the first node 2202, a retransmission of the first data packet. Furthermore, 2744 may be performed by the multipath communication component 3042.

At 2746, the base station may transmit, to the at least one second node, a retransmission of the data packet on the relayed path. For example, at 2246, the base station 2204 may transmit, to the at least one second node 2206, a retransmission of the data packet on the relayed path. Furthermore, 2746 may be performed by the multipath communication component 3042.

At 2756, the base station may receive, from the at least one second node, the retransmission of the data packet in the subset of physical resource blocks of the UL channel of the set of physical resource blocks for the UL channel. Here, the subset of physical resource blocks of the UL channel of the set of physical resource blocks for the UL channel being scheduled by the instruction received. For example, at 2256, the base station 2204 may receive, from the at least one second node 2206, the retransmission of the data packet in the subset of physical resource blocks of the UL channel of the set of physical resource blocks for the UL channel. Furthermore, 2756 may be performed by the multipath communication component 3042.

At 2758, the base station may relay, to the first node, the retransmission of the first data packet from the at least one second node. For example, at 2258, the base station 2204 may relay, to the first node 2202, the retransmission of the first data packet from the at least one second node 2206. Furthermore, 2758 may be performed by the multipath communication component 3042.

Figure 28:
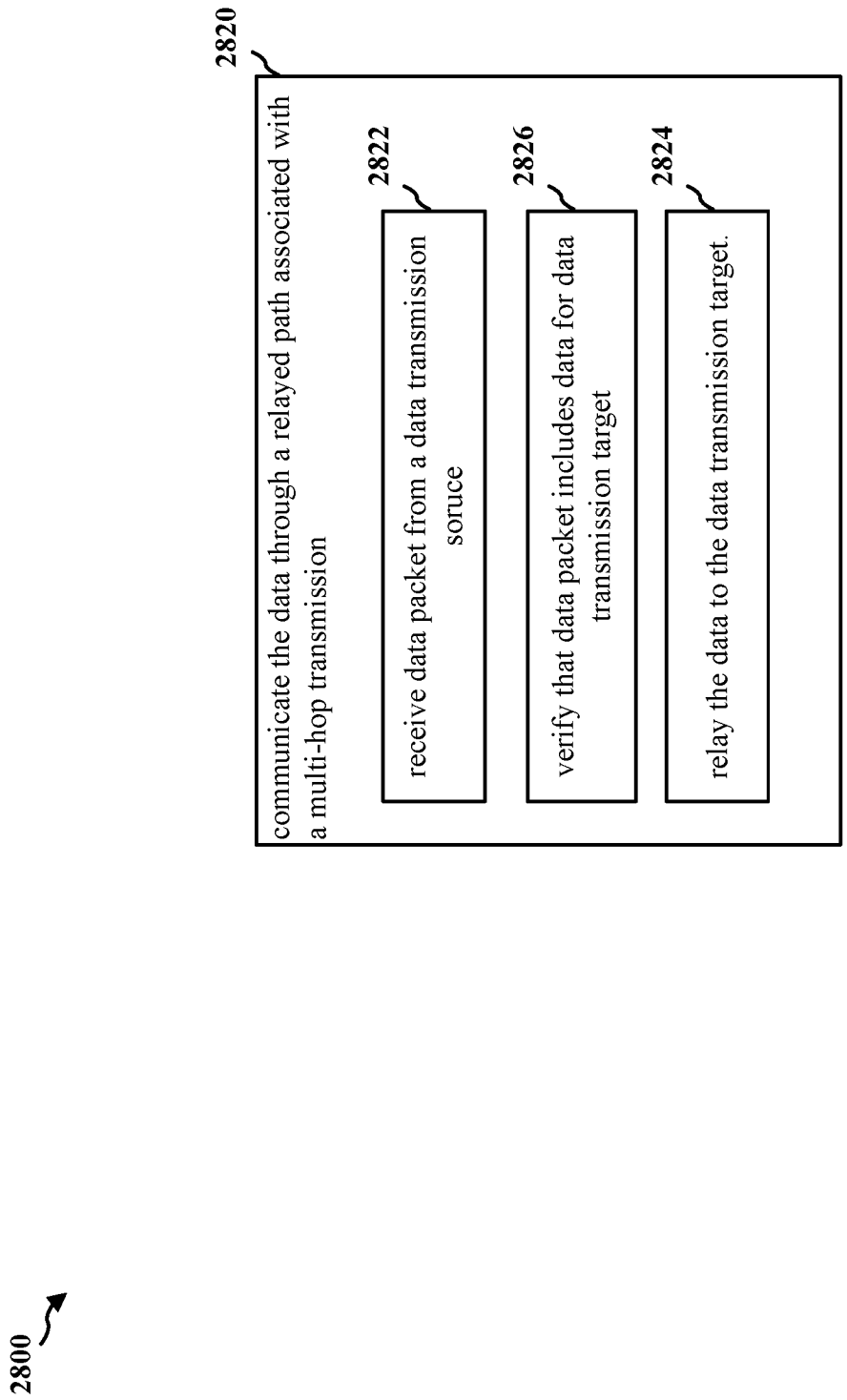
FIG. 28 is a flowchart of a method of wireless communication.

FIG. 28 is a flowchart 2800 of a method of wireless communication. The method may be performed by a base station (e.g., the base station 102/180/2204; the apparatus 3002). The base station may configure a first node and at least one second node 2206 with the IAB network with the multipath multi-hop transmission configuration. The first node may include a PLC including an IAB node including a PLC IAB-MT and a PLC IAB-DU, the base station 2204 may include an IAB donor, and each of the at least one second node may include a second IAB-MT. In one aspect, the base station may include a PLC connected to the at least one second node, the PLC being connected to the first node and/or the at least a part of the at least one second node. The base station may receive relayed data packet from a data transmission source, verify that the relayed data packet includes data for a data transmission target, and relay the relayed data packet to the data transmission target.

At 2820, the base station may receive a relayed data packet from a data transmission source, the data transmission source being one of the first node or the at least one second node, and relay the data for the data transmission target in the first data packet, the data transmission target being another of the first node or the at least one second node. For example, at 2220, the base station 2204 may receive a relayed data packet from a data transmission source, the data transmission source being one of the first node 2202 or the at least one second node 2206, and relay the data for the data transmission target in the first data packet, the data transmission target being another of the first node 2202 or the at least one second node 2206. Here, 2820 may include 2822, 2824, and 2826.

At 2822, the base station may receive a first data packet from a data transmission source, the data transmission source being one of the first node or the at least one second node. In one aspect, the relayed data packet may include a BAP header of the base station, an IP header of the at least one second node, and the data for the at least one second node. In another aspect, the relayed data packet may include a BAP header of the at least one second node, an IP header of the at least one second node, and the data for the at least one second node. In another aspect, the first node and the base station may include an IAB adaptation layer, and the first data packet may include a BAP header indicating the relayed path and the second node as a destination, a compressed header including an IP header and an Ethernet header of the at least one second node, and the data for the at least one second node. For example, at 2222, the base station 2204 may receive a first data packet from a data transmission source, the data transmission source being one of a first node 2202 or at least one second node 2206.

At 2826, the base station may verify that the first data packet includes data for a data transmission target, the data transmission target being another of the first node or the at least one second node. In one aspect, the base station may identify that the BAP header of the first data packet is different from the BAP header of the base station, and the base station may verify that the first data packet includes the data to the data transmission target based on identifying that the BAP header of the first data packet is different from the BAP header of the base station. Based on verifying that the first data packet includes data of the data transmission target, the base station may generate a second data packet based on the first data packet, the second data packet including a BAP header of the data transmission target, the IP header of the data transmission target, and the data for the data transmission target. Here, the data for the data transmission target may be relayed to the data transmission target using the second data packet. For example, at 2226, the base station 2204 may verify that the first data packet includes data for a data transmission target, the data transmission target being another of the first node 2202 or the at least one second node 2206.

At 2824, the base station may relay, to the data transmission target, the data for the data transmission target in the first data packet and the data transmission target being another of the first node or the at least one second node. In one aspect, the base station and the second node may include an IAB adaptation layer, and the second data packet may include the compressed header including the IP header and the Ethernet header of the at least one second node and the data for the at least one second node. For example, at 2224, the base station 2204 may relay, to the data transmission target, the data for the data transmission target in the first data packet and the data transmission target being another of the first node 2202 or the at least one second node 2206. Furthermore, 2820, 2822, 2824, and 2826 may be performed by a multipath communication component 3042.

Figure 29:
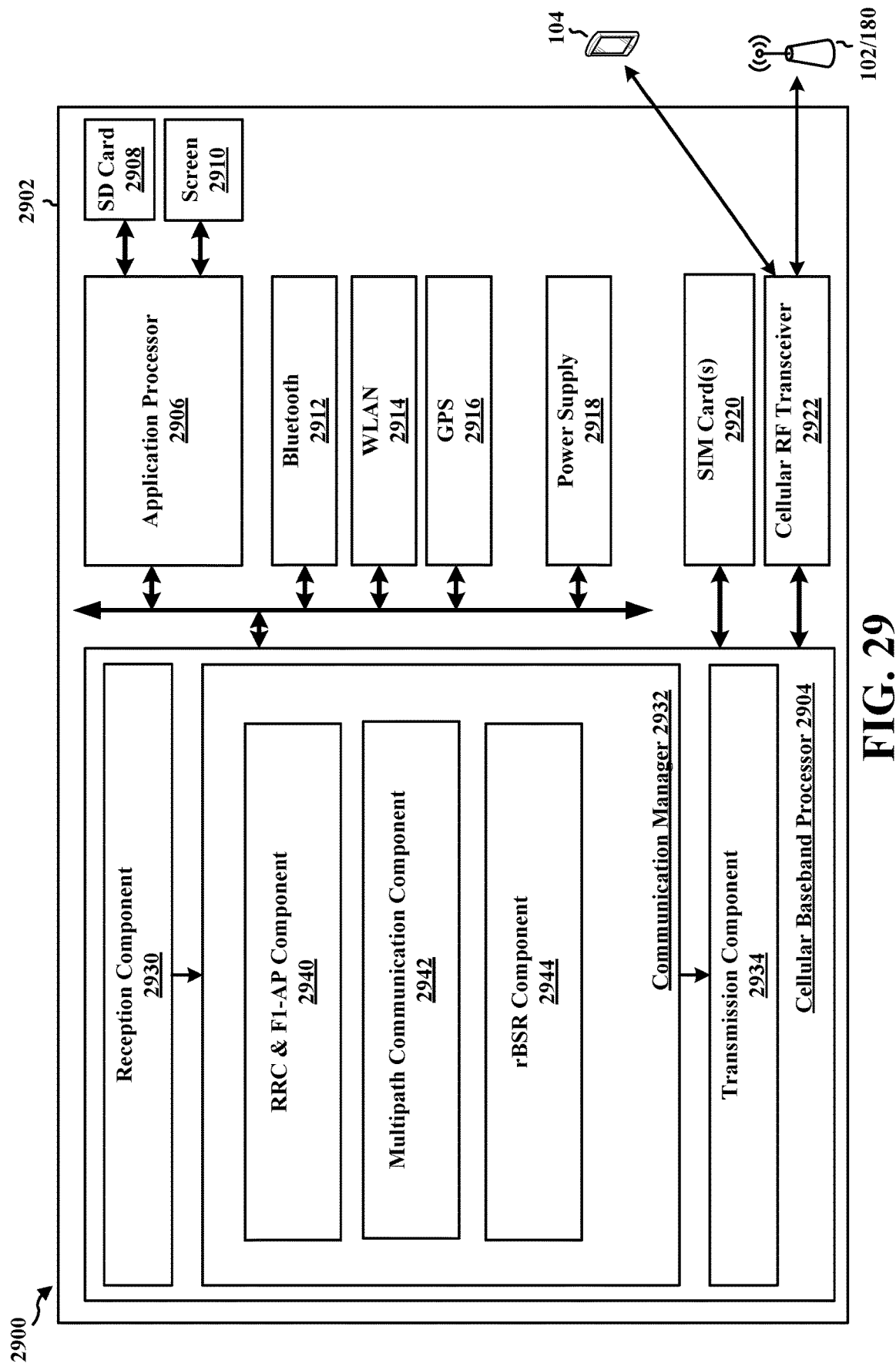
FIG. 29 is a diagram illustrating an example of a hardware implementation for an example apparatus.

FIG. 29 is a diagram 2900 illustrating an example of a hardware implementation for an apparatus 2902. The apparatus 2902 may be a UE, a component of a UE, or may implement UE functionality. Here, the apparatus 2902 may be the first node 2202 or the at least one second node 2206. In some aspects, the apparatus 2902 may include a cellular baseband processor 2904 (also referred to as a modem) coupled to a cellular RF transceiver 2922. In some aspects, the apparatus 2902 may further include one or more subscriber identity modules (SIM) cards 2920, an application processor 2906 coupled to a secure digital (SD) card 2908 and a screen 2910, a Bluetooth module 2912, a wireless local area network (WLAN) module 2914, a Global Positioning System (GPS) module 2916, or a power supply 2918. The cellular baseband processor 2904 communicates through the cellular RF transceiver 2922 with the UE 104 and/or BS 102/180. The cellular baseband processor 2904 may include a computer-readable medium/memory. The computer-readable medium/memory may be non-transitory. The cellular baseband processor 2904 is responsible for general processing, including the execution of software stored on the computer-readable medium/memory. The software, when executed by the cellular baseband processor 2904, causes the cellular baseband processor 2904 to perform the various functions described supra. The computer-readable medium/memory may also be used for storing data that is manipulated by the cellular baseband processor 2904 when executing software. The cellular baseband processor 2904 further includes a reception component 2930, a communication manager 2932, and a transmission component 2934. The communication manager 2932 includes the one or more illustrated components. The components within the communication manager 2932 may be stored in the computer-readable medium/memory and/or configured as hardware within the cellular baseband processor 2904. The cellular baseband processor 2904 may be a component of the UE 350 and may include the memory 360 and/or at least one of the TX processor 368, the RX processor 356, and the controller/processor 359. In one configuration, the apparatus 2902 may be a modem chip and include just the baseband processor 2904, and in another configuration, the apparatus 2902 may be the entire UE (e.g., see 350 of FIG. 3) and include the additional modules of the apparatus 2902.

The communication manager 2932 includes an RRC & F1-AP component 2940 that is configured to receive or transmit RRC or F1-AP configurations and receive RRC configuration on PRBs, e.g., as described in connection with 2308, 2310, 2312, 2334, 2408, 2412, 2508, 2511, or 2512, 2608 or 2612. The communication manager 2932 includes a multipath communication component 2942 that is configured to communicate data with through at least one direct path or a multi-hop transmission including a base station, detect transmission failure of a data packet, and transmit a relay data packet through the multi-hop transmission, e.g., as described in connection with 2314, 2320, 2322, 2340, 2344, 2350, 2354, 2358, 2414, 2420, 2520, 2524, 2542, 2546, 2552, 2554, 2556, 2614, 2620. The communication manager 2932 includes an rBSR component 2944 that is configured to transmit or receive at least one BSR or rBSR, e.g., as described in connection with 2330, 2332, and 2530.

The apparatus may include additional components that perform each of the blocks of the algorithm in the flowcharts of FIGS. 22, 23, 24, 25, and 26. As such, each block in the flowcharts of FIGS. 22, 23, 24, 25, and 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2902 may include a variety of components configured for various functions. In one configuration, the apparatus 2902, and in particular the cellular baseband processor 2904, includes means for configure at least one direct path with at least one second node, the at least one direct path being associated with a single-hop transmission to the at least one second node, means for configuring a relayed path with the at least one second node, the relayed path being associated with a multi-hop transmission including a base station, means for communicating data with the at least one second node through at least one of the relayed path or the at least one direct path, means for transmitting, to the base station, a relayed data packet including a BAP header of the base station, an IP header of the at least one second node, and the data for the at least one second node. The apparatus 2902 includes means for receiving, from the base station, a first RRC configuration associated with an RRC connection between the first node and the base station and an F1-AP configuration associated with an F1-AP connection between the first node and the base station, means for configuring a second RRC connection between the first node and the at least one second node based on the second configuration associated with the F1-AP connection, means for detecting a transmission failure of a first data packet to one of the at least one second node on a first direct path of the at least one direct path, and means for transmitting, to the base station, a retransmission of the first data packet on the relayed path, means for receiving a RRC message indicating a reservation of the set of physical resource blocks for the UL channel from the first node to the base station, means for detecting a transmission failure of a second data packet to another of the at least one second node on a second direct path of the at least one direct path, and means for transmitting, to the base station, a retransmission of the second data packet on the relayed path, where the retransmission of the second data packet is transmitted in the set of physical resource blocks of the UL channel. The apparatus 2902 includes means for detecting a transmission failure of a first data packet from one of the at least one second node on a first direct path of the at least one direct path, means for transmitting, to the one of the at least one second node, an instruction granting a retransmission of the first data packet to the base station in a subset of physical resource blocks of an UL channel of a set of physical resource blocks of the UL channel, the set of physical resource blocks of the UL channel being reserved for retransmissions to the first node, means for receiving, from the base station, the retransmission of the first data packet from the one of the at least one second node. The apparatus 2902 includes means for receiving at least one BSR from the at least one second node, and means for periodically transmitting, to the base station, a rBSR indicating estimated failed transmissions of data packets on the at least one direct path to the at least one second node. The apparatus 2902 includes means for transmitting, to the base station, a relayed data packet including a BAP header of the at least one second node, an IP header of the at least one second node, and the data for the at least one second node, and transmit, to the base station, a relayed data packet including a BAP header indicating the relayed path and the at least one second node as a destination, a compressed header including an IP header and an Ethernet header of the at least one second node, and the data for the at least one second node. The means may be one or more of the components of the apparatus 2902 configured to perform the functions recited by the means. As described supra, the apparatus 2902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 30:
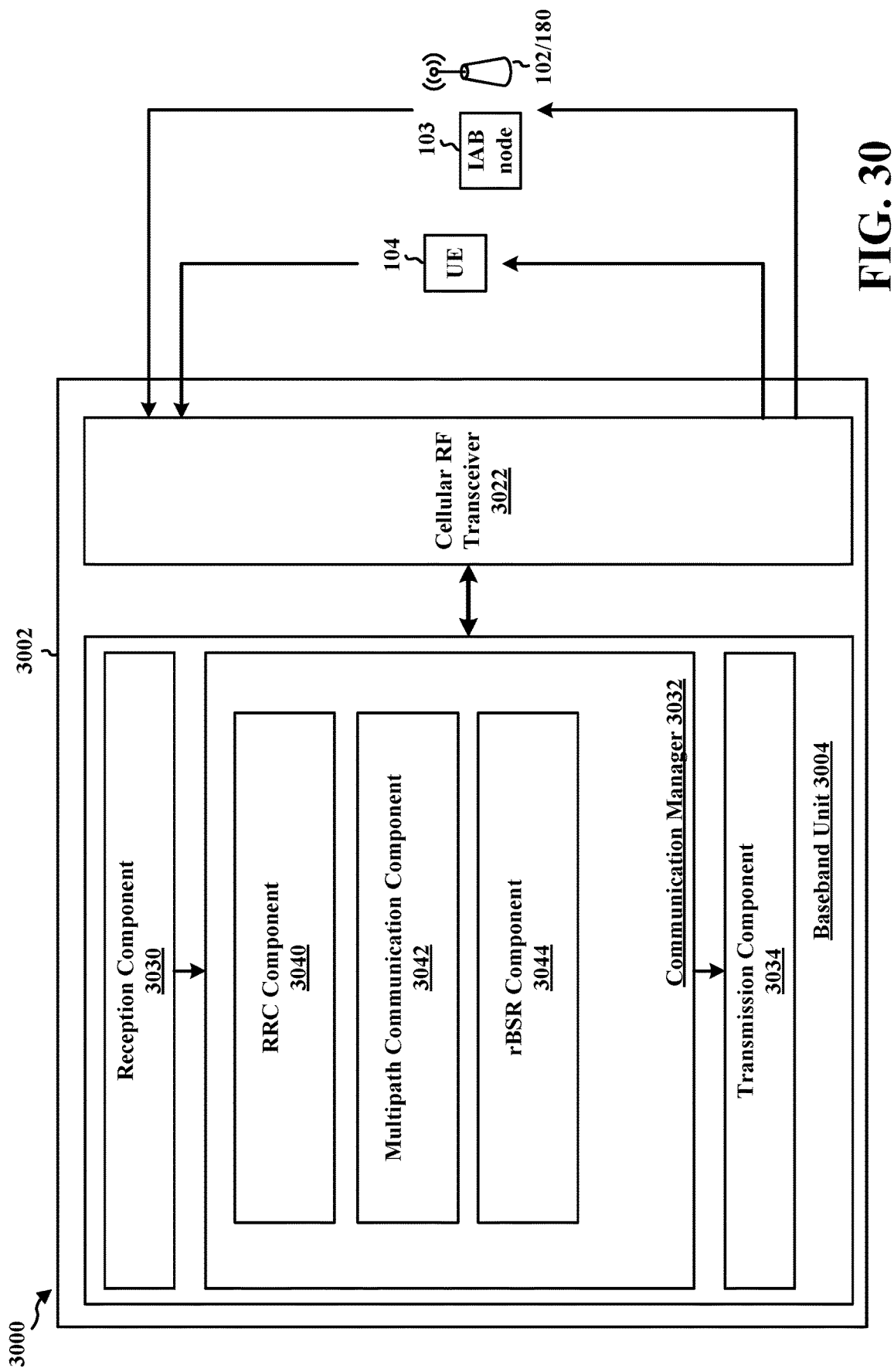
FIG. 30 is a diagram illustrating an example of a hardware implementation for an example apparatus.

FIG. 30 is a diagram 3000 illustrating an example of a hardware implementation for an apparatus 3002. The apparatus 3002 may be a base station, a component of a base station, or may implement base station functionality. Here, the apparatus 3002 may be the base station 2204. In some aspects, the apparatus 2902 may include a baseband unit 3004. The baseband unit 3004 may communicate through a cellular RF transceiver 3022 with the UE 104. The baseband unit 3004 may include a computer-readable medium/memory. The baseband unit 3004 is responsible for general processing, including the execution of software stored on the computer-readable medium/memory. The software, when executed by the baseband unit 3004, causes the baseband unit 3004 to perform the various functions described supra. The computer-readable medium/memory may also be used for storing data that is manipulated by the baseband unit 3004 when executing software. The baseband unit 3004 further includes a reception component 3030, a communication manager 3032, and a transmission component 3034. The communication manager 3032 includes the one or more illustrated components. The components within the communication manager 3032 may be stored in the computer-readable medium/memory and/or configured as hardware within the baseband unit 3004. The baseband unit 3004 may be a component of the base station 310 and may include the memory 376 and/or at least one of the TX processor 316, the RX processor 370, and the controller/processor 375.

The communication manager 3032 includes an RRC & F1-AP component 3040 that is configured to transmit RRC & F1-AP configurations, e.g., as described in connection with 2710, 2711, and 2734. The communication manager 3032 includes a multipath communication component 3042 that is configured to receive a relay data packet from a data transmission source, verify that the relay data packet includes data for a data transmission target, and transmit the relay data packet to the data transmission target, e.g., as described in connection with 2720, 2722, 2724, 2726, 2744, 2746, 2756, 2758, 2820, 2822, 2824, and 2826. The communication manager 3032 includes an rBSR component 3044 that is configured to receive rBSR, e.g., as described in connection with 2732.

The apparatus may include additional components that perform each of the blocks of the algorithm in the flowcharts of FIGS. 22, 27, and 28. As such, each block in the flowcharts of FIGS. 22, 27, and 28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 3002 may include a variety of components configured for various functions. In one configuration, the apparatus 3002, and in particular the baseband unit 3004, includes means for receiving a first data packet from a data transmission source, the data transmission source being one of a first node or at least one second node, means for verifying that the first data packet includes data for a data transmission target, the data transmission target being another of the first node or the at least one second node, means for identifying that the BAP header of the first data packet is different from the BAP header of the base station, means for generating a second data packet based on the first data packet, the second data packet including a BAP header of the data transmission target, the IP header of the data transmission target, and the data for the data transmission target, and means for relaying the data for the data transmission target in the first data packet. The apparatus 3002 includes means for transmitting, to the first node, a first RRC configuration associated with an RRC connection between the first node and the base station and an F1-AP configuration associated with a first F1-AP connection between the first node and the base station, and means for transmitting, to the at least one second node, a second RRC configuration associated with a second RRC connection between the first node and the base station. The apparatus 3002 includes means for transmitting, to the first node, a first reservation of a first set of physical resource blocks of an UL channel from the first node, the first set of physical resource blocks being reserved for the UL channel from the first node to the base station, means for transmitting, to the at least one second node, the plurality of data packets. The apparatus 3002 includes means for periodically receiving, from the first node, a rBSR indicating estimated failed transmissions of data packets on at least one direct path to the at least one second node, and means for identifying the first set of physical resource blocks of the UL channel based on the rBSR received from the first node. The means may be one or more of the components of the apparatus 3002 configured to perform the functions recited by the means. As described supra, the apparatus 3002 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station may configure a first node and at least one second node with the IAB network with the multipath multi-hop transmission configuration. The first node may include a PLC including an IAB node including a PLC IAB-MT and a PLC IAB-DU, the base station may include an IAB donor, and each of the at least one second node may include a second IAB-MT. The first node and the at least one second node may communicate with each other through a direct path and a multi-hop transmission including the base station.

Also, the first node and the at least one second node may detect transmission failure on the direct path and retransmit the data packet to the multi-hop transmission, on a set of PRBs configured by the base station. In one aspect, the first node may detect transmission failure on the direct path and retransmit the data packet to the multi-hop transmission, on a set of PRBs configured by the base station. In another aspect, the at least one second node may detect transmission failure on the direct path and receive a retransmission grant from the first node, the grant configuring the at least one second node to schedule the retransmission in a subset of PRBs in the set of PRBs configured by the base station.

In another aspect, the at least one second node may transmit BSR to the first node, the first node may transmit rBSR to the base station, and the base station may configure the set of PRBs based on the rBSR.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first node including at least one processor coupled to a memory and configured to configure at least one direct path with at least one second node, the at least one direct path being associated with a single-hop transmission to the at least one second node, configure a relayed path with the at least one second node, the relayed path being associated with a multi-hop transmission including a base station, and communicate data with the at least one second node through at least one of the relayed path or the at least one direct path.

Aspect 2 is the apparatus of aspect 1, further including a transceiver coupled to the at least one processor, where the first node includes a PLC including an IAB node including a PLC IAB-MT and a PLC IAB-DU, the base station includes an IAB donor, and each of the at least one second node includes a second IAB-MT.

Aspect 3 is the apparatus of any of aspects 1 and 2, where, to communicate the data with the at least one second node, the at least one processor is further configured to transmit, to the base station, a relayed data packet including a BAP header of the base station, an IP header of the at least one second node, and the data for the at least one second node.

Aspect 4 is the apparatus of any of aspects 1 to 3, where, to configure the relayed path, the at least one processor is further configured to receive, from the base station, a first RRC configuration associated with an RRC connection between the first node and the base station and an F1-AP configuration associated with an F1-AP connection between the first node and the base station, and where, to configure the at least one direct path, the at least one processor is configured to: configure a second RRC connection between the first node and the at least one second node based on the second configuration associated with the F1-AP connection.

Aspect 5 is the apparatus of any of aspects 1 to 4, where the at least one processor is further configured to detect a transmission failure of a first data packet to one of the at least one second node on a first direct path of the at least one direct path, and transmit, to the base station, a retransmission of the first data packet on the relayed path, where the retransmission of the first data packet is transmitted in a set of physical resource blocks of an UL channel, the set of physical resource blocks being reserved for the UL channel from the first node to the base station.

Aspect 6 is the apparatus of aspect 5, where the at least one processor is further configured to receive a RRC message indicating a reservation of the set of physical resource blocks for the UL channel from the first node to the base station.

Aspect 7 is the apparatus of any of aspects 1 to 6, where the at least one processor is further configured to detect a transmission failure of a first data packet to one of the at least one second node on a first direct path of the at least one direct path, detect a transmission failure of a second data packet to another of the at least one second node on a second direct path of the at least one direct path, and transmit, to the base station, a retransmission of the first data packet and the second data packet on the relayed path, where the retransmission of the first data packet and the second data packet are transmitted in the set of physical resource blocks of the UL channel.

Aspect 8 is the apparatus of any of aspects 1 to 7, where the at least one processor is further configured to detect a transmission failure of a first data packet from one of the at least one second node on a first direct path of the at least one direct path, and transmit, to the one of the at least one second node, an instruction granting a retransmission of the first data packet to the base station in a subset of physical resource blocks of an UL channel of a set of physical resource blocks of the UL channel, the set of physical resource blocks of the UL channel being reserved for retransmissions to the first node.

Aspect 9 is the apparatus of aspect 8, where the at least one processor is further configured to receive, from the base station, the retransmission of the first data packet from the one of the at least one second node.

Aspect 10 is the apparatus of any of aspects 1 to 9, where the at least one processor is further configured to receive at least one BSR from the at least one second node, and periodically transmit, to the base station, a rBSR indicating estimated failed transmissions of data packets on the at least one direct path to the at least one second node, the rBSR being generated based on the at least one BSR received from the at least one second node.

Aspect 11 is the apparatus of any of aspects 1 to 10, where, to communicate the data with the at least one second node, the at least one processor is further configured to transmit, to the base station, a relayed data packet including a BAP header of the at least one second node, an IP header of the at least one second node, and the data for the at least one second node.

Aspect 12 is the apparatus of any of aspects 1 to 11, where the first node includes an IAB adaptation layer, and where, to communicate the data with the at least one second node, the at least one processor is further configured to: transmit, to the base station, a relayed data packet including a BAP header indicating the relayed path and the second node as a destination, a compressed header including an IP header and an Ethernet header of the at least one second node, and the data for the at least one second node.

Aspect 13 is the apparatus of aspect 12, further including a transceiver coupled to the at least one processor, where the base station includes a PLC connected to at least a part of the at least one second node.

Aspect 14 is the apparatus of any of aspects 1 to 13, where the first node and the second node include an IAB adaptation layer, and where, to communicate the data with the at least one second node, the at least one processor is further configured to: transmit, to the second node, through the at least one direct path, a direct data packet including a BAP header indicating the direct path and the second node as a destination, a compressed header including an IP header and an Ethernet header of the at least one second node, and the data for the at least one second node.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication at a first node including at least one processor coupled to a memory and configured to receive a configuration of a direct path with a second node, the direct path being associated with a single-hop transmission to the second node, receive a configuration of a relayed path with the second node, the relayed path being associated with a multi-hop transmission including a base station, and communicate data with the second node through at least one of the relayed path or the at least one direct path.

Aspect 19 is the apparatus of aspect 18, where the second node includes a PLC including an IAB node including a PLC IAB-MT and a PLC IAB-DU, the base station includes an IAB donor, and the first node includes a second IAB-MT.

Aspect 20 is the apparatus of any of aspects 18 and 19, where, to communicate the data with the second node, the at least one processor is further configured to transmit, to the base station, a relayed data packet including a BAP header of the base station, an IP header of the second node, and the data for the second node.

Aspect 21 is the apparatus of any of aspects 18 to 20, where, to configure the relayed path, the at least one processor is further configured to receive, from the base station, a RRC configuration associated with an RRC connection between the first node and the base station, and, to configure the at least one direct path, the at least one processor is configured to receive, from the second node, a direct configuration associated with the RRC connection between the first node and the second node.

Aspect 22 is the apparatus of any of aspects 18 to 21, where the at least one processor is further configured to detect a transmission failure of a first data packet from the second node on the direct path, and receive, from the base station, a retransmission of the first data packet on the relayed path.

Aspect 23 is the apparatus of any of aspects 18 to 22, where the at least one processor is further configured to detect a transmission failure of a first data packet to the second node on the at least one direct path, and receive, from the second node, an instruction granting a retransmission of the first data packet to the base station in a subset of physical resource blocks of an UL channel of a set of physical resource blocks of the UL channel, the set of physical resource blocks of the UL channel being reserved for retransmissions to the second node.

Aspect 24 is the apparatus of aspect 23, where the at least one processor is further configured to transmit, to the base station, the retransmission of the first data packet in the subset of physical resource blocks of the UL channel of the set of physical resource blocks for the UL channel.

Aspect 25 is the apparatus of any of aspects 18 to 24, where the at least one processor is further configured to transmit, to the second node, a BSR.

Aspect 26 is the apparatus of any of aspects 18 to 25, where, to communicate the data with the second node, the at least one processor is further configured to transmit, to the base station, a relayed data packet including a BAP header of the second node, an IP header of the second node, and the data for the second node.

Aspect 27 is the apparatus of any of aspects 18 to 26, further including a transceiver coupled to the at least one processor, where, the base station includes a PLC connected to the first node.

Aspect 28 is a method of wireless communication for implementing any of aspects 18 to 27.

Aspect 29 is an apparatus for wireless communication including means for implementing any of aspects 18 to 27.

Aspect 30 is a computer-readable medium storing computer executable code, where the code when executed by a processor causes the processor to implement any of aspects 18 to 27.

Aspect 31 is an apparatus for wireless communication at a base station including at least one processor coupled to a memory and configured to receive a first data packet from a data transmission source, the data transmission source being one of a first node or at least one second node, verify that the first data packet includes data for a data transmission target, the data transmission target being another of the first node or the at least one second node, and relay the data for the data transmission target in the first data packet.

Aspect 32 is the apparatus of aspect 31, further including a transceiver coupled to the at least one processor, where the first node includes a PLC including an IAB node including a PLC IAB-MT and a PLC IAB-DU, the base station includes an IAB donor, and each of the at least one second node includes a second IAB-MT.

Aspect 33 is the apparatus of any of aspects 31 and 32, where the first data packet includes a BAP header of the base station, an IP header of the data transmission target, and the data for the data transmission target.

Aspect 34 is the apparatus of aspect 33, where the at least one processor is further configured to generate a second data packet based on the first data packet, the second data packet including a BAP header of the data transmission target, the IP header of the data transmission target, and the data for the data transmission target, and where the data for the data transmission target is relayed to the data transmission target using the second data packet.

Aspect 35 is the apparatus of any of aspects 31 to 34, where the at least one processor is further configured to transmit, to the first node, a first RRC configuration associated with an RRC connection between the first node and the base station and an F1-APconfiguration associated with a first F1-APconnection between the first node and the base station, and transmit, to the at least one second node, a second RRC configuration associated with a second RRC connection between the first node and the base station.

Aspect 36 is the apparatus of any of aspects 31 to 35, where the at least one processor is further configured to transmit, to the first node, a first reservation of a first set of physical resource blocks of an UL channel from the first node, the first set of physical resource blocks being reserved for the UL channel from the first node to the base station.

Aspect 37 is the apparatus of aspect 36, where the first reservation of the first set of physical resource blocks is transmitted via one or more RRC messages.

Aspect 38 is the apparatus of any of aspects 31 to 37, where the at least one processor is further configured to receive, from the first node, a plurality of data packets in the first set of physical resource blocks of the UL channel, and transmit, to the at least one second node, the plurality of data packets.

Aspect 39 is the apparatus of any of aspects 31 to 38, where the at least one processor is further configured to periodically receive, from the first node, a rBSR indicating estimated failed transmissions of data packets on at least one direct path to the at least one second node, and identify the first set of physical resource blocks of the UL channel based on the rBSR received from the first node.

Aspect 40 is the apparatus of any of aspects 31 to 39, where, the first data packet includes a BAP header of the first data packet, an IP header of the first data packet, and the data for the first data packet.

Aspect 41 is the apparatus of aspect 40, where, to verify that the first data packet includes the data for the data transmission target, the at least one processor is further configured to identify that the BAP header of the first data packet is different from the BAP header of the base station, where the at least one processor verifies that the first data packet includes the data to the data transmission target based on identifying that the BAP header of the first data packet is different from the BAP header of the base station.

Aspect 42 is the apparatus of aspect 41, where the first data packet is relayed to the data transmission target to relay the data for the data transmission target in the first data packet.

Aspect 43 is the apparatus of any of aspects 31 to 42, where the first node and the base station include an IAB adaptation layer, where the first data packet includes a BAP header of the base station, a compressed header including an IP header and an Ethernet header of the at least one second node, and the data for the at least one second node.

Aspect 44 is the apparatus of aspect 43, further including a transceiver coupled to the at least one processor, where, the base station includes a PLC connected to at least a part of the at least one second node.

Aspect 45 is a method of wireless communication for implementing any of aspects 31 to 44.

Aspect 46 is an apparatus for wireless communication including means for implementing any of aspects 31 to 44.

Aspect 47 is a computer-readable medium storing computer executable code, where the code when executed by a processor causes the processor to implement any of aspects 31 to 44.

What is claimed is:

1. An apparatus for wireless communication at a first node comprising:
    memory; and at least one processor coupled to the memory and configured to, based at least in part on information stored in the memory: configure at least one direct path with at least one second node, the at least one direct path being associated with a single-hop transmission to the at least one second node;
    configure a relayed path with the at least one second node, the relayed path being associated with a multi-hop transmission including a base station; and communicate data including a relayed data packet associated with a backhaul adaptation protocol (BAP) with the at least one second node through the relayed path, and wherein to communicate the data with the at least one second node, the at least one processor is configured to at least one of: transmit, to the base station, the relayed data packet including a BAP header of the base station or the at least one second node, an internet protocol (IP) header of the at least one second node, and the data for the at least one second node, or transmit, to the base station, the relayed data packet including a second BAP header indicating the relayed path and the at least one second node as a destination, a compressed header including a second IP header and an Ethernet header of the at least one second node, and the data for the at least one second node.

2. The apparatus of claim 1, wherein, to communicate the data with the at least one second node, the at least one processor is further configured to:
    transmit, to the base station, the relayed data packet including the BAP header of the base station, the IP header of the at least one second node, and the data for the at least one second node.

3. The apparatus of claim 1, wherein, to configure the relayed path, the at least one processor is further configured to: receive, from the base station, a first radio resource control (RRC) configuration associated with an RRC connection between the first node and the base station and an F1 application protocol (AP) (F1-AP) configuration associated with an F1-AP connection between the first node and the base station; and
    wherein, to configure the at least one direct path, the at least one processor is configured to: configure a second RRC connection between the first node and the at least one second node based on the second configuration associated with the F1-AP connection.

4. The apparatus of claim 1, wherein the at least one processor is further configured to:
    detect a transmission failure of a first data packet to one of the at least one second node on a first direct path of the at least one direct path; and
    transmit, to the base station, a retransmission of the first data packet on the relayed path in a set of physical resource blocks of an uplink (UL) channel, the set of physical resource blocks being reserved for the UL channel from the first node to the base station.

5. The apparatus of claim 4, wherein the at least one processor is further configured to:
    receive a radio resource control (RRC) message indicating a reservation of the set of physical resource blocks for the UL channel from the first node to the base station.

6. The apparatus of claim 1, wherein the at least one processor is further configured to:
- detect a transmission failure of a first data packet to one of the at least one second node on a first direct path of the at least one direct path;
- detect a transmission failure of a second data packet to another of the at least one second node on a second direct path of the at least one direct path; and
- transmit, to the base station, a retransmission of the first data packet and the second data packet on the relayed path in a set of physical resource blocks of a UL channel.

7. The apparatus of claim 1, wherein the at least one processor is further configured to:
- detect a transmission failure of a first data packet from one of the at least one second node on a first direct path of the at least one direct path; and
- transmit, to the one of the at least one second node, an instruction granting a retransmission of the first data packet to the base station in a subset of physical resource blocks of an uplink (UL) channel of a set of physical resource blocks of the UL channel, the set of physical resource blocks of the UL channel being reserved for retransmissions to the first node.

8. The apparatus of claim 1, wherein the at least one processor is further configured to:
- receive at least one buffer status report (BSR) from the at least one second node; and
- periodically transmit, to the base station, a remote BSR (rBSR) indicating estimated failed transmissions of data packets on the at least one direct path to the at least one second node, the rBSR being generated based on the at least one BSR received from the at least one second node.

9. The apparatus of claim 1, wherein, to communicate the data with the at least one second node, the at least one processor is further configured to:
- transmit, to the base station, the relayed data packet including the BAP header of the at least one second node, the IP header of the at least one second node, and the data for the at least one second node.

10. The apparatus of claim 1, wherein the first node comprises an integrated access and backhaul (IAB) adaptation layer, and
- wherein, to communicate the data with the at least one second node, the at least one processor is further configured to:
- transmit, to the base station, the relayed data packet including a BAP header indicating the relayed path and the at least one second node as the destination, the compressed header including the second IP header and the Ethernet header of the at least one second node, and the data for the at least one second node.

11. The apparatus of claim 10, further comprising a transceiver coupled to the at least one processor,
- wherein the base station includes a programmable logic controller (PLC) connected to the at least one second node, the PLC being connected to at least a part of the at least one second node.

12. An apparatus for wireless communication at a first node comprising:
- memory; and at least one processor coupled to the memory and configured to, based at least in part on information stored in the memory: receive a configuration of a direct path with a second node, the direct path being associated with a single-hop transmission to the second node; receive a configuration of a relayed path with the second node, the relayed path being associated with a multi-hop transmission including a base station; and communicate data including a relayed data packet a relayed data packet associated with a backhaul adaptation protocol (BAP) with the second node through the relayed path and wherein to communicate the data with the second node, the at least one processor is configured to: transmit, to the base station, the relayed data packet comprising a BAP header of the base station or the second node, an internet protocol (IP) header of the second node, and the data for the second node.

13. The apparatus of claim 12, wherein, to communicate the data with the second node, the at least one processor is further configured to:
- transmit, to the base station, the relayed data packet comprising the BAP header of the base station, the IP header of the second node, and the data for the second node.

14. The apparatus of claim 12, wherein, to configure the relayed path, the at least one processor is further configured to: receive, from the base station, a radio resource control (RRC) configuration associated with an RRC connection between the first node and the base station; and
- wherein, to configure the at least one direct path, the at least one processor is configured to: receive, from the second node, a direct configuration associated with the RRC connection between the first node and the second node.

15. The apparatus of claim 12, wherein the at least one processor is further configured to:
- detect a transmission failure of a first data packet from the second node on the direct path; and
- receive, from the base station, a retransmission of the first data packet on the relayed path.

16. The apparatus of claim 12, wherein the at least one processor is further configured to:
- detect a transmission failure of a first data packet to the second node on the at least one direct path; and
- receive, from the second node, an instruction granting a retransmission of the first data packet to the base station in a subset of physical resource blocks of an uplink (UL) channel of a set of physical resource blocks of the UL channel, the set of physical resource blocks of the UL channel being reserved for retransmissions to the second node.

17. The apparatus of claim 16, wherein the at least one processor is further configured to:
- transmit, to the base station, the retransmission of the first data packet in the subset of physical resource blocks of the UL channel of the set of physical resource blocks for the UL channel.

18. Apparatus of claim 12, wherein, to communicate the data with the second node, the at least one processor is further configured to:
- transmit, to the base station, the relayed data packet including the BAP header of the second node, the IP header of the second node, and the data for the second node.

* * * * *